(12) United States Patent
Fujiseki et al.

(10) Patent No.: US 10,801,451 B2
(45) Date of Patent: Oct. 13, 2020

(54) FUEL SUPPLY APPARATUS

(71) Applicant: DENSO CORPORATION, Kariya, Aichi-pref. (JP)

(72) Inventors: Takemasa Fujiseki, Kariya (JP); Tetsuro Okazono, Kariya (JP); Shinji Noda, Kariya (JP); Norihiro Hayashi, Kariya (JP); Hajime Danjo, Kariya (JP); Shinichi Morita, Toyota (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/580,106

(22) Filed: Sep. 24, 2019

(65) Prior Publication Data
US 2020/0095963 A1   Mar. 26, 2020

(30) Foreign Application Priority Data

Sep. 26, 2018 (JP) ................. 2018-179628

(51) Int. Cl.
*F02M 37/00* (2006.01)
*F16K 31/00* (2006.01)
*B60K 15/03* (2006.01)
*B60K 15/035* (2006.01)

(52) U.S. Cl.
CPC ... *F02M 37/0035* (2013.01); *B60K 15/03006* (2013.01); *F16K 31/002* (2013.01); *B60K 2015/03072* (2013.01); *B60K 2015/03256* (2013.01); *B60K 2015/03566* (2013.01)

(58) Field of Classification Search
CPC .............. F02M 37/0035; F16K 31/002; B60K 15/03006; B60K 2015/03566; B60K 2015/03256; B60K 2015/03072; B60K 2015/03296; B60K 2015/0325
USPC .......... 123/464, 509, 510, 511, 514
See application file for complete search history.

(56) References Cited

U.S. PATENT DOCUMENTS

| | | | |
|---|---|---|---|
| 6,039,030 A | 3/2000 | Robinson et al. | |
| 8,567,373 B2* | 10/2013 | Suda | F02D 33/006 123/457 |
| 9,200,602 B2* | 12/2015 | Ogawa | F02M 37/0029 |
| 2009/0071444 A1* | 3/2009 | Takagi | F02M 37/0029 123/447 |
| 2013/0233283 A1* | 9/2013 | Rinke | F02M 37/106 123/495 |
| 2017/0060146 A1 | 3/2017 | Powers et al. | |

FOREIGN PATENT DOCUMENTS

JP   5851736   2/2016

* cited by examiner

*Primary Examiner* — Hai H Huynh
(74) *Attorney, Agent, or Firm* — Nixon & Vanderhye PC

(57) ABSTRACT

A housing has an inner passage to communicate with both a fuel passage, which is to conduct fuel from a fuel pump, and a return passage, which is to return fuel a fuel tank. A valve body is movable in the housing to change a minimum flow passage cross-sectional area of the inner passage. A spring is connected to the valve body and changes its biasing load in correspondence with a fuel temperature to move the valve body. The spring moves the valve body such that the minimum flow passage cross-sectional area, when the fuel temperature is equal to or higher than a predetermined vapor generation temperature, is larger than the minimum flow passage cross-sectional area when the fuel temperature is lower than the vapor generation temperature.

14 Claims, 31 Drawing Sheets

FUEL SUPPLY APPARATUS

CROSS REFERENCE TO RELATED APPLICATION

The present application claims the benefit of priority from Japanese Patent Application No. 2018-179628 filed on Sep. 26, 2018. The entire disclosures of all of the above applications are incorporated herein by reference.

TECHNICAL FIELD

The present disclosure relates to a fuel supply apparatus that is to supply fuel in a fuel tank to an internal combustion engine.

BACKGROUND

A fuel supply apparatus has been used to supply fuel in a fuel tank to an internal combustion engine. A fuel supply apparatus having a conventional configuration includes a pump provided in a fuel tank.

SUMMARY

A fuel supply apparatus according to an aspect of the present disclosure includes a valve device including a valve member to control a flow rate of a fluid in a passage.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
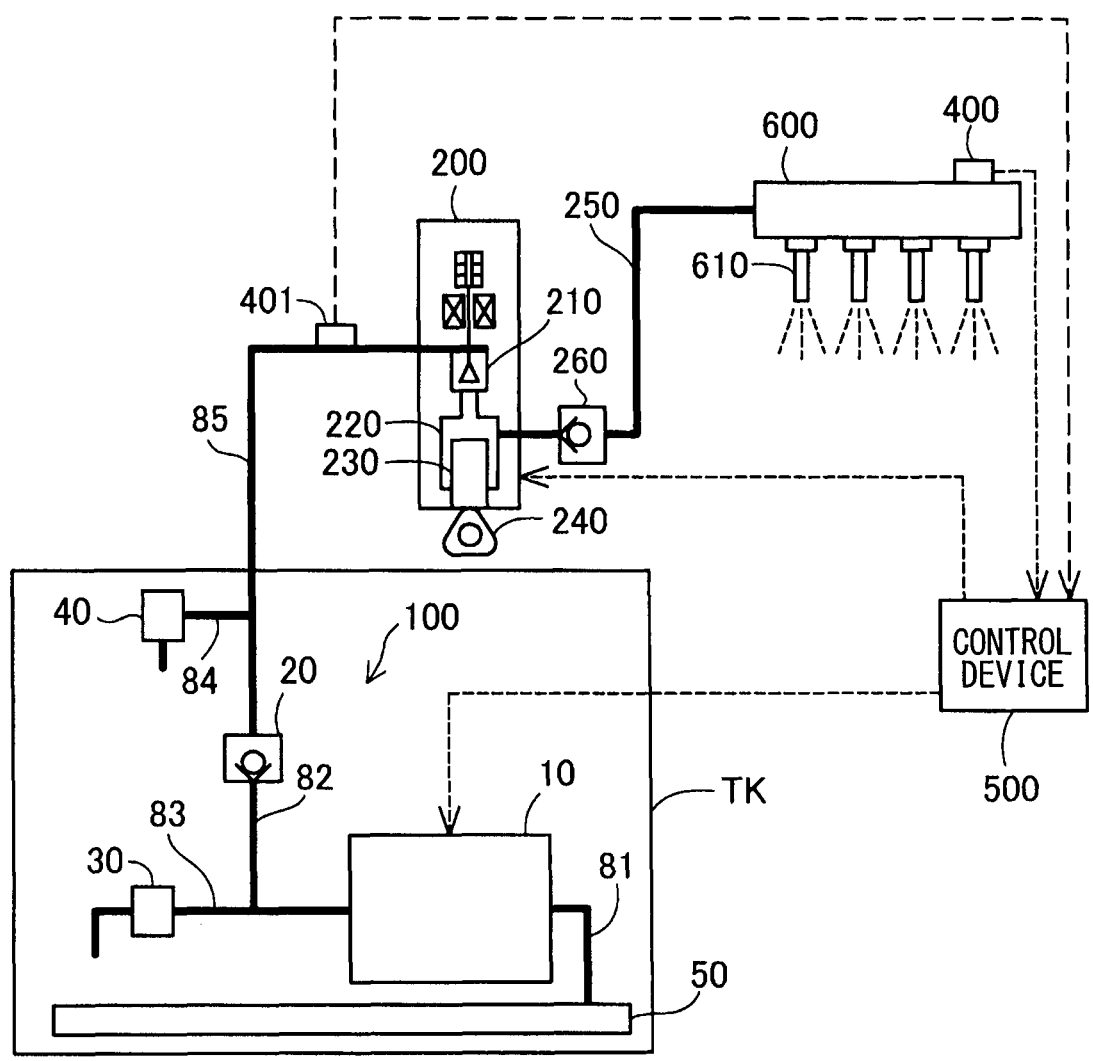
FIG. 1 is a block diagram showing a schematic configuration of a fuel supply apparatus according to a first embodiment.

Hereinafter, items being a part of the present disclosure will be described.

As a fuel supply apparatus, a configuration having a pump to supply fuel in a fuel tank to an internal combustion engine may be given. It is assumed that fuel temperature in the fuel tank becomes very high in correspondence with operation status of the internal combustion engine, the external environment, and the like. In this case, the fuel is vaporized in the fuel tank and becomes fuel vapor (hereinafter, also referred to as "vapor"), and may be drawn into the pump. When the vapor is drawn into the pump, the rotational power of the pump is spared for vapor compression work. Accordingly, when the supply amount of the fuel from the pump is small, the pump could be incapable of supplying fuel, and so-called vapor lock may occur.

For example, to avoid the vapor lock, a configuration may be assumable to supply fuel more than a fuel use amount in the internal combustion engine from the pump and to return the fuel by surplus amount from a return passage provided on the downstream of the pump into the fuel tank. Further, another configuration may be assumable to provide an electromagnetic valve capable of controlling a flow rate in the return passage, to open the electromagnetic valve when the fuel use amount in the internal combustion engine is less than a predetermined value, and to close the valve when the amount is equal to or greater than the predetermined value.

However, in the configuration to return the fuel from the return passage into the fuel tank, even in a situation where the fuel temperature in the fuel tank is low and vapor does not occur, when the fuel use amount in the internal combustion engine is less than the predetermined value, the pump is required to pump up the fuel by a predetermined amount. Accordingly, a concern arises that electric power is wastefully consumed for pump driving.

According to an example of the present disclosure, a fuel supply apparatus is to supply fuel from a fuel tank to an internal combustion engine. The fuel supply apparatus includes a pump, a return passage, and a valve device. The pump is to discharge fuel in the fuel tank. The return passage is branched from a fuel passage, which is connected to the pump, and is to return a part of fuel discharged from the pump to the fuel tank. The valve device is to control a flow rate in the return passage. The valve device has a housing, an inner passage, a valve body, and a spring. The inner passage is provided in the housing and to communicate with both the fuel passage and an inside of the fuel tank. The valve body is provided in the inner passage and is movable in the housing to change a minimum flow passage cross-sectional area of the inner passage. The spring is connected to the valve body and is to change its biasing load in correspondence with a fuel temperature of the fuel to move the valve body. The spring is to move the valve body such that the minimum flow passage cross-sectional area, when the fuel temperature of the fuel discharged with the pump is equal to or higher than a predetermined vapor generation temperature, is larger than the minimum flow passage cross-sectional area when the fuel temperature is lower than the vapor generation temperature.

According to the fuel supply apparatus of this example, the spring member moves the valve body such that the minimum flow passage cross-sectional area, when the fuel temperature of the fuel discharged with the pump is equal to or higher than the vapor generation temperature, is larger than the minimum flow passage cross-sectional area when the fuel temperature is lower than the vapor generation temperature. Accordingly, this example enables to increase the flow rate in the return passage in a situation where fuel vapor occurs in comparison with that in a situation where fuel vapor does not occur. Accordingly, in the situation where fuel vapor does not occur, the increase in pump speed for the purpose of vapor lock avoidance is not performed. Only in the situation where fuel vapor occurs, this example enables to perform the increase in pump speed and enables to suppress wasteful electric power consumption for pump driving for the purpose of vapor lock avoidance.

The present disclosure may be materialized in other various forms than the fuel supply apparatus. For example, the disclosure is realized in the form of a valve device used in the fuel supply apparatus, a vehicle in which the fuel supply apparatus is mounted, a fuel supply apparatus manufacturing method and the like.

DETAILED DESCRIPTION

A. First Embodiment

A1. Entire Configuration:

A fuel supply apparatus 100 according to the present embodiment shown in FIG. 1 supplies fuel used in an unillustrated internal combustion engine from a fuel tank TK. In the present embodiment, the above-described internal combustion engine is an engine mounted in a vehicle, and it is a multi-cylinder ignition type engine in which plural cylinders are respectively provided with an injection valve 610. The fuel supply apparatus 100 is provided in the fuel tank TK. The fuel supply apparatus compresses the fuel in the fuel tank TK and sends the fuel to the outside of the fuel tank TK.

The fuel supply apparatus 100 is connected to a high-pressure pump device 200 via a low-pressure fuel passage 85. The high-pressure pump device 200 further compresses the fuel sent from the fuel supply apparatus 100 and supplies the fuel to a delivery pipe 600. A pressure sensor 401 is attached to the low-pressure fuel passage 85. The pressure sensor 401 detects fuel supply pressure (hereinafter, referred to as "supply pressure") in the low-pressure fuel passage 85. The pressure sensor 401 is electrically connected to a control device 500, and notifies the detected supply pressure to the control device 500. The delivery pipe 600 is connected to the high-pressure pump device 200 via a high-pressure fuel passage 250. The high-pressure fuel passage 250 is provided with a check valve 260 to regulate the flow direction of the fuel to a direction from the high-pressure pump device 200 toward the delivery pipe 600. The delivery pipe 600 pressure-accumulates the fuel sent from the high-pressure pump device 200, and delivers the fuel to the respective injection valves 610. A pressure sensor 400 is attached to the delivery pipe 600. The pressure sensor 400 detects supply pressure in the delivery pipe 600. The pressure sensor 400 is electrically connected to the control device 500 as in the case of the pressure sensor 401, and notifies the detected supply pressure to the control device 500.

The control device 500 controls the operation of the injection valve 610, the operation of a pump to be described later (pump 10) of the fuel supply apparatus 100, and the operation of the high-pressure pump device 200. The control device 500 calculates a target injection amount of the fuel in correspondence with engine operation situation such as engine load and engine speed, and controls the valve opening duty ratio of the injection valve 610 to obtain the calculated target injection amount. The valve opening duty ratio means the ratio of valve opening time in a valve opening period. Further, the control device 500 calculates target supply pressure and the target injection amount in correspondence with engine operation situation, and controls the pump 10 to be described later and the high-pressure pump device 200 to obtain the target supply pressure and the target injection amount. At this time, the control device 500 performs feedback control based on the supply pressure notified from the pressure sensor 400. More particularly, the control of the pump 10 means control of application voltage to an unillustrated electric motor to drive the pump 10. In the present embodiment, the control of the pump 10 means execution of duty control on the application voltage. Further, more particularly, the control of the high-pressure pump device 200 means control of valve opening period by controlling opening/closing operation of an electromagnetic spill valve to be described later (electromagnetic spill valve 210) of the high-pressure pump device 200. In the present embodiment, the control device 500 is configured with an ECU (Electronic Control Unit) formed with a computer having a CPU and a memory. The CPU of the control device 500 functions as a controller to perform the above-described respective control by performing a control program previously stored in the memory. Note that it may be configured such that an ECU different from the control device 500 is provided in the fuel tank TK or in the vicinity of the outside of the fuel tank TK, and the ECU has a function to control the pump 10.

The high-pressure pump device 200 has an electromagnetic spill valve 210, a pressure chamber 220, and a plunger 230. The electromagnetic spill valve 210 is a solenoid valve in the present embodiment. The electromagnetic spill valve 210 performs a valve opening operation in accordance with an instruction from the control device 500, to communicate the low-pressure fuel passage 85 and the pressure chamber 220 with each other. Further, the electromagnetic spill valve 210 performs a valve closing operation in accordance with an instruction from the control device 500, to break communication between the low-pressure fuel passage 85 and the pressure chamber 220. The plunger 230 is reciprocate-movably provided in the pressure chamber 220. The plunger 230 reciprocates in the pressure chamber 220 in correspondence with rotation of a camshaft 240. With this configuration, the volume in the pressure chamber 220 varies. Note that FIG. 1 shows the plunger 230 as if it is in direct contact with the camshaft 240, however, the plunger 230 may be in contact with the camshaft 240 via a support member supporting the plunger 230. Further, an elastic member to push the plunger 230 to the camshaft 240 side may be connected to the support member. The control of fuel supply amount via the high-pressure fuel passage 250 with the high-pressure pump device 200 is realized by controlling the relationship between timing of valve opening and valve closing of the electromagnetic spill valve 210 and the position of the plunger 230 (the phase of the camshaft 240).

The fuel supply apparatus 100 has the pump 10, a filter 50, a residual-pressure retention valve 15, a check valve 20, a flow control valve 30, a relief valve 40, an inflow passage 81, a fuel passage 82, a return passage 83, and a branch passage 84. The inflow passage 81, the fuel passage 82, the return passage 83, and the branch passage 84 are all formed with a pipe provided in the fuel tank TK.

The pump 10 is a so-called feed pump which pumps up the fuel in the fuel tank TK via the filter 50 and the inflow passage 81, compresses the fuel, and discharges the fuel to the fuel passage 82. The rotation speed of the pump 10, in other words, the rotation speed of an impeller of the pump 10 is controlled with the control device 500 in correspondence with engine operation status. In the present embodiment, the fuel supply apparatus 100 has an approximately cylindrical external shape. The fuel supply apparatus 100 is a so-called transverse type pump which is provided and used, with its central axis approximately parallel to a horizontal direction, in the fuel tank TK. The filter 50 is a so-called suction filter which removes foreign materials in the fuel, thus suppresses suction of the foreign materials into the pump 10.

The check valve 20 is provided on the downstream side of the residual-pressure retention valve 15 in the fuel passage 82, to regulate the flow direction of the fuel to a direction from the pump 10 toward the high-pressure pump device 200. When the pump 10 is driven, fuel pressure on the upstream side of the check valve 20 and fuel pressure on the downstream side of the check valve 20 are approximately equal to each other.

The flow control valve 30 is provided in the return passage 83, to control the flow rate of fuel returned into the fuel tank TK via the return passage 83, in the fuel discharged from the pump 10. In the present embodiment, the flow control valve 30 controls the flow rate of the fuel returned to the fuel tank TK in correspondence with temperature of the fuel (hereinafter, referred to as "fuel temperature") discharged with the pump 10. More particularly, control is performed such that when the fuel temperature is equal to or higher than a temperature previously determined as a temperature at which fuel vapor occurs (hereinafter, referred to as "vapor generation temperature"), the flow rate of the fuel returned to the fuel tank TK is increased in comparison with a case where the fuel temperature is lower than the vapor generation temperature. Note that the flow control valve 30 is not an electromagnetic valve, and is not controlled with the control device 500. That is, the flow control valve 30 autonomously controls the flow rate of fuel returned to the fuel tank TK in correspondence with fuel temperature. The details of the flow rate control and detailed configuration of the flow control valve 30 will be described later. The flow control valve 30 corresponds to a subordinate concept of the valve device in the present disclosure.

The relief valve 40 is provided in the branch passage 84, and opens when fuel pressure between the pump 10 and the high-pressure pump device 200, i.e., fuel pressure on the downstream side of the check valve 20 in the fuel passage 82 and in the low-pressure fuel passage 85 becomes equal to or higher than upper limit pressure, to return the fuel into the fuel tank TK. This configuration suppresses damage to the pipes forming the fuel passage 82 and the low-pressure fuel passage 85 and the check valve 20 with very high fuel pressure.

The inflow passage 81 is a flow passage to cause the fuel in the fuel tank TK to flow to the fuel supply apparatus 100. One end of the inflow passage 81 is in contact with the filter 50, and the other end is connected to the pump 10. The fuel passage 82 is a flow passage to supply the fuel discharged from the pump 10 to the low-pressure fuel passage 85. One end of the fuel passage 82 is connected to the pump 10, and the other end is connected to the low-pressure fuel passage 85. The fuel passage 82 and the low-pressure fuel passage 85 may be connected to each other with e.g. a connector of a cover member attached to the fuel tank TK. The return passage 83 is a flow passage to return a part of the fuel discharged from the pump 10 into the fuel tank TK. One end of the return passage 83 is connected to the fuel passage 82 on the upstream side of the check valve 20, and the other end is opened in the fuel tank TK. The branch passage 84 is a flow passage to return the fuel in the fuel passage 82 to the fuel tank TK. One end of the branch passage 84 is connected to the fuel passage 82 on the downstream side of the check valve 20, and the other end is connected to the relief valve 40. Note that the branch passage 84 communicates with the inside of the fuel tank TK by valve opening of the relief valve 40.

As described above, the control device 500 performs duty control on the applied voltage to the pump 10 to obtain the target supply pressure and the target injection amount (fuel use amount in the engine) calculated in correspondence with engine operation situation. In the present embodiment, a map holding the target supply pressure, the target injection amount, and the duty ratio, associated with each other (hereinafter, referred to as "pump driving map") is previously stored in a memory of the control device 500. The control device 500 performs duty control on the applied voltage while referring to the pump driving map. As described above, the flow rate of the fuel returned from the return passage 83 into the fuel tank TK is increased when the fuel temperature is equal to or higher than the vapor generation temperature, in comparison with the case where the fuel temperature is lower than the vapor generation temperature. Accordingly, when the fuel temperature rises from a status lower than the vapor generation temperature to the vapor generation temperature or higher, the supply pressure drops. In this case, when the control device 500 detects the drop of the supply pressure with the pressure sensor 401, the control device 500 increases the driving duty ratio of the pump 10 so as to realize the target supply pressure and the target injection amount. With this configuration, the amount of fuel discharged from the pump 10 is increased. The flow control valve 30 performs flow rate control such that the increment becomes equal to or higher than a necessary flow rate for vapor lock avoidance (hereinafter, referred to as "vapor lock avoiding flow rate"). With this operation, in a situation where fuel vapor occurs, even when the target injection amount, i.e., fuel use amount in the engine is small, the configuration enables to discharge the fuel for necessary flow rate for vapor lock avoidance from the pump 10. With this configuration, the configuration enables to avoid vapor lock in the pump 10. Note that vapor lock means a phenomenon that the rotation power of the pump 10 is mainly used in compression of the fuel vapor drawn in the pump 10 and the discharge amount of the fuel from the pump 10 is extremely reduced.

Figure 2:
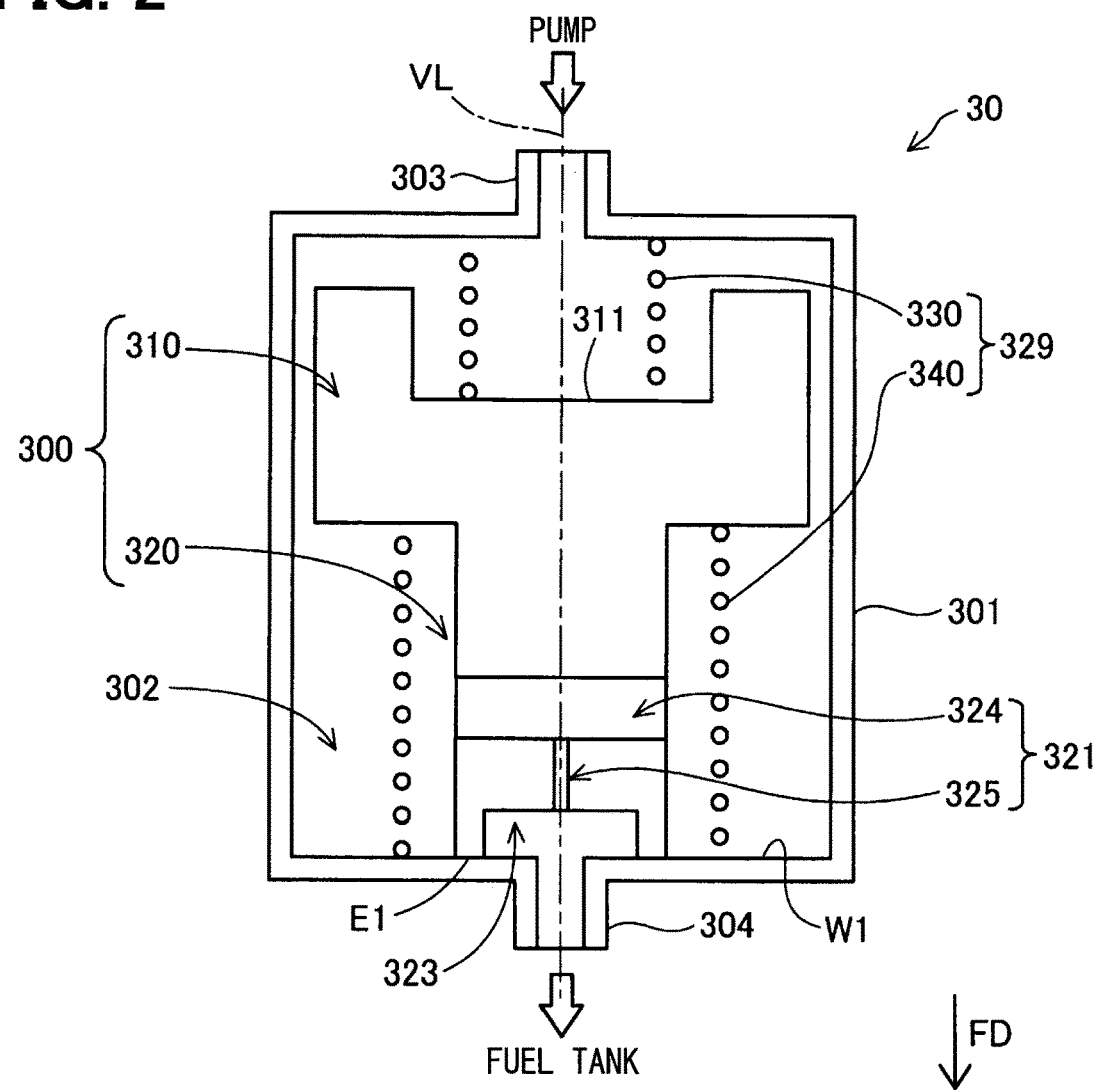
FIG. 2 is a cross-sectional diagram showing the schematic configuration of a flow control valve according to the first embodiment.
Figure 4:
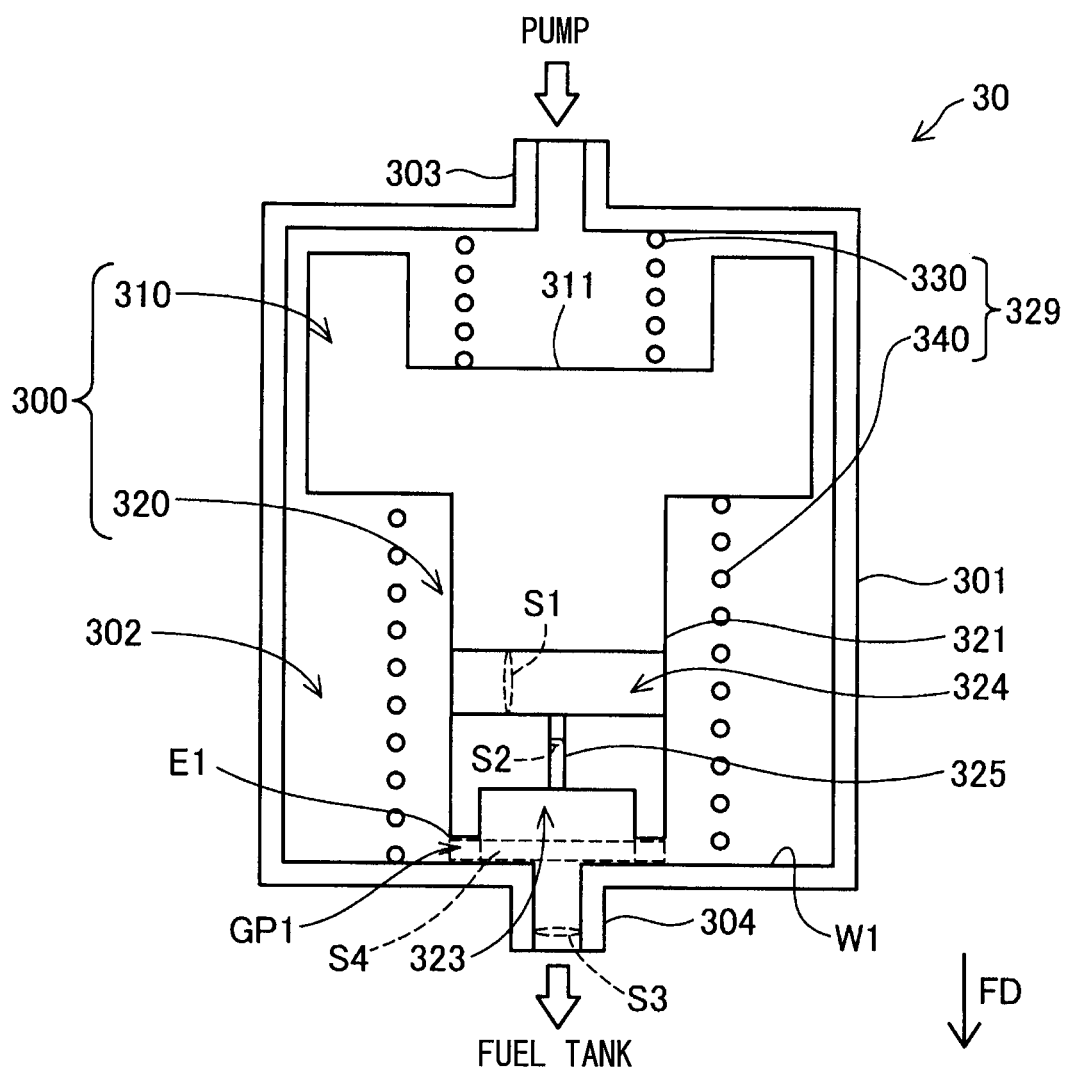
FIG. 4 is a cross-sectional diagram showing the schematic configuration of the flow control valve according to the first embodiment.

A2. Configuration of Flow Rate Control Valve:

As shown in FIG. 2 and FIG. 4, the flow control valve 30 has a housing 301, a valve body 300, and a spring member 329. Note that FIG. 2 and FIG. 4 show a cross-sectional diagram along a central axis of the flow control valve 30.

The housing 301 has a hollow approximately cylindrical external shape. The housing 301 accommodates the valve body 300 and the spring member 329. An inflow 303 and an outflow 304 are formed in the housing 301. The fuel discharged from the pump 10 flows from the inflow 303 into inner space 302 in the housing 301. Further, the fuel in the inner space 302 is discharged from the outflow 304 and returned into the fuel tank TK. An inner passage to be described later is formed in the inner space 302. FIG. 2 represents a virtual line VL connecting the inflow 303 and the outflow 304 to each other. The virtual line VL approximately corresponds to the central axis of the housing 301, and passes through the central part of the housing 301. In the present embodiment, the housing 301 is formed of resin. As the resin, for example, resin having excellent resistance to fuel, for example, polyamide (PA) such as nylon 6 or nylon 66 may be used. Note that the housing 301 may be formed of metal in place of resin. Note that the outflow 304 corresponds to a subordinate concept of the third passage in the present disclosure.

The valve body 300 is provided in the inner passage formed in the inner space 302, and controls the minimum flow passage cross-sectional area of the inner passage by moving in the housing in a flow passage direction FD and its opposite direction. The flow passage direction FD is a direction from the inflow 303 toward the outflow 304. The movement of the valve body 300 is controlled with the spring member 329. When the fuel temperature of the fuel discharged from the pump 10 is lower than the vapor generation temperature (hereinafter, referred to as "at a low temperature"), the valve body 300 is in contact with an inner wall surface W1 of the housing 301 as shown in FIG. 2. The inner wall surface W1 is an inner wall surface, among the inner wall surfaces of the housing 301, positioned at an end of the flow passage direction FD and is connected to the outflow 304. On the other hand, when the fuel temperature is equal to or higher than the vapor generation temperature (hereinafter, referred to as "at a high temperature"), the valve body 300 is not in contact with the inner wall surface W1, and a gap GP1 is formed between the valve body 300 and the inner wall surface W1 as shown in FIG. 4. The control of the minimum flow passage cross-sectional area of the inner passage will be described in detail later. In the present embodiment, the valve body 300 is formed of resin similar to that of the housing 301. Note that the valve body 300 may be formed of metal in place of resin.

As shown in FIG. 2 and FIG. 4, the valve body 300 has a partition 310 and a blockage protrusion 320. The partition 310 partitions the inner space 302 to inflow side region and outflow side region of the fuel. The partition 310 slides in a direction parallel to the virtual line VL while it is in contact with the inner wall surface of the housing 301. The partition 310 has an approximately cylindrical external shape, and has a central axis approximately corresponding to the central axis of the housing 301. A recess 311 is formed in the partition 310. The recess 311 is formed as an approximately cylindrically-shaped recess opened in the opposite direction to the flow passage direction FD. The central axis of the recess 311 approximately corresponds to the central axis of the partition 310. An outer wall side recess, recessed inward in a radial direction is formed in the outer wall surface in the radial direction of the partition 310. The outer wall side recess causes the fuel, flowing from the inflow 303 into the inner space 302, to flow from the inflow side region to the outflow side region. FIG. 2 and FIG. 4 represent a cross section passing through the outer wall side recess. Accordingly, as shown in FIG. 2 and FIG. 4, the partition 310 is provided such that a gap is formed between the partition and the housing 301 in the outer wall side recess.

The blockage protrusion 320 is configured to protrude from the center of the partition 310 along the flow passage direction FD, and block the outflow 304. The blockage protrusion 320 has an approximately cylindrical external shape, and has a central axis approximately corresponding to the central axis of the housing 301. As shown in FIG. 2, at a low temperature, a blockage end E1 as an end of the blockage protrusion 320 in the flow passage direction FD is in contact with the inner wall surface W1. With this configuration, the outflow 304 is blocked with the blockage protrusion 320. The above-described "blockage" means that the fuel is not discharged from a region in the vicinity of the outflow 304 in the outflow side region in the inner space 302, through the space between the valve body 300 (blockage end E1) and the inner wall surface W1 to the outflow 304, but does not mean that the fuel is not discharged from the outflow 304 at all.

Figure 3:
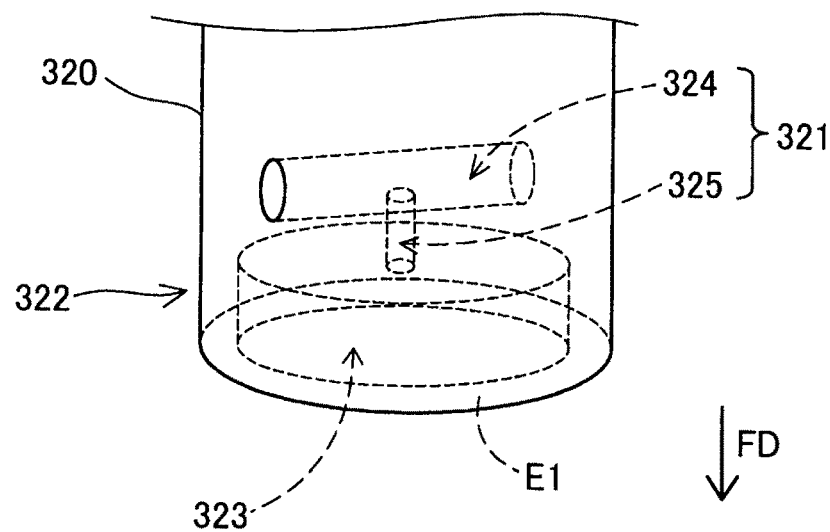
FIG. 3 is a perspective diagram showing a detailed configuration of a blockage protrusion of a valve body according to the first embodiment.

A recess 323 is formed at an end of the blockage protrusion 320 in the flow passage direction FD. As shown in FIG. 3, the recess 323 is formed as an approximately cylindrical recess opened in the flow passage direction FD. The central axis of the recess 311 approximately corresponds to the central axis of the partition 310. The recess 311 communicates with the outflow 304 at a low temperature. At this time, the blockage end E1 of the blockage protrusion 320 is in contact with the inner wall surface W1 so as to surround the opening.

As shown in FIG. 2 to FIG. 4, a through hole 321 is formed inside the blockage protrusion 320 in the vicinity of an end in the flow passage direction FD. In the present embodiment, the through hole 321 has an approximately T planar shape. One end of the through hole 321 is exposed to the recess 323, and the other end is exposed to the inner space 302. The through hole 321 has a first through hole forming portion 324 and a second through hole forming portion 325. The first through hole forming portion 324 passes through the blockage protrusion 320 in the radial direction. Accordingly, the first through hole forming portion 324 is exposed to the inner space 302 at its both ends. In the above-described through hole 321, the end exposed to the inner space 302 means the both ends of the first through hole forming portion 324. The second through hole forming portion 325 is formed along the flow passage direction FD, and one end communicates with the first through hole forming portion 324, and the other end is exposed to the recess 323. The through hole 321 corresponds to a subordinate concept of the second through hole in the present disclosure.

The spring member 329 has a first spring 330 and a second spring 340. The first spring 330 is provided in the inflow side region in the inner space 302. In the present embodiment, the first spring 330 is a coil spring formed as a so-called bias spring. The central axis of the first spring 330 approximately corresponds to the central axis of the housing 301 and the valve body 300. In the present embodiment, the first spring 330 is formed of stainless steel (SUS). Note that the first spring may be formed of an arbitrary material in which biasing load variation by temperature is smaller in comparison with the second spring 340, such as steel or resin, in place of stainless steel. The end of the first spring 330 in the flow passage direction FD is in contact with the recess 311 of the partition 310, and the end in the opposite direction to the flow passage direction FD is in contact with the inner wall surface of the housing 301. The first spring 330 pushes the valve body 300 in the flow passage direction FD.

The second spring 340 is provided in the outflow side region in the inner space 302. In the present embodiment, the second spring 340 is a coil spring formed as a so-called shape-memory alloy spring. The central axis of the second spring 340 approximately corresponds to the central axis of the housing 301 and the valve body 300. In the present embodiment, the second spring 340 is formed of an alloy of nickel (Ni) and titanium (Ti) (Ni—Ti alloy). Note that the second spring may be formed of an arbitrary material in which biasing load variation by temperature is larger in comparison with the first spring 330, such as Ag—Cd alloy (silver-cadmium alloy), Cu—Au—Zn alloy (copper-gold-zinc alloy), In—Ti alloy (indium-titanium alloy), In—Cd alloy (indium-cadmium alloy), or Ti—Ni—Cu alloy (titanium-nickel-copper alloy), in place of Ni—Ti alloy. The end of the second spring 340 in the flow passage direction FD is in contact with the inner wall surface W1 of the housing 301, and the end in the opposite direction to the flow passage direction FD is in contact with the end of the partition 310 in the flow passage direction FD. The diameter of the second spring 340 is larger than the diameter of the blockage protrusion 320, and the second spring 340 is provided so as to surround the blockage protrusion 320. The second spring 340 pushes the valve body 300 in the opposite direction to the flow passage direction FD. As the second spring 340 is a memory alloy spring, the magnitude of biasing load to be caused, in other words, the power of force to push the valve body 300 in the opposite direction to the flow passage direction FD, differs in correspondence with temperature. More particularly, the magnitude of biasing load increases as the temperature rises.

As described above, the first spring 330 pushes the valve body 300 in the flow passage direction FD, and the second spring 340 pushes the valve body 300 in the opposite direction to the flow passage direction FD. Further, the biasing load caused with the second spring 340 increases as the temperature of the second spring 340 rises. As the second spring 340 is provided in the inner space 302 in which the fuel flows, when the temperature of the flowing-in fuel becomes high, the temperature of the second spring 340 also rises. Accordingly, as the fuel temperature rises, the biasing load on the valve body 300 in the opposite direction to the flow passage direction FD increases. In the present embodiment, it is set such that when the fuel temperature is lower than the vapor generation temperature, the force of the second spring 340 to push the valve body 300 in the opposite direction to the flow passage direction FD is equal to or smaller than the force of the first spring 330 to push the valve body 300 in the flow passage direction FD. When the fuel temperature is equal to or higher than the vapor generation temperature, the force of the second spring 340 to push the valve body 300 in the opposite direction to the flow passage direction FD is larger than the force of the first spring 330 to push the valve body 300 in the flow passage direction FD. With this control of the magnitude of biasing load of the first spring 330 and the second spring 340, at a low temperature, the valve body 300 is pushed in the flow passage direction FD with the total biasing load of the first spring 330 and the second spring 340, and pressed against the inner wall surface W1 of the housing 301 as shown in FIG. 2. With this configuration, the outflow 304 is blocked with the recess 323. On the other hand, at a high temperature, the valve body 300 is pushed in the opposite direction to the flow passage direction FD with the total biasing load of the first spring 330 and the second spring 340, and the gap GP1 occurs between the valve body 300 and the inner wall surface W1 as shown in FIG. 4. The above-described control of the magnitude of biasing load of the first spring 330 and the second spring 340 is realized by previously controlling thickness, number of turns, and diameter of at least one of the first spring 330 and the second spring 340, by e.g. experiment or the like.

Figure 5:
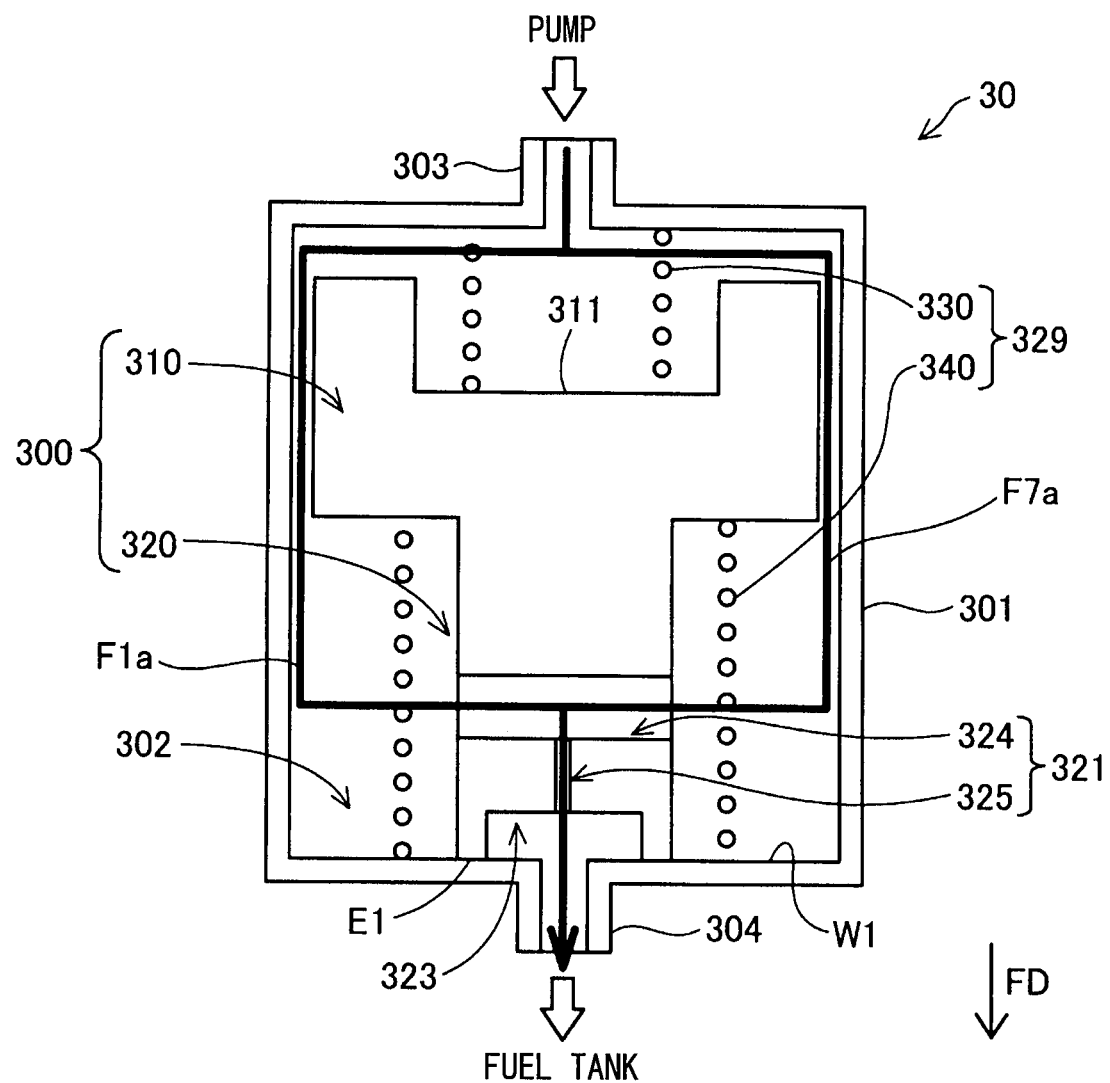
FIG. 5 is an explanatory diagram showing an inner passage at a low temperature according to the first embodiment.

A3 Details of Inner Passage:

As indicated with a bold solid arrow in FIG. 5, an inner passage F1a is formed in the inner space 302 at a low temperature. In the inner passage F1a, the fuel flows from the inflow 303 through a gap (cylindrical gap) outside of the partition 310 in the radially outer direction toward the flow passage direction FD, into the first through hole forming portion 324. Then the fuel flows from the first through hole forming portion 324 into the second through hole forming portion 325, and through recess 323, to the outflow 304.

Note that the inner passage F1a corresponds to a subordinate concept of the low-temperature passage in the present disclosure.

In the present embodiment, the flow rate of the fuel which flows through the inner passage F1a at a low temperature is determined in consideration of cooling of the pump 10 and removal of foreign materials bitten in the impeller of the pump 10. Hereinbelow, this will be described more particularly. In the fuel supply apparatus 100 according to the present embodiment, even when the target supply pressure and the target injection amount are lower than a predetermined amount, the pump 10 is cooled with the fuel by obtaining the flow rate of the fuel pumped up with the pump 10 equal to or higher than a predetermined flow rate (hereinafter, referred to as "pump cooling flow rate"). Then the flow rate of the fuel flowing through the inner passage F1a at a low temperature is determined such that the fuel is discharged from the flow control valve 30 by a difference between the pump cooling flow rate and a supply flow rate to the high-pressure pump device 200 obtained from the target injection amount. Further, when the rotation speed of the pump 10 is low, foreign materials are easily bitten in the impeller. Accordingly, in the fuel supply apparatus 100 according to the present embodiment, even when the target supply pressure and the target injection amount are lower than a predetermined amount, the biting of the foreign materials in the impeller is avoided by increasing the rotary torque of the impeller by obtaining the flow rate of the fuel pumped up with the pump 10 equal to or higher than a predetermined flow rate (hereinafter, referred to as "foreign material biting avoidance flow rate"). Then the flow rate of flowing through the inner passage F1a at a low temperature is determined such that the fuel is discharged from the flow control valve 30 by a difference between the foreign material biting avoidance flow rate and supply flow rate to the high-pressure pump device 200 obtained from the target injection amount. Generally, the foreign material biting avoidance flow rate is higher than the pump cooling flow rate. Accordingly, by setting the flow control valve 30 such that the amount of fuel discharged from the pump 10 is equal to or higher than the foreign material biting avoidance flow rate (and lower than the vapor lock avoiding flow rate) at a low temperature, the cooling of the pump 10 and the foreign material biting avoidance flow rate are realized. Note that the vapor lock avoiding is higher than the foreign material biting avoidance flow rate.

Figure 6:
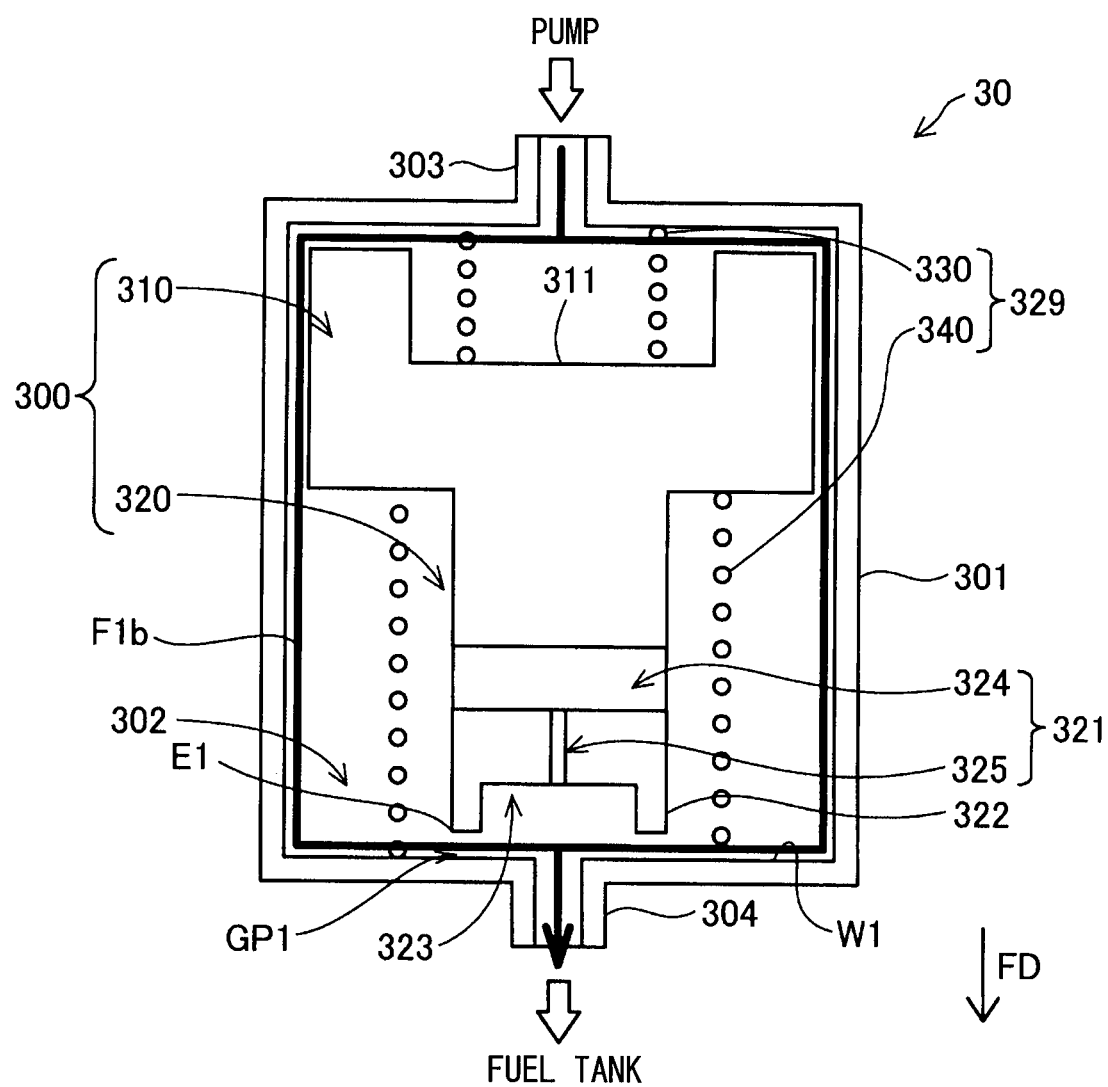
FIG. 6 is an explanatory diagram showing the inner passage at a high temperature according to the first embodiment.

As indicated with a bold solid arrow in FIG. 6, an inner passage F1b is formed in the inner space 302 at a high temperature. In the inner passage F1b, the fuel flows from the inflow 303 through the gap (cylindrical gap) outside of the partition 310 in the radially outer direction toward the flow passage direction FD, into the recess 323 from the gap GP1. Then the fuel flows through the recess 323 to the outflow 304. Note that the inner passage F1b corresponds to a subordinate concept of the high-temperature passage in the present disclosure. The cooling of the pump 10, the foreign material biting avoidance, and the vapor lock avoidance are realized by setting the flow control valve 30 such that the amount of fuel discharged from the pump 10 is equal to or higher than the vapor lock avoiding flow rate at a high temperature.

As shown in FIG. 4, a flow passage cross-sectional area S1 in the first through hole forming portion 324, a flow passage cross-sectional area S2 in the second through hole forming portion 325, and a flow passage cross-sectional area S3 of the outflow 304 have relationship in the following expression (1). Further, a flow passage cross-sectional area S4 of the gap GP1 and the flow passage cross-sectional area S3 of the outflow 304 have relationship in the following expression (2). Note that the flow passage cross-sectional area of the gap GP1 is an area of a band and ring-shaped region.

$$S1 > S3 > S2 \qquad (1)$$

$$S4 > Sd \qquad (2)$$

The above-described flow passage cross-sectional area means a cross-sectional area in a direction intersecting with the flowing direction of the fuel. Note that the intersecting direction includes, in addition to the orthogonal direction, a wide meaning including shifted crossing with respect to the flowing direction of the fuel by angle within a predetermined angle range with reference to 90°. As the predetermined angle range, it may be a range of e.g. $-10°$ to $+10°$. Note that as the flow passage cross-sectional areas of the first through hole forming portion 324, the second through hole forming portion 325, the outflow 304, and the gap GP1 are respectively fixed, the above-described flow passage cross-sectional areas S1, S2, S3, and S4 may be a minimum flow passage cross-sectional area in the respective elements. The flow passage cross-sectional area of the gap (cylindrical shaped gap) outside of the partition 310 in the radially outer direction is larger than the above-described respective flow passage cross-sectional areas S1, S2, S3 and S4.

From the relationship in the above-described expression (1), the flow passage cross-sectional area S2 of the second through hole forming portion 325 corresponds to the minimum flow passage cross-sectional area of the inner passage F1a at a low temperature shown in FIG. 5. Further, the flow passage cross-sectional area S3 of the outflow 304 corresponds to the minimum flow passage cross-sectional area of the inner passage F1b at a high temperature shown in FIG. 6. Accordingly, from the above-described expressions (1) and (2), the minimum flow passage cross-sectional area of the inner passage F1b at a high temperature is larger than the minimum flow passage cross-sectional area of the inner passage F1a at a low temperature. Note that as the flow rate of the fuel passing through the inner passage is proportional to the minimum flow passage cross-sectional area of the inner passage, the flow rate of the fuel passing through the flow control valve 30 is higher at a high temperature than that at a low temperature. Accordingly, at a high temperature, the flow rate of the fuel returned from the return passage 83 into the fuel tank TK is increased in comparison with that at a low temperature, and the drop amount of supply pressure is large. Accordingly, as described above, the amount of fuel discharged from the pump 10 is increased to be equal to or higher than the vapor lock avoiding flow rate, and vapor lock is avoided. On the other hand, at a low temperature, the occurrence of fuel vapor is suppressed, and the occurrence of vapor lock is suppressed. Accordingly, it is not necessary to discharge the fuel more than the vapor lock avoiding flow rate. Accordingly, the configuration enables to suppress electric power consumption in the pump 10 while suppressing the occurrence of vapor lock by reducing the flow rate of the fuel returned from the return passage 83 into the fuel tank TK in comparison with that at a high temperature.

According to the fuel supply apparatus 100 according to the first embodiment described above, the spring member 329 moves the valve body 300 such that the minimum flow passage cross-sectional area at a high temperature is larger than the minimum flow passage cross-sectional area at a low temperature. Accordingly, the configuration enables to increase the flow rate in the return passage 83 in a situation where the fuel vapor occurs. Accordingly, in the situation where fuel vapor does not occur, the increase in rotation speed of the pump 10 for the purpose of vapor lock avoidance is not performed. In the situation where fuel vapor occurs, the configuration enables to perform the increase in the rotation speed of the pump 10, and the configuration enables to suppress wasteful electric power consumption for driving the pump 10 for the purpose of vapor lock avoidance. In addition, the flow control valve 30 moves the valve body 300 using the spring member 329 such that the minimum flow passage cross-sectional area when the fuel temperature is equal to or higher than the vapor generation temperature is larger than the minimum flow passage cross-sectional area when the fuel temperature is lower than the vapor generation temperature. Accordingly, in comparison with a case where the valve device is formed with an electromagnetic valve, the configuration enables to suppress the manufacturing cost of the fuel supply apparatus 100.

Further, at a high temperature, the configuration enables to cause the fuel to flow through the outflow 304 having a cross-sectional area larger than the cross-sectional area S2 of the second through hole forming portion 325 and the inner passage F1b having the gap GP1. It is possible to increase the flow rate in the return passage 83. Further, at a low temperature, the configuration enables to cause the fuel to flow through the inner passage F1b including the second through hole forming portion 325. It is possible to reduce the flow rate in the return passage 83. In addition, as an outflow to cause the fuel to flow out from the housing 301, the low-temperature flow passage and the high-temperature flow passage share the outflow 304. Accordingly, the configuration enables to easily control the flow rate in comparison with a configuration having respectively independent plural outflows.

Further, in the fuel supply apparatus 100, the flow passage cross-sectional area S1 in the first through hole forming portion 324, the flow passage cross-sectional area S2 in the second through hole forming portion 325, and the flow passage cross-sectional area S3 of the outflow 304 have relationship in the above-described expression (1). The flow passage cross-sectional area S4 of the gap GP1 and the flow passage cross-sectional area S3 of the outflow 304 have the above-described expression (2). Accordingly, the configuration enables to easily control the lowest flow rate in the low-temperature flow passage by controlling the minimum flow passage cross-sectional area S2 of the second through hole forming portion 325. Further, the configuration enables to control the lowest flow rate in the high-temperature flow passage by controlling the minimum flow passage cross-sectional area S3 of the outflow 304.

Further, as the spring member 329 is configured with the first spring 330 as a bias spring provided on the fuel inflow side, and the second spring 340 as a shape-memory alloy spring provided on the fuel outflow side, the configuration enables to suppress the manufacturing cost of the fuel supply apparatus 100 in comparison with the configuration where the valve device is formed with an electromagnetic valve.

B. Second Embodiment

The fuel supply apparatus 100 according to a second embodiment is different from the fuel supply apparatus 100 according to the first embodiment in that a flow control valve 30a is provided in place of the flow control valve 30. Since other constituent elements in the fuel supply apparatus 100 according to the second embodiment are the same as those of the fuel supply apparatus 100 according to the first embodiment, the same constituent elements will have the same reference numerals, and detailed explanations of the elements will be omitted.

Figure 7:
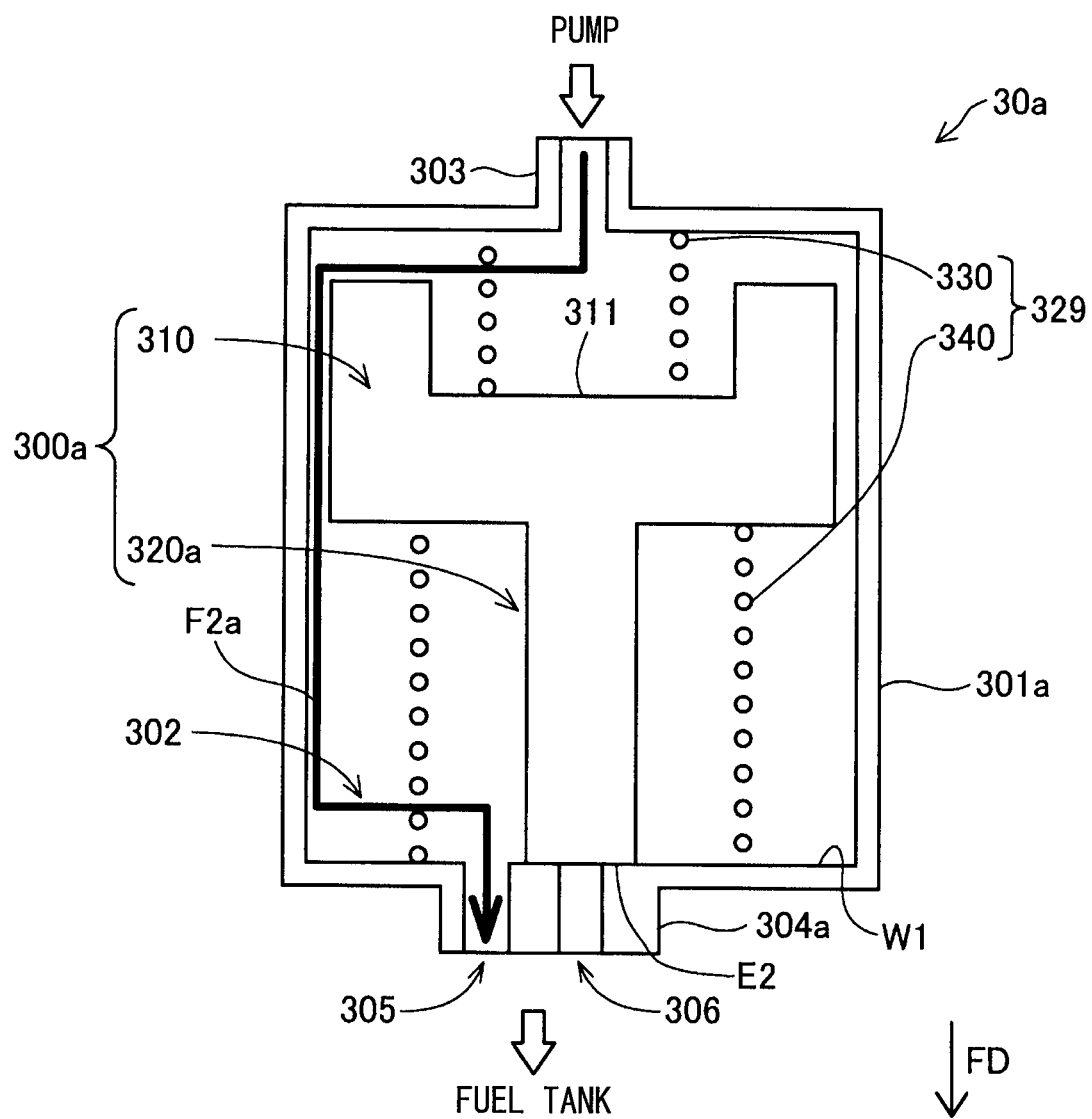
FIG. 7 is an explanatory diagram showing a schematic configuration of the flow control valve and the inner passage at a low temperature according to a second embodiment.
Figure 8:
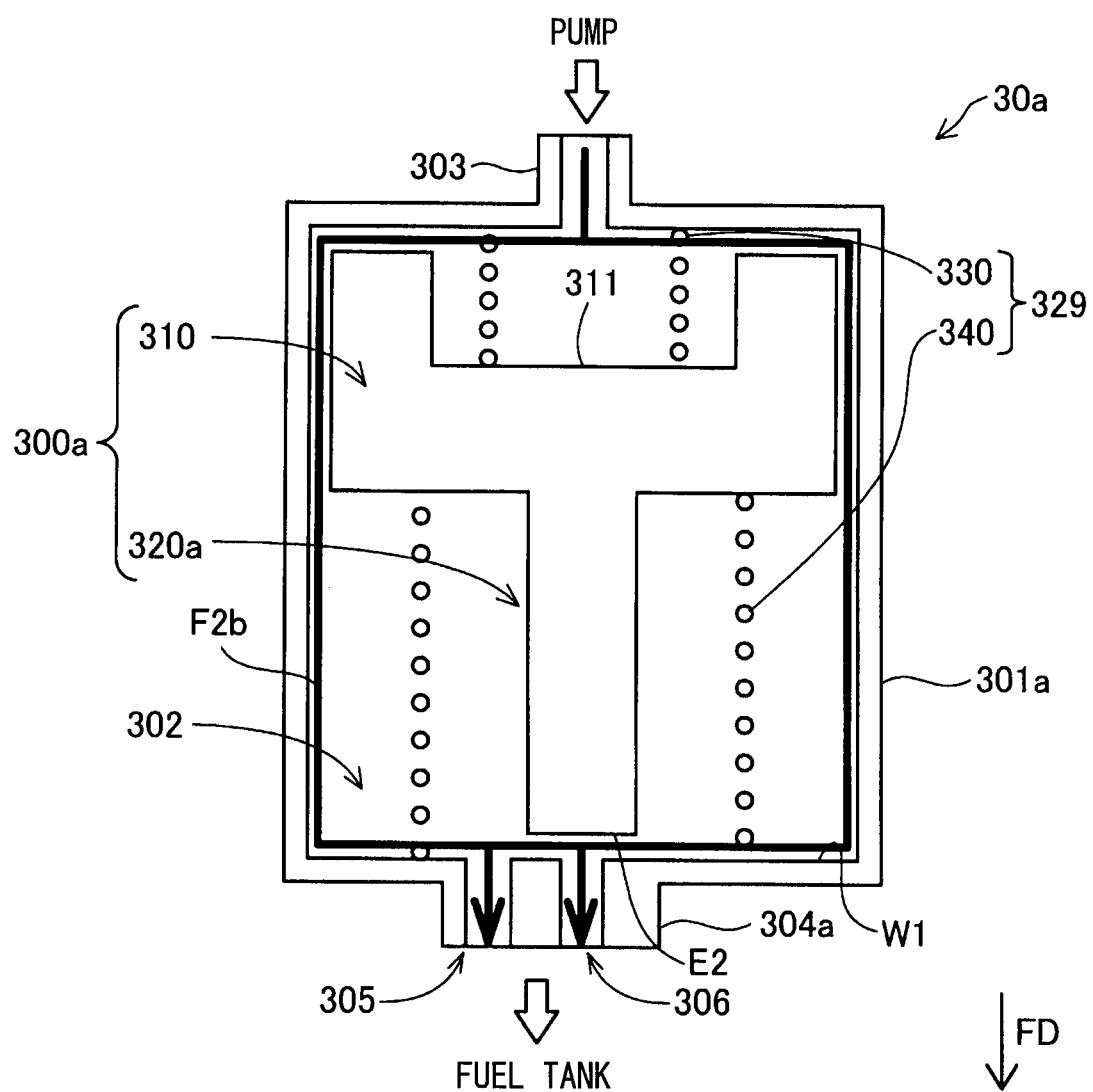
FIG. 8 is an explanatory diagram showing the schematic configuration of the flow control valve and the inner passage at a high temperature according to the second embodiment.

As shown in FIG. 7 and FIG. 8, the flow control valve 30a according to the second embodiment is different from the flow control valve 30 according to the first embodiment in that a housing 301a is provided in place of the housing 301 and a valve body 300a is provided in place of the valve body 300. Since other constituent elements in the flow control valve 30a are the same as those of the flow control valve 30, the same constituent elements will have the same reference numerals, and detailed explanations of the elements will be omitted. Note that in FIG. 7, an inner passage F1a at a low temperature is indicated with a bold solid arrow. Further, in FIG. 8, an inner passage F2b at a high temperature is indicated with a bold solid arrow.

The housing 301a is different from the housing 301 according to the first embodiment only in that an outflow 304a is provided in place of the outflow 304. The outflow 304a has a first outflow 305 and a second outflow 306. The first outflow 305 and the second outflow 306 are both formed as a cylindrical hole. The first outflow 305 and the second outflow 306 are formed in parallel to each other along the flow passage direction FD. In the present embodiment, the flow passage cross-sectional area of the first outflow 305 and the flow passage cross-sectional area of the second outflow 306 are equal to each other.

The valve body 300a has the partition 310 and a blockage protrusion 320a. Since the partition 310 is the same as the partition 310 according to the first embodiment, a detailed explanation of the partition will be omitted. The blockage protrusion 320a is different from the blockage protrusion 320 according to the first embodiment in that the through hole 321 and the recess 323 are not formed and the diameter is small.

As shown in FIG. 7, at a low temperature, a blockage end E2 of the blockage protrusion 320a in the flow passage direction FD is in contact with the inner wall surface W1 of the housing 301. At this time, the blockage end E2 blocks the second outflow 306. Note that at this time, the blockage end E2 does not block the first outflow 305. Accordingly, as shown in FIG. 7, in the inner passage F1a at a low temperature, the fuel flows from the inflow 303 through the gap (cylindrical gap) outside of the partition 310 in the radially outer direction toward the flow passage direction FD, to the first outflow 305.

On the other hand, as shown in FIG. 8, at a high temperature, the valve body 300a moves in the opposite direction to the flow passage direction FD, and a gap occurs between the blockage end E2 of the blockage protrusion 320a and the inner wall surface W1 of the housing 301. Accordingly, in the inner passage F1b at a high temperature, the fuel flows from the inflow 303 through the gap outside of the partition 310 in the radially outer direction toward the flow passage direction FD, to the first outflow 305 and the second outflow 306. That is, in the fuel supply apparatus 100 according to the second embodiment, at a high temperature, the fuel is discharged from the two outflows 305 and 306. Accordingly, the flow passage through the first outflow 305 communicates the return passage 83 and the fuel tank TK with each other regardless of high/low temperature of the fuel temperature.

Note that the minimum flow passage cross-sectional area of the inner passage F1a at a low temperature is a cross-sectional area of the first outflow 305. Further, the minimum flow passage cross-sectional area of the inner passage F1b at a high temperature is a total cross-sectional area of the cross-sectional area of the first outflow 305 and the cross-sectional area of the second outflow 306. Accordingly, in the second embodiment, the minimum flow passage cross-sectional area at a high temperature is larger than the minimum flow passage cross-sectional area at a low temperature. Note that the flow passage passing through the first outflow 305, in other words, the inner passage F1a corresponds to a subordinate concept of the first flow passage in the present disclosure. Further, in the inner passage F1b, the flow passage passing through the second outflow 306 corresponds to a subordinate concept of the second flow passage in the present disclosure.

The fuel supply apparatus 100 according to the second embodiment described above has similar advantages to those of the fuel supply apparatus 100 according to the first embodiment. In addition, at a high temperature, since the flow passage passing through the second outflow 306 in addition to the flow passage passing through the first outflow 305 is used as a fuel passage, the configuration enables to increase the flow rate in the return passage 83. Further, at a low temperature, since only the flow passage passing through the first outflow 305 is used as a fuel passage, from the flow passage passing through the first outflow 305 and flow passage passing through the second outflow 306, the configuration enables to reduce the flow rate in the return passage 83. Further, as a fuel passage is not formed in the valve body 300a, the configuration enables to suppress influence on the movement of the valve body 300a with the fuel passing through such a flow passage. Accordingly, the configuration enables to reduce the hysteresis of temperature with respect to opening/closing (occurrence/non-occurrence of blockage) of the second outflow 306.

C. Third Embodiment

The fuel supply apparatus 100 according to a third embodiment is different from the fuel supply apparatus 100 according to the first embodiment in that a flow control valve 30b is provided in place of the flow control valve 30. Since other constituent elements in the fuel supply apparatus 100 according to the third embodiment are the same as those of the fuel supply apparatus 100 according to the first embodiment, the same constituent elements will have the same reference numerals, and detailed explanations of the elements will be omitted.

Figure 9:
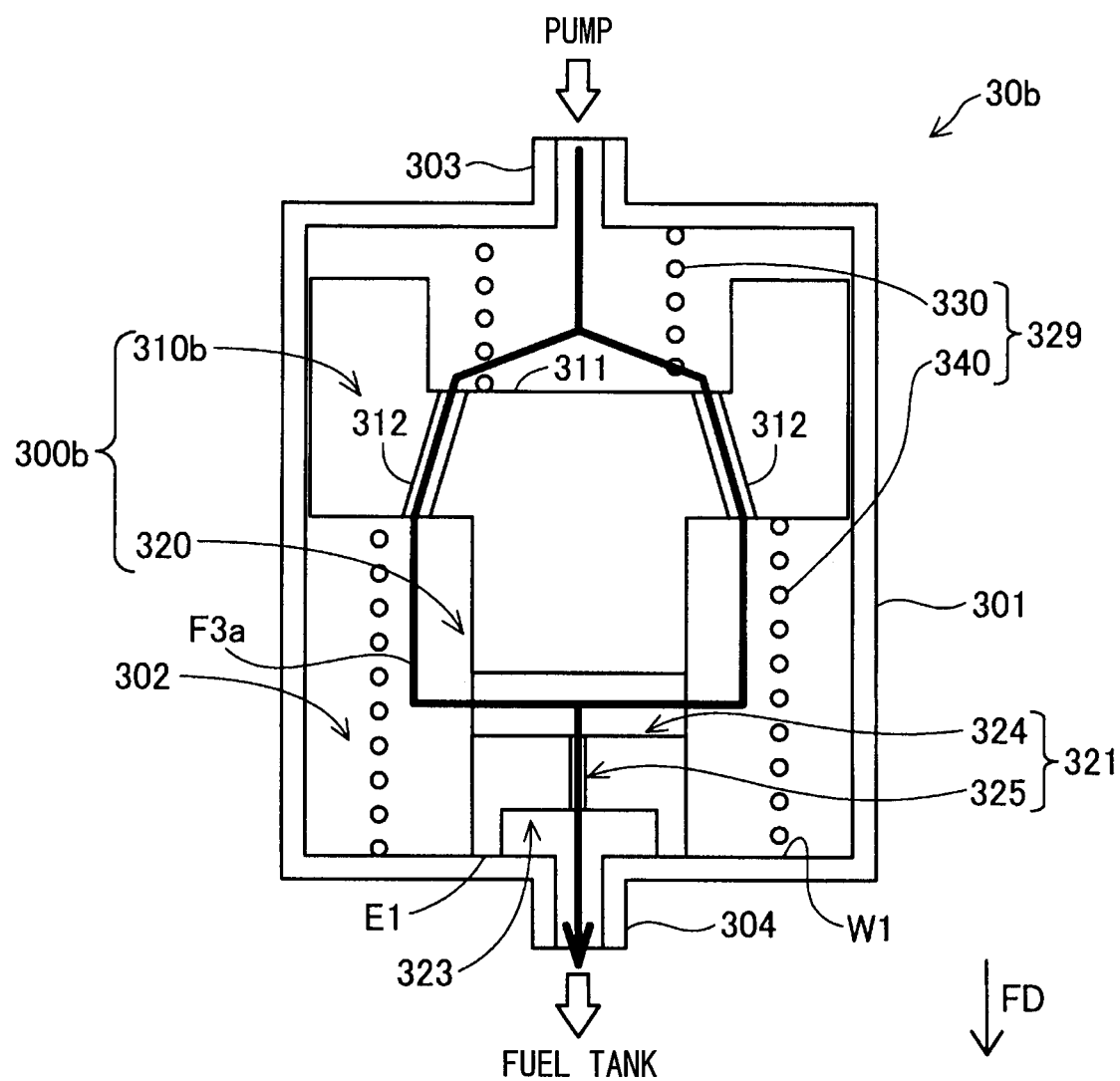
FIG. 9 is an explanatory diagram showing a schematic configuration of the flow control valve and the inner passage at a low temperature according to a third embodiment.
Figure 10:
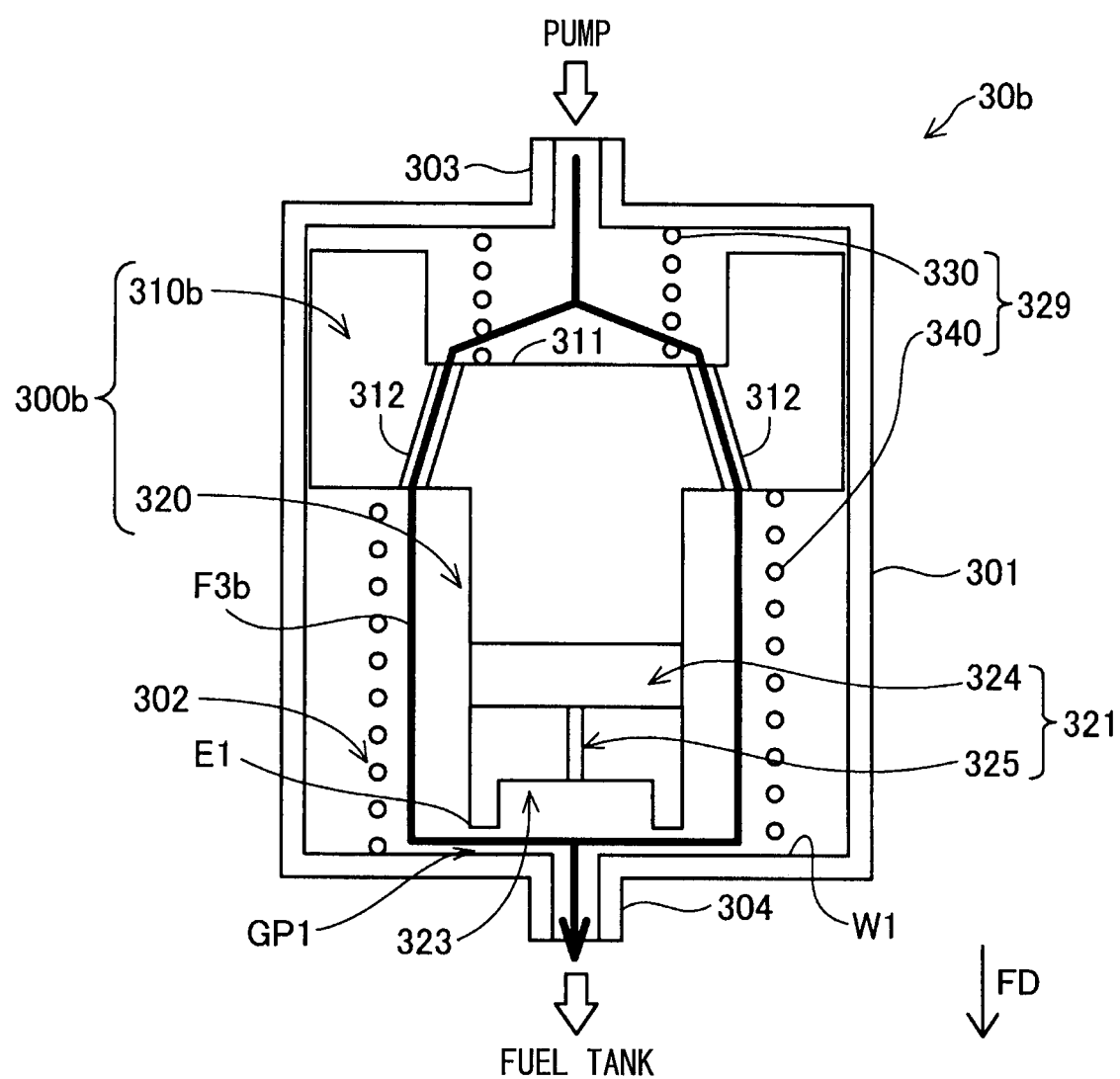
FIG. 10 is an explanatory diagram showing the schematic configuration of the flow control valve and the inner passage at a high temperature according to the third embodiment.

As shown in FIG. 9 and FIG. 10, the flow control valve 30b according to the third embodiment is different from the flow control valve 30 according to the first embodiment in that a valve body 300b is provided in place of the valve body 300. Since other constituent elements in the flow control valve 30b are the same as those of the flow control valve 30, the same constituent elements will have the same reference numerals, and detailed explanations of the elements will be omitted. Note that in FIG. 9, an inner passage F3a at a low temperature is indicated with a bold solid arrow. Further, in FIG. 10, an inner passage F3b at a high temperature is indicated with a bold solid arrow.

The valve body 300b has a partition 310b in place of the partition 310. The partition 310b is different from the partition 310 according to the first embodiment in that the size in the radial direction is larger and plural through holes 312 are formed. Other constituent elements are the same as those of the partition 310. The size of the partition 310b in the radial direction is larger than that of the partition 310 according to the first embodiment, and the gap between the partition 310b and the inner wall surface of the housing 301 is very small. For example, the gap may be equal to or smaller than 1 mm (millimeter). Accordingly, different from the first embodiment, at any of low temperature and high temperature, the gap outside of the partition 310b in the radial direction is almost not used as an inner passage. Further, as the gap between the partition 310b and the inner wall surface of the housing 301 is very small, upon movement of the valve body 300b in the flow passage direction FD and its opposite direction, inclination of the valve body 300b is suppressed. Accordingly, the configuration enables to stabilize the flow rate of the fuel passing through the flow control valve 30b.

The plural through holes 312 formed in the partition 310b are provided in a ring shape at a predetermined interval around the blockage protrusion 320 in the partition 310b. The through holes 312 respectively communicate the inflow side region and the outflow side region with each other in the inner space 302. More particularly, in the respective through holes 312, one end is exposed to the recess 311, and the other end is exposed to space outside of the blockage protrusion 320 in the radial direction in the inner space 302. In the through hole 312, an opening on the outflow side is formed in a position close to a part in contact with one end of the second spring 340. Further, in the present embodiment, the respective through holes 312 are formed along the flow passage direction FD gradually toward the outside in the radial direction. Note that the respective through holes 312 may be formed in parallel to the flow passage direction FD. Further, the through holes may be formed along the flow passage direction FD gradually toward the inside in the radial direction. The through hole 312 corresponds to a subordinate concept of the first through hole in the present disclosure.

As shown in FIG. 9, at a low temperature, the inner passage F3a is formed. At a low temperature, the blockage end E1 of the blockage protrusion 320b, having an end surface in the flow passage direction FD, is in contact with the inner wall surface W1 of the housing 301. At this time, the blockage end E1 blocks the outflow 304. Accordingly, as shown in FIG. 9, in the inner passage F3a at a low temperature, the fuel flows from the inflow 303 toward the recess 311, through the through hole 312, to space outside of the blockage protrusion 320 in the radial direction. Further, the fuel flows from the space outside of the blockage protrusion 320 in the radial direction into the through hole 321, and through recess 323, to the outflow 304.

As shown in FIG. 10, at a high temperature, the inner passage F3b is formed. At a high temperature, the valve body 300b moves in the opposite direction to the flow passage direction FD, and the gap GP1 occurs between the blockage end E1 of the blockage protrusion 320 and the inner wall surface W1 of the housing 301. Accordingly, in the inner passage F3b at a high temperature, the fuel flows from the inflow 303 toward the recess 311, and through the through hole 312, to the space outside of the blockage protrusion 320 in the radial direction. Further, the fuel flows from the space outside of the blockage protrusion 320 in the radial direction, through the gap GP1 between the blockage end E1 and the inner wall surface W1, to the outflow 304. The fuel, passing through the through hole 312 to the space outside of the blockage protrusion 320 in the radial direction, flows along the second spring 340 in the flow passage direction FD. Accordingly, the heat of the fuel is easily conducted to the second spring 340.

Note that the total flow passage cross-sectional area of the plural through holes 312 is larger than the flow passage cross-sectional area of the second through hole forming portion 325. Accordingly, the dimensional relationship between the minimum flow passage cross-sectional area of the inner passage F3a at a low temperature and the minimum flow passage cross-sectional area of the inner passage F3b at a high temperature is the same as that in the first embodiment.

The fuel supply apparatus 100 according to the third embodiment described above has similar advantages to those of the fuel supply apparatus 100 according to the first embodiment. In addition, both of the inner passage F3a and the inner passage F3b at a low temperature include the through holes 312 provided around the blockage protrusion 320 in the partition 310b. Further, the spring member 329 is formed with the first spring 330 and the second spring 340 which are coil springs having a virtual line VL of the housing 301 as a central axis. Further, the opening of the blockage protrusion 320 on the outflow side is formed in a position in the partition 310b close to a position in contact with the second spring 340. With the configuration, the configuration enables to bring the second spring 340 into contact with much fuel, and the configuration enables to easily conduct the heat of the fuel to the second spring 340. Accordingly, the configuration enables to improve responsiveness of change of the flow rate of the fuel discharged from the flow control valve 30b with respect to change of fuel temperature.

Further, as the gap between the partition 310b and the inner wall surface of the housing 301 is very small, upon movement of the valve body 300b in the flow passage direction FD and its opposite direction, the configuration enables to suppress inclination of the valve body 300b, and stabilize the flow rate of the fuel passing through the flow control valve 30b.

D. Fourth Embodiment

The fuel supply apparatus 100 according to a fourth embodiment is different from the fuel supply apparatus 100 according to the first embodiment in that a flow control valve 30c is provided in place of the flow control valve 30. Since other constituent elements in the fuel supply apparatus 100 according to the fourth embodiment are the same as those of the fuel supply apparatus 100 according to the first embodiment, the same constituent elements will have the same reference numerals, and detailed explanations of the elements will be omitted.

Figure 11:
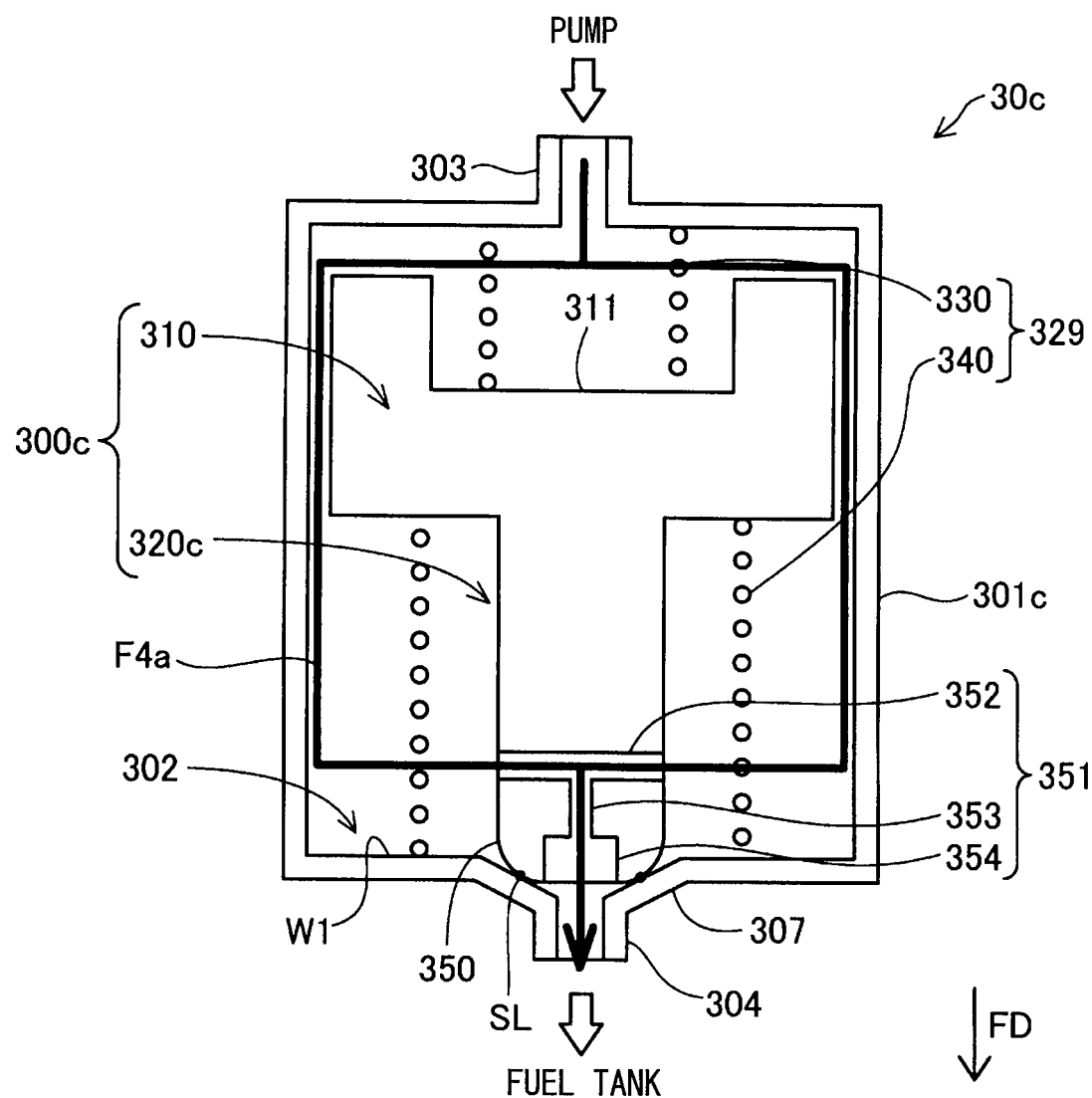
FIG. 11 is an explanatory diagram showing a schematic configuration of the flow control valve and the inner passage at a low temperature according to a fourth embodiment.
Figure 12:
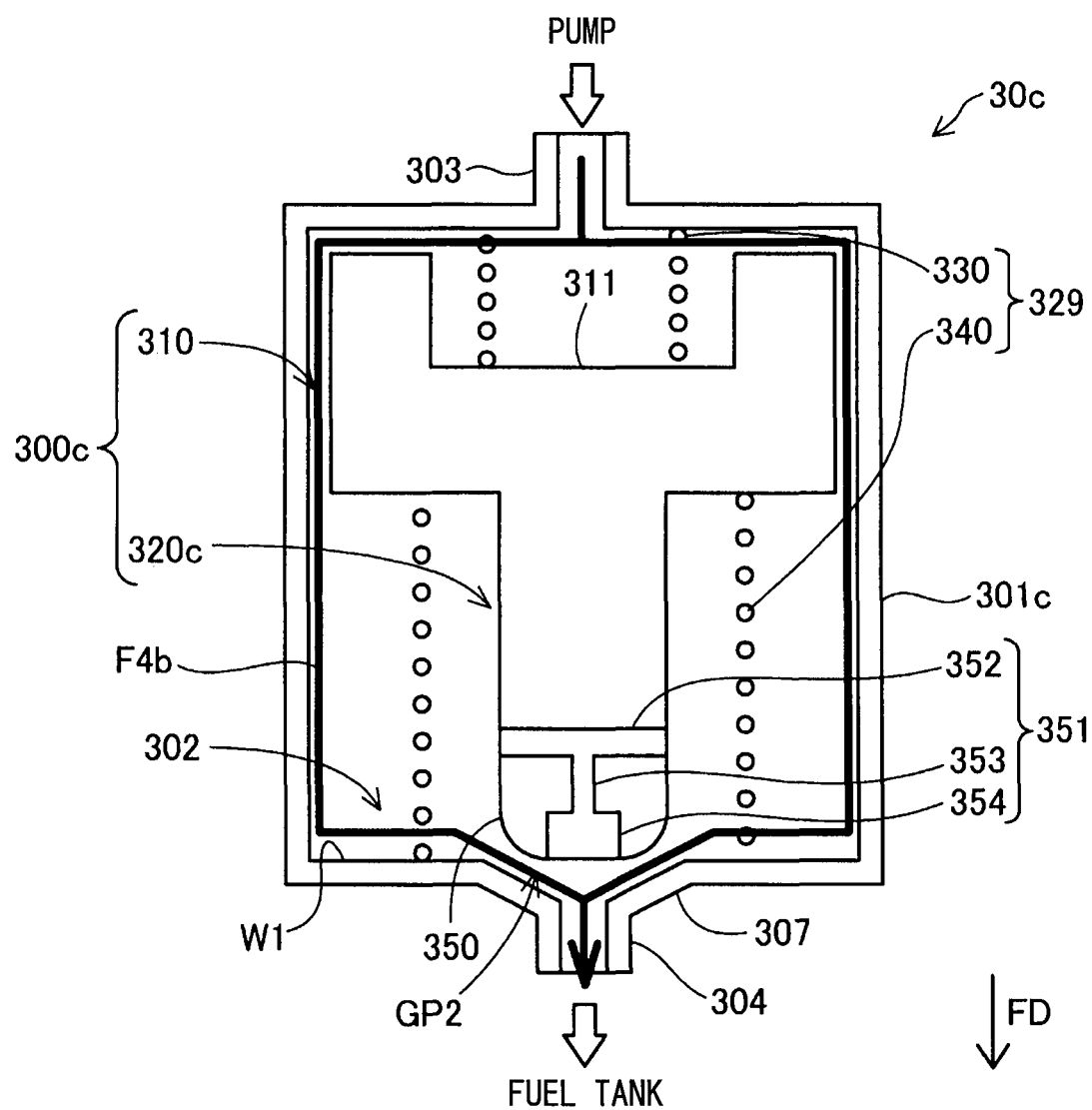
FIG. 12 is an explanatory diagram showing the schematic configuration of the flow control valve and the inner passage at a high temperature according to the fourth embodiment.

As shown in FIG. 11 and FIG. 12, the flow control valve 30c according to the fourth embodiment is different from the flow control valve 30 according to the first embodiment in that a housing 301c is provided in place of the housing 301 and a valve body 300c is provided in place of the valve body 300. Since other constituent elements in the flow control valve 30c are the same as those of the flow control valve 30, the same constituent elements will have the same reference numerals, and detailed explanations of the elements will be omitted. Note that in FIG. 11, an inner passage F4a at a low temperature is indicated with a bold solid arrow. Further, in FIG. 12, an inner passage F4b at a high temperature is indicated with a bold solid arrow.

The housing 301c is different from the housing 301 according to the first embodiment only in that a valve body facing part 307 is provided. The valve body facing part 307, surrounding the outflow 304, faces the valve body 300c. The valve body facing part 307 is formed in a tapered shape in which the closer to the valve body, the more an opening cross-sectional area is 300c. In the valve body facing part 307, the end in the flow passage direction FD is connected to the outflow 304.

The valve body 300c is different from the valve body 300 according to the first embodiment only in that a blockage protrusion 320c is provided in place of the blockage protrusion 320. The blockage protrusion 320c has a blockage end 350 at the end in the flow passage direction FD. The blockage end 350 has a spherical external shape. As shown in FIG. 11, at a low temperature, the blockage end 350 is in contact with the valve body facing part 307, and a ring-shaped seal line SL is formed in the contact part between the blockage end 350 and the valve body facing part 307. With the seal line SL, blockage is formed between the blockage end 350 and the valve body facing part 307, and the fuel passage from the inner space 302 between the blockage end 350 and the valve body facing part 307 to the outflow 304 is blocked.

A through hole 351 is formed in the blockage protrusion 320c. The through hole 351 has a first through hole forming portion 352, a second through hole forming portion 353, and a third through hole forming portion 354. The first through hole forming portion 352 passes through the blockage protrusion 320c in the radial direction on the inflow side from the blockage end 350. Accordingly, the first through hole forming portion 352 is exposed to the inner space 302 at its both ends. The second through hole forming portion 353 is formed along the flow passage direction FD, and one end communicates with the first through hole forming portion 352, and the other end communicates with the third through hole forming portion 354. The third through hole forming portion 354 is formed along the flow passage direction FD, and one end communicates with the second through hole forming portion 353, and the other end faces the outflow 304 in the blockage end 350. Note that the diameter of the third through hole forming portion 354 is larger than the diameter of the second through hole forming portion 353. The through hole 351 corresponds to a subordinate concept of the third through hole in the present disclosure.

As shown in FIG. 11, at a low temperature, the inner passage F4a is formed. At at a low temperature, the blockage end 350 is in contact with the inner wall surface of the valve body facing part 307, and the seal line SL is formed. Accordingly, in the inner passage F4a, the fuel flows from the inflow 303, through the gap (cylindrical gap) outside of the partition 310 in the radially outer direction toward the flow passage direction FD, into the first through hole forming portion 352. Then the fuel flows from the first through hole forming portion 352 into the second through hole forming portion 353, then to the third through hole forming portion 354, in this order, then through the third through hole forming portion 354, to the outflow 304. The minimum flow passage cross-sectional area in the inner passage F4a is a cross-sectional area of the second through hole forming portion 353.

As shown in FIG. 12, at a high temperature, the inner passage F4b is formed. In the inner passage F4b, the fuel flows from the inflow 303 through the gap (cylindrical gap) outside of the partition 310 in the radially outer direction toward the flow passage direction FD, through a gap GP2 between the blockage end 350 and the valve body facing part 307, to the outflow 304. The minimum flow passage cross-sectional area in the inner passage F4b is the minimum flow passage cross-sectional area of the gap GP2, and the minimum flow passage cross-sectional area is larger than the flow passage cross-sectional area of the second through hole forming portion 353.

The fuel supply apparatus 100 according to the fourth embodiment described above has similar advantages to those of the fuel supply apparatus 100 according to the first embodiment. In addition, at a low temperature, the contact part between the blockage end 350 and the valve body facing part 307 forms the ring-shaped seal line SL. As the seal line SL forms blockage between the blockage end 350 and the valve body facing part 307, in comparison with a configuration where the contact part is formed with a surface, the configuration enables to enhance the pressure applied to the contact part. Accordingly, the configuration enables to improve sealability (barrier) between the blockage end 350 and the valve body facing part 307.

E. Fifth Embodiment

The fuel supply apparatus 100 according to a fifth embodiment is different from the fuel supply apparatus 100 according to the first embodiment in that a flow control valve 30d is provided in place of the flow control valve 30. Since other constituent elements in the fuel supply apparatus 100 according to the fifth embodiment are the same as those of the fuel supply apparatus 100 according to the first embodiment, the same constituent elements will have the same reference numerals, and detailed explanations of the elements will be omitted.

Figure 13:
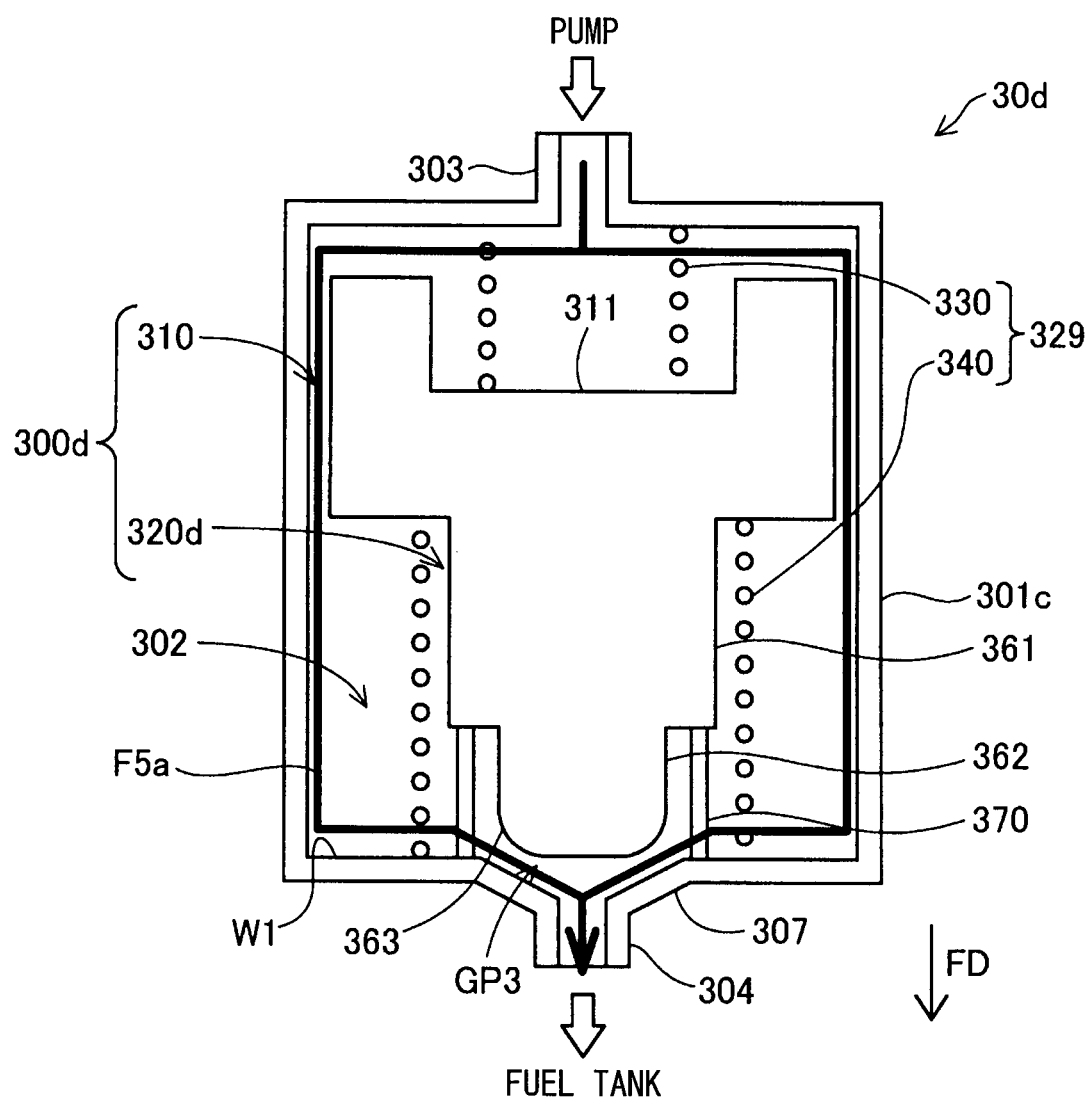
FIG. 13 is an explanatory diagram showing a schematic configuration of the flow control valve and the inner passage at a low temperature according to a fifth embodiment.
Figure 14:
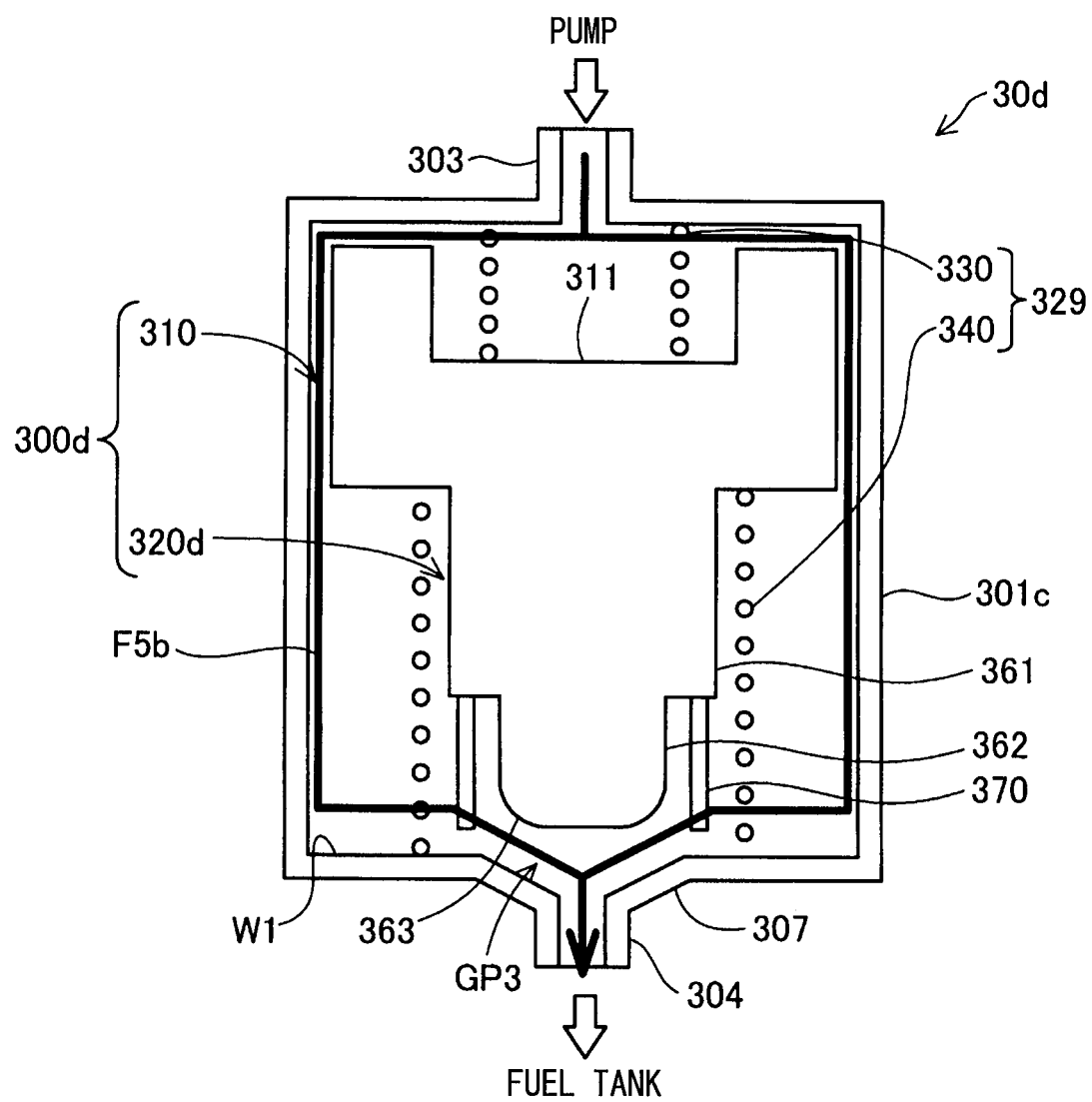
FIG. 14 is an explanatory diagram showing the schematic configuration of the flow control valve and the inner passage at a high temperature according to the fifth embodiment.

As shown in FIG. 13 and FIG. 14, the flow control valve 30d according to the fifth embodiment is different from the flow control valve 30 according to the first embodiment in that the housing 301c is provided in place of the housing 301 and a valve body 300d is provided in place of the valve body 300. Since other constituent elements in the flow control valve 30d are the same as those of the flow control valve 30, the same constituent elements will have the same reference numerals, and detailed explanations of the elements will be omitted. Note that in FIG. 13, an inner passage F5a at a low temperature is indicated with a bold solid arrow. Further, in FIG. 14, an inner passage F5b at a high temperature is indicated with a bold solid arrow. Since the housing 301c is the same as the housing 301c according to the above-described fourth embodiment, detailed explanations of the housing will be omitted.

The valve body 300d is different from the valve body 300 according to the first embodiment only in that a blockage protrusion 320d is provided in place of the blockage protrusion 320 and a stopper 370 is provided.

The blockage protrusion 320d has a large diameter part 361 and a small diameter part 362. In the large diameter part 361, the end in the opposite direction to the flow passage direction FD continues to the partition 310. Further, in the large diameter part 361, the end in the flow passage direction FD continues to the small diameter part 362. The mean diameter of the large diameter part 361 is larger than the mean diameter of the small diameter part 362. In the small diameter part 362, the end in the opposite direction to the flow passage direction FD continues to the large diameter part 361. In the small diameter part 362, an end 363 in the flow passage direction FD faces the valve body facing part 307. The end 363 has a spherical external shape.

The stopper 370 avoids the blockage protrusion 320d from contact with the valve body facing part 307. The stopper 370 is a bar-shaped member provided along the flow passage direction FD, and is connected to the large diameter part 361 at an end in the opposite direction to the flow passage direction FD. In the large diameter part 361, the part to which the stopper 370 is connected is an end surface of the large diameter part 361 in the flow passage direction FD, and is a part outside of the part connected to the small diameter part 362 in the radial direction. In the present embodiment, plural stoppers 370 are arrayed at a predetermined interval along a circumferential direction. As shown in FIG. 13 and FIG. 14, the length of the stopper 370 along the flow passage direction FD is longer than the length of the small diameter part 362 along the flow passage direction FD. Accordingly, as shown in FIG. 11, in a situation where the stopper 370 is in contact with the inner wall surface W1 of the housing 301c at a low temperature, the small diameter part 362, more specifically, the end 363, is not in contact with the valve body facing part 307. Accordingly, as shown in FIG. 13, at a low temperature, a gap GP3 is formed between the end 363 and the valve body facing part 307. Further, as shown in FIG. 12, also at a high temperature, the gap GP3 is formed between the end 363 and the valve body facing part 307.

As shown in FIG. 13, at a low temperature, the inner passage F5a is formed. As described above, at a low temperature, as the stopper 370 is in contact with the inner wall surface W1 of the housing 301c, further movement of the valve body 300d to the flow passage direction FD is suppressed. Then at this time, the above-described gap GP3 is formed. Accordingly, in the inner passage F5a, the fuel flows from the inflow 303 through the gap (cylindrical gap) outside of the partition 310 in the radially outer direction toward the flow passage direction FD, through the gap GP3, to the outflow 304. The minimum flow passage cross-sectional area in the inner passage F5a is the cross-sectional area of the gap GP3.

As shown in FIG. 14, at a high temperature, the inner passage F5b is formed. At a high temperature, as the valve body 300d entirely moves in the opposite direction to the flow passage direction FD, the stopper 370 is away from the inner wall surface W1 of the housing 301c, and the gap GP3 is larger in comparison with that at a low temperature. In the inner passage F5b, the fuel flows through the same route as that in the inner passage F5a at a low temperature as described above. The minimum flow passage cross-sectional area in the inner passage F5b is the flow passage cross-sectional area of the outflow 304 or the cross-sectional area of the gap GP3. In a status where the fuel temperature is very high and the valve body 300d greatly moves in the opposite direction to the flow passage direction FD, the flow passage cross-sectional area of the gap GP3 is larger than the flow passage cross-sectional area of the outflow 304. In this case, the minimum flow passage cross-sectional area of the inner passage F5b is the cross-sectional area of the first outflow 304. On the other hand, when the fuel temperature is a little higher than the vapor generation temperature, the flow passage cross-sectional area of the gap GP3 is smaller than the flow passage cross-sectional area of the outflow 304. Accordingly, in this case, the minimum flow passage cross-sectional area of the inner passage F5b is the flow passage cross-sectional area of the gap GP3. The cross-sectional area of the gap GP3 at a high temperature is larger than the cross-sectional area of the gap GP3 at a low temperature.

The fuel supply apparatus 100 according to the fifth embodiment described above has similar advantages to those of the fuel supply apparatus 100 according to the first embodiment. In addition, as the size of the gap GP3 between the end 363 (valve body 300d) and the valve body facing part 307 varies in correspondence with movement of the valve body 300d, the configuration enables to change the minimum flow passage cross-sectional area of the inner passage. Further, the configuration enables to control the flow rate of the fuel in the return passage 83 at a low temperature by controlling the flow passage cross-sectional area of the gap GP3. At this time, the configuration enables to easily control the flow passage cross-sectional area of the gap GP3 by controlling the length of the stopper 370. Further, the configuration enables to easily control the flow rate of the fuel in the return passage 83 at a high temperature by controlling the size of the flow passage cross-sectional area of the outflow 304.

F. Sixth Embodiment

The fuel supply apparatus 100 according to a sixth embodiment is different from the fuel supply apparatus 100 according to the first embodiment in that a flow control valve 30*e* is provided in place of the flow control valve 30. Since other constituent elements in the fuel supply apparatus 100 according to the sixth embodiment are the same as those of the fuel supply apparatus 100 according to the first embodiment, the same constituent elements will have the same reference numerals, and detailed explanations of the elements will be omitted.

As shown in FIG. 15 to FIG. 18, the flow control valve 30*e* has a housing 301*e*, a valve body 300*e*, and a spring member 329*e*. Note that in FIG. 15 and FIG. 17, a cross section of the flow control valve 30*e* passing through the center of the flow control valve 30*e* and along the flow passage direction FD is shown.

The housing 301*e* has a hollow approximately cube external shape. The housing 301*e* accommodates the valve body 300*e* and the spring member 329*e*. The inflow 303 and the outflow 304*a* are formed in the housing 301*e*. The inflow 303 has the same configuration as that of the inflow 303 according to the first embodiment. The outflow 304*a* has the same configuration as that of the outflow 304*a* according to the second embodiment. That is, the outflow 304*a* has the first outflow 305 and the second outflow 306.

The valve body 300*e* is formed of a plate member having a rectangular shape in a plan view. The valve body 300*e* is in contact with an inner wall surface W2 of the housing 301*e*, and is provided movably in +X direction and −X direction (hereinafter, also simply referred to as "X direction"). The inner wall surface W2 is positioned at an end of the inner wall surface of the housing 301*e* in the flow passage direction FD. Note that an unillustrated guide to guide movement of the valve body 300*e* in the X direction is formed in the inner wall surface W2. The guide may be formed with a rail-shaped groove.

Figure 16:
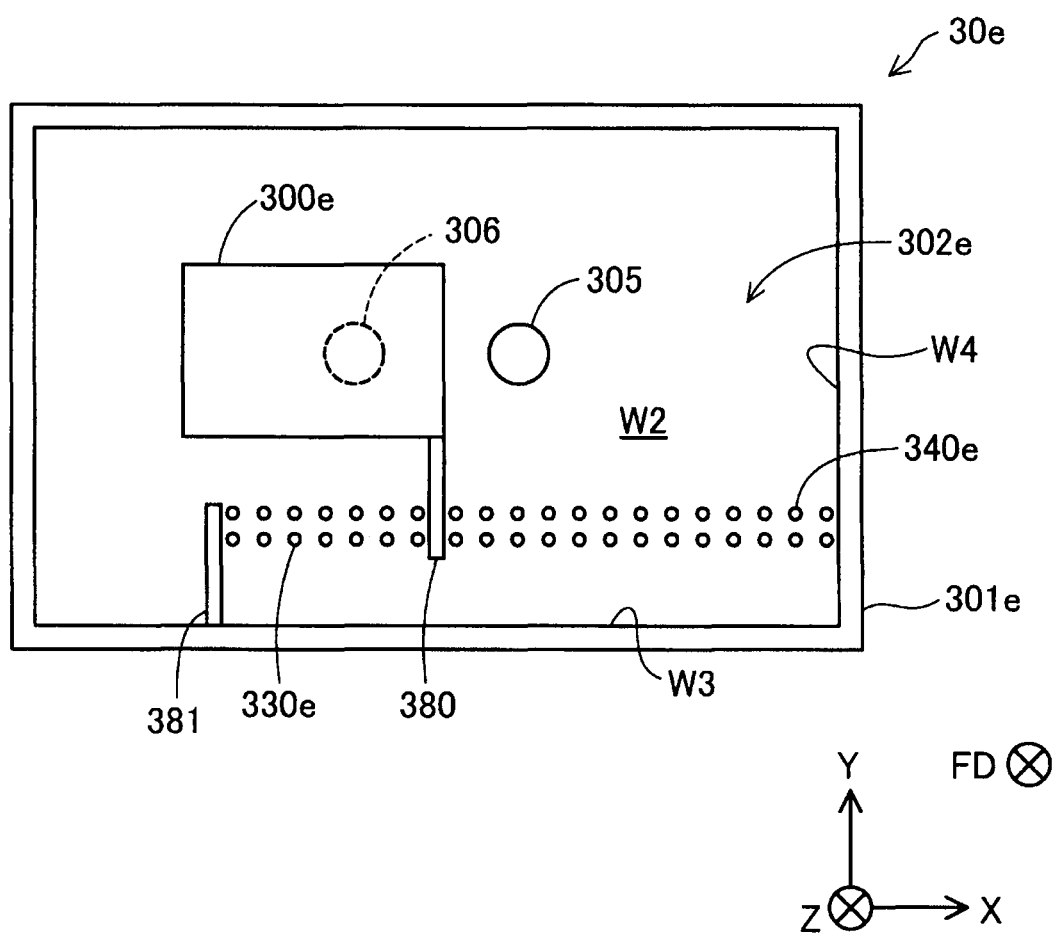
FIG. 16 is an explanatory diagram showing the schematic configuration of the flow control valve at a low temperature according to the sixth embodiment.
Figure 18:
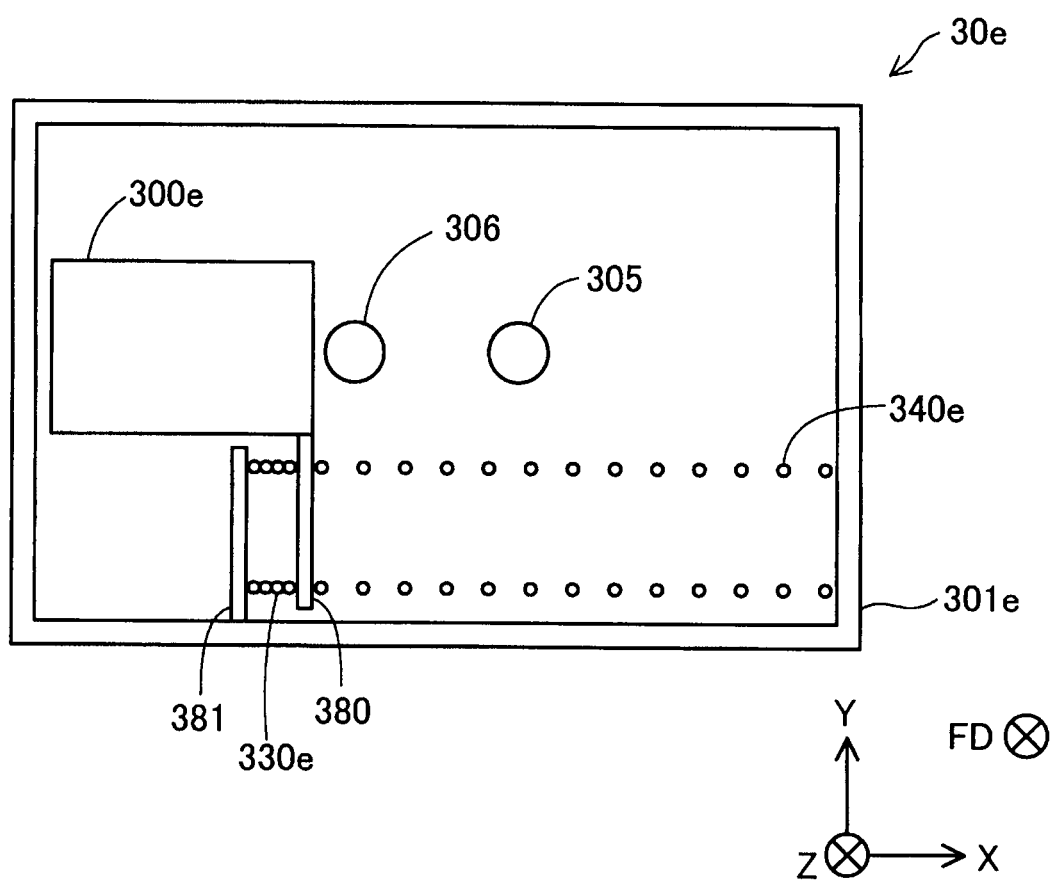
FIG. 18 is an explanatory diagram showing the schematic configuration of the flow control valve at a high temperature according to the sixth embodiment.

As shown in FIG. 16 and FIG. 18, the valve body 300*e* has a load receiver 380 in a position at an end in the +X direction and at an end in a −Y direction. The load receiver 380 receives biasing load from the spring member 329*e* and transmits the biasing load to the valve body 300*e*. The load receiver 380 has a plate external shape, and one surface is in contact with an end of the first spring 330*e* to be described later forming the spring member 329*e*, and the other end is in contact with an end of the second spring 340*e* to be described later forming the spring member 329*e*.

The spring member 329*e* has a first spring 330*e* and a second spring 340*e*. In the first spring 330*e*, one end is in contact with the load receiver 380, and the other end is in contact with a support member 381. The support member 381 has a plate external shape, and provided in a protruded state from the inner wall surface W3 in a +Y direction, so as to be orthogonal to the inner wall surface W3. The inner wall surface W3 is an inner wall surface positioned most in the −Y direction and along the flow passage direction FD, among the inner wall surfaces of the housing 301*e*. The first spring 330*e* pushes the valve body 300*e* via the load receiver 380 in the +X direction. Other constituent elements of the first spring 330*e* are the same as those of the first spring 330 according to the first embodiment.

In the second spring 340*e*, one end is in contact with an inner wall surface W4 of the housing 301*e*, and the other end is in contact with the load receiver 380. The inner wall surface W4 is an inner wall surface positioned most in the +X direction and along the flow passage direction FD, among the inner wall surfaces of the housing 301*e*. The second spring 340*e* pushes the valve body 300*e* via the load receiver 380 in the −X direction. Other constituent elements of the second spring 340*e* are the same as those of the second spring 340 according to the first embodiment.

Figure 15:
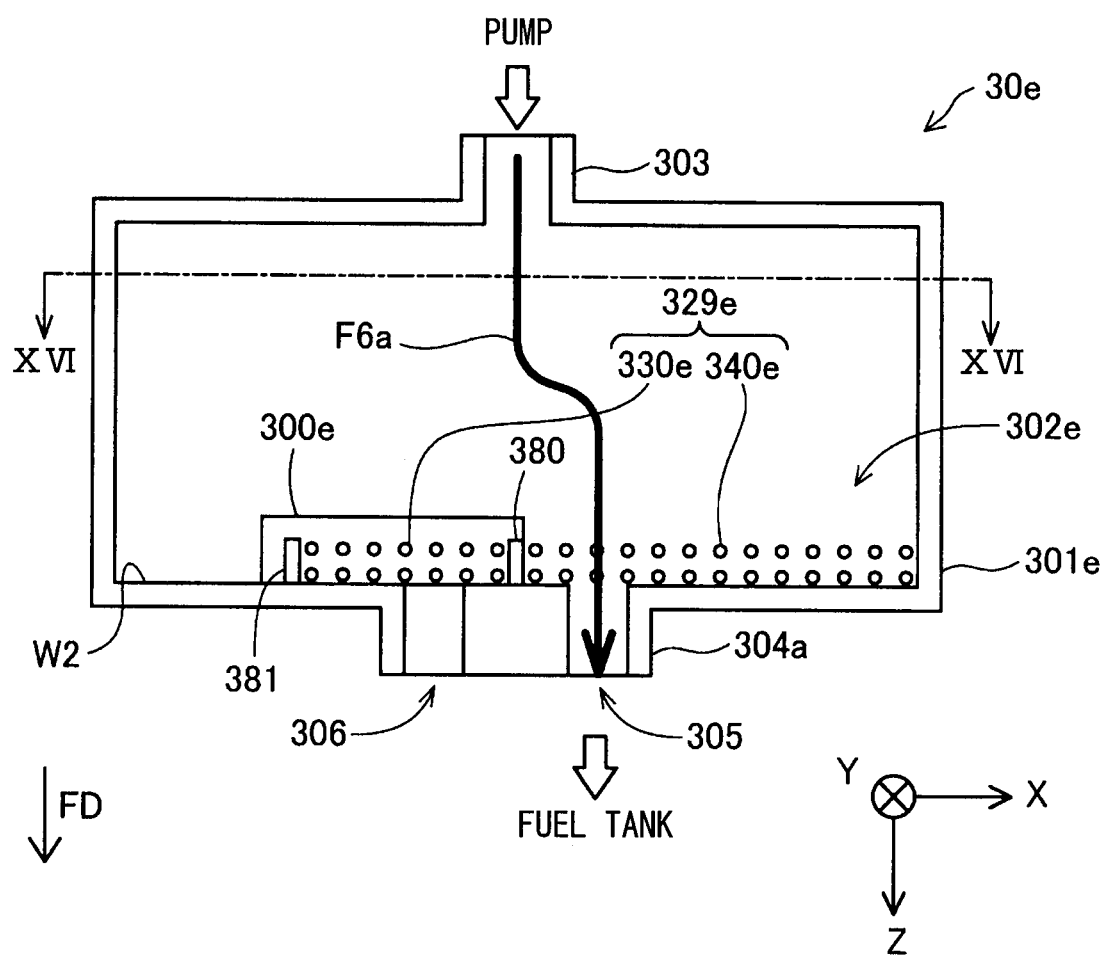
FIG. 15 is an explanatory diagram showing a schematic configuration of the flow control valve and the inner passage at a low temperature according to a sixth embodiment.

As shown in FIG. 15 and FIG. 16, at a low temperature, the valve body 300*e* blocks the second outflow 306, and does not block the first outflow 305. Accordingly, as shown in FIG. 15, in an inner passage F6*a* at a low temperature, the fuel flows from the inflow 303 into the inner space 302*e*, in the flow passage direction FD, to the first outflow 305.

Figure 17:
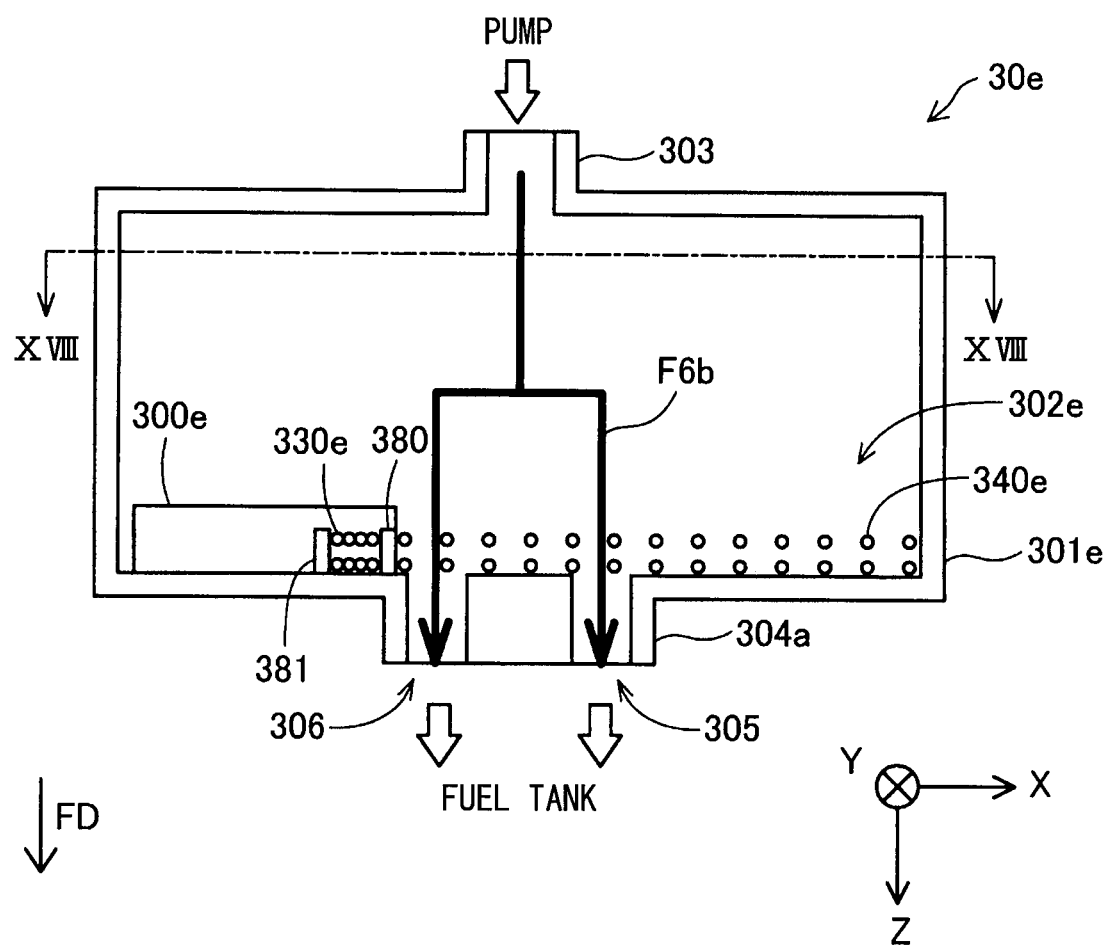
FIG. 17 is an explanatory diagram showing the schematic configuration of the flow control valve and the inner passage at a high temperature according to the sixth embodiment.

As shown in FIG. 17 and FIG. 18, at a high temperature, the valve body 300*e* moves in the −X direction in comparison with the low temperature, and does not block the first outflow 305 and the second outflow 306. Accordingly, as shown in FIG. 17, in an inner passage F6*b* at a high temperature, the fuel flows from the inflow 303 into the inner space 302*e*, in the flow passage direction FD, to the first outflow 305 and the second outflow 306.

Note that the minimum flow passage cross-sectional area of the inner passage F6*a* at a low temperature is a cross-sectional area of the first outflow 305. Further, the minimum flow passage cross-sectional area of the inner passage F6*b* at a high temperature is a total cross-sectional area of the cross-sectional area of the first outflow 305 and the cross-sectional area of the second outflow 306. Accordingly, in the sixth embodiment, the minimum flow passage cross-sectional area at a high temperature is larger than the minimum flow passage cross-sectional area at a low temperature.

The fuel supply apparatus 100 according to the sixth embodiment described above has similar advantages to those of the fuel supply apparatus 100 according to the first embodiment. In addition, at a high temperature, since the flow passage passing through the second outflow 306 in addition to the flow passage passing through the first outflow 305 is used as a fuel passage, the configuration enables to increase the flow rate in the return passage 83. Further, at a low temperature, since only the flow passage passing through the first outflow 305 is used as a fuel passage, from the flow passage passing through the first outflow 305 and flow passage passing through the second outflow 306, the configuration enables to reduce the flow rate in the return passage 83. Further, as a fuel passage is not formed in the valve body 300*e*, the configuration enables to suppress influence on the movement of the valve body 300*e* with the fuel passing through such a flow passage. Accordingly, the configuration enables to reduce the hysteresis of temperature with respect to opening/closing (occurrence/non-occurrence of blockage) of the first outflow 305.

G. Seventh Embodiment

The fuel supply apparatus 100 according to a seventh embodiment is different from the fuel supply apparatus 100 according to the first embodiment in that a flow control valve 30f is provided in place of the flow control valve 30. Since other constituent elements in the fuel supply apparatus 100 according to the seventh embodiment are the same as those of the fuel supply apparatus 100 according to the first embodiment, the same constituent elements will have the same reference numerals, and detailed explanations of the elements will be omitted.

Figure 19:
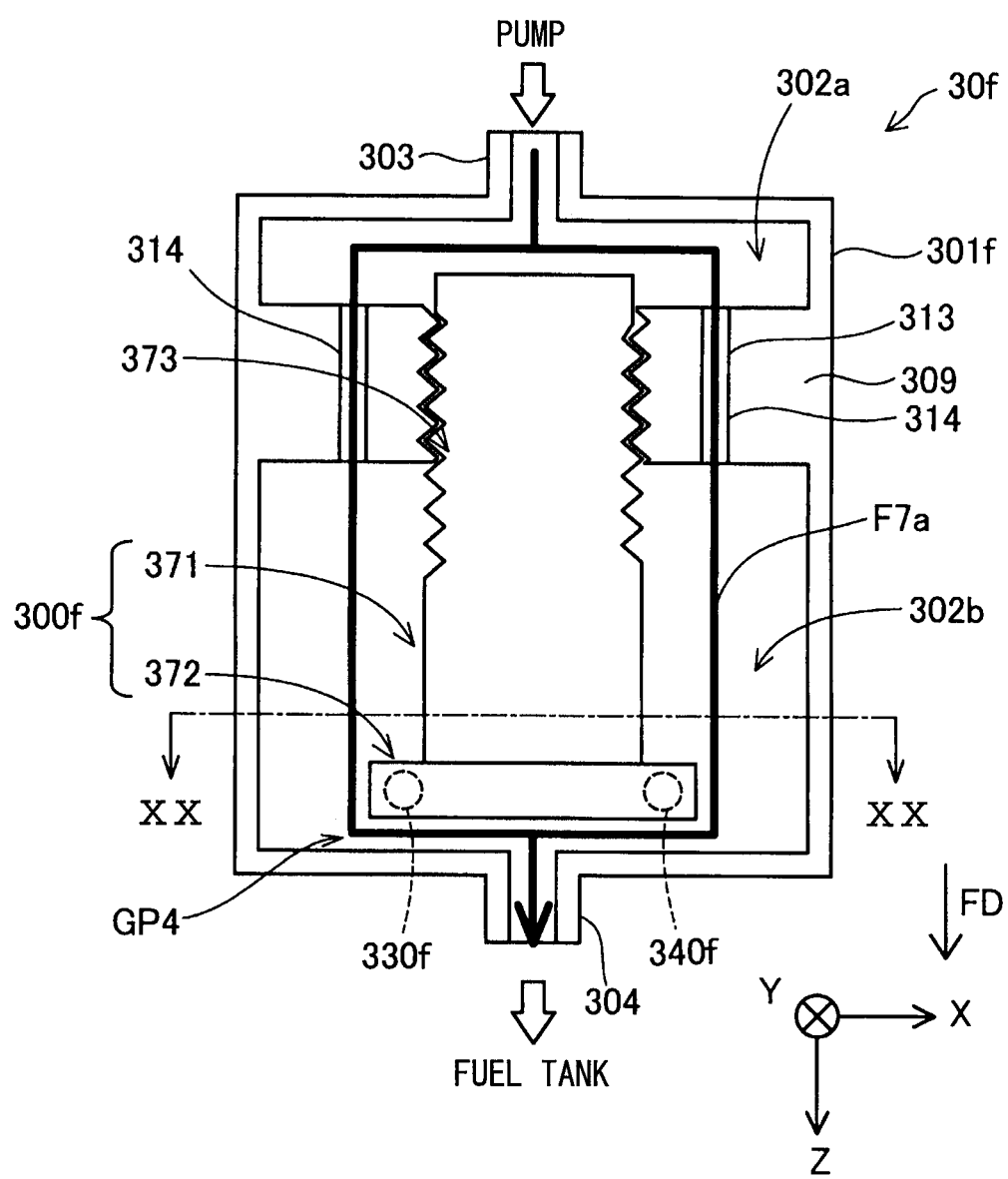
FIG. 19 is an explanatory diagram showing a schematic configuration of the flow control valve and the inner passage at a low temperature according to a seventh embodiment.
Figure 20:
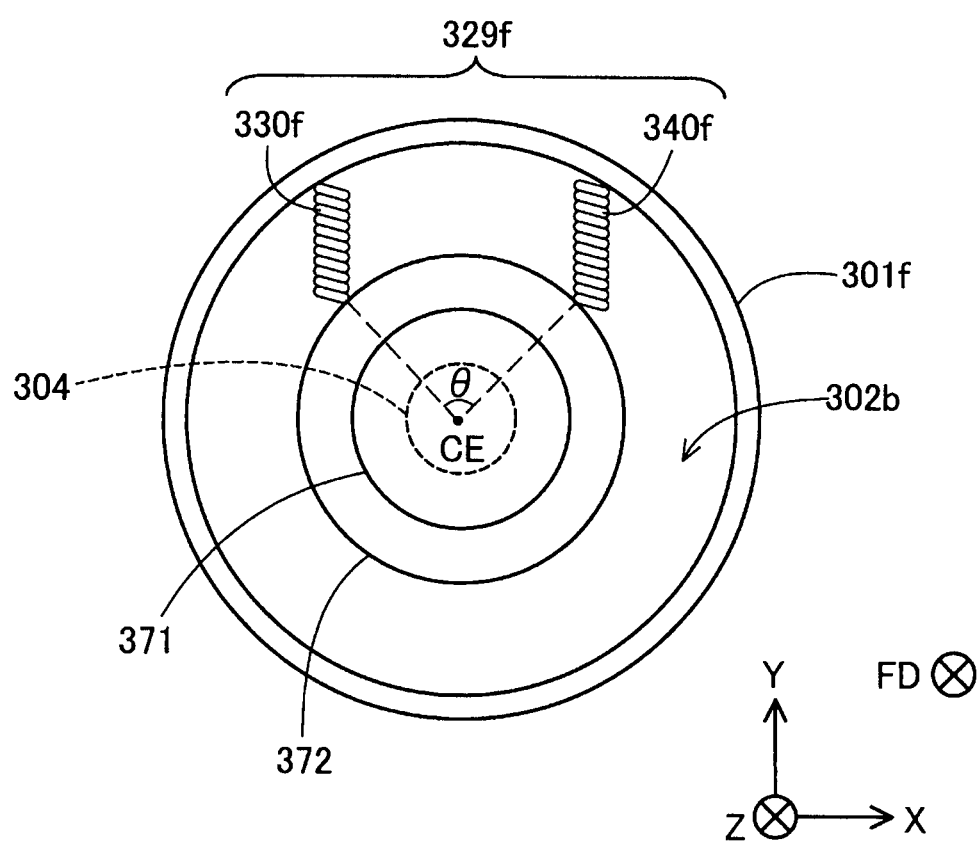
FIG. 20 is an explanatory diagram showing the schematic configuration of the flow control valve according to the seventh embodiment.
Figure 21:
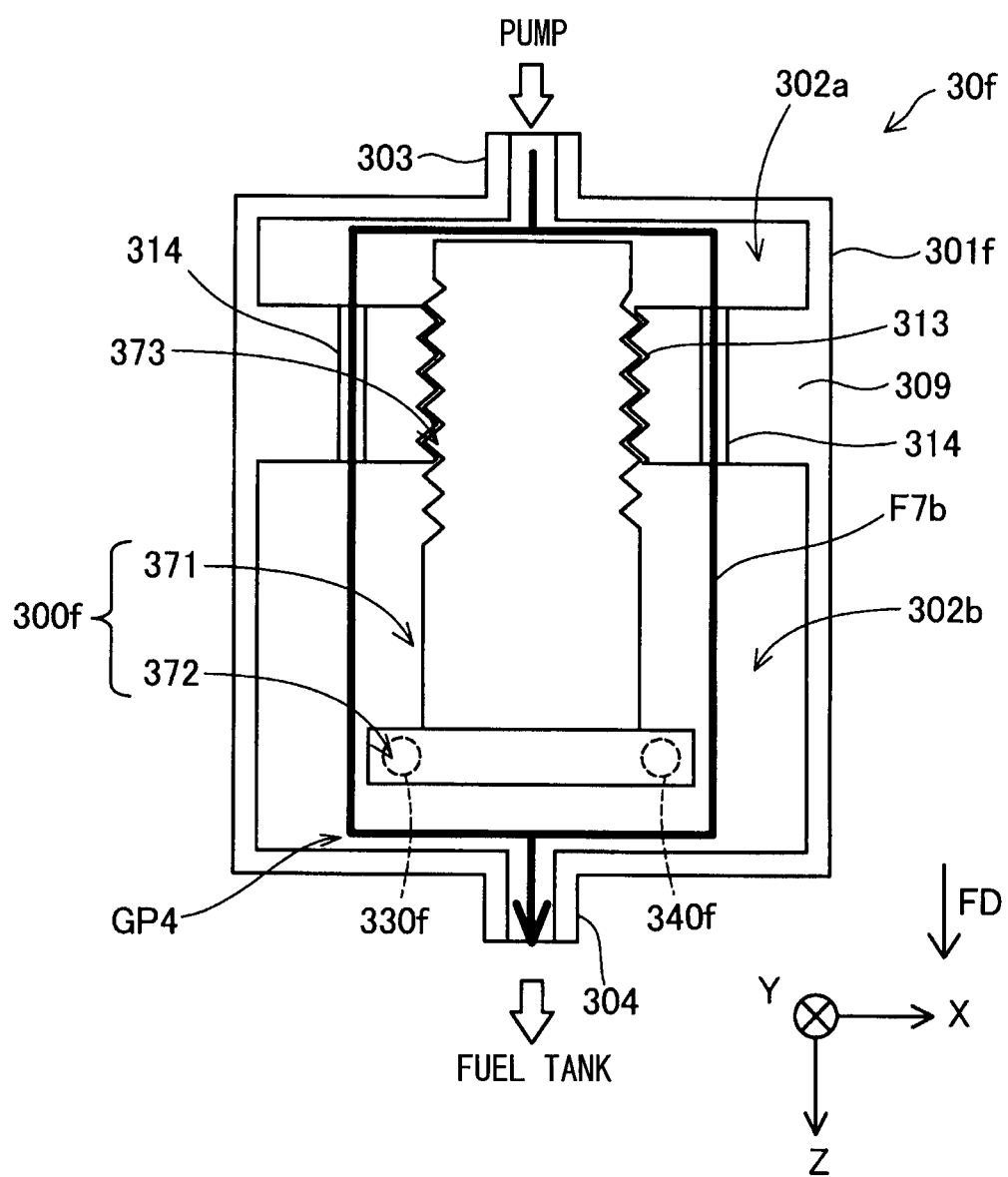
FIG. 21 is a cross-sectional diagram showing the inner passage at a high temperature in the flow control valve according to the seventh embodiment.

As shown in FIG. 19 to FIG. 21, the flow control valve 30f according to the seventh embodiment is different from the flow control valve 30 according to the first embodiment in that a housing 301f is provided in place of the housing 301, a valve body 300f is provided in place of the valve body 300, and a spring member 329f is provided in place of the spring member 329. Since other constituent elements in the flow control valve 30f are the same as those of the flow control valve 30, the same constituent elements will have the same reference numerals, and detailed explanations of the elements will be omitted. Note that in FIG. 19, an inner passage F7a at a low temperature is indicated with a bold solid arrow. Further, in FIG. 21, an inner passage F7b at a high temperature is indicated with a bold solid arrow.

As shown in FIG. 19 and FIG. 21, the housing 301f is different from the housing 301 according to the first embodiment only in that a female screw forming member 309 is provided. The female screw forming member 309 forms a female screw engaged with the valve body 300f. The female screw forming member 309 is positioned on the inflow side from the center of the flow passage direction FD in the cylindrical side surface among the inner wall surfaces of the housing 301f. The female screw forming member 309 has a cylindrical external shape where an opening in the thickness direction is formed at the center, and continues to the inner wall side surface of the housing 301f in the outer peripheral surface. A female screw 313 and plural through holes 314 are formed in the female screw forming member 309.

The female screw 313 has a female screw formed along the thickness direction at the center of radial direction in the female screw forming member 309, i.e., along the flow passage direction FD. The female screw 313 is engaged with the valve body 300f. With the engagement between the female screw 313 and the valve body 300f, the inner space of the housing 301 is partitioned with the female screw forming member 309 into inner space 302a on the inflow side, and inner space 302b on the outflow side. The plural through holes 314 are provided at a predetermined interval around the female screw 313 in the circumferential direction. The respective through holes 314 are formed through the female screw forming member 309 in the thickness direction, i.e., in the flow passage direction FD. Accordingly, the inner space 302a and the inner space 302b communicate with each other with the plural through holes 314.

The valve body 300f has a shaft 371 and an outflow facing part 372. The shaft 371 has an approximately columnar external shape with the flow passage direction FD as a longitudinal direction. The shaft 371 is provided inside of the housing 301f such that the central axis of the shaft 371 corresponds to the central axis of the housing 301f. In the shaft 371, a male screw 373 is formed in the outer peripheral surface at an end in the opposite direction to the flow passage direction FD. The male screw 373 is engaged with the female screw 313 of the female screw forming member 309. Accordingly, as the shaft 371 is rotated while it is engaged with the female screw 313, the shaft 371 is displaced in the flow passage direction FD and its opposite direction.

The outflow facing part 372 has an approximately disc external shape. The outflow facing part 372 is positioned in the opposite direction to the flow passage direction FD with respect to the outflow 304, and faces the outflow 304. In the outflow facing part 372, an end of the shaft 371 in the flow passage direction FD is connected to the center of an end in the opposite direction to the flow passage direction FD. The central axis of the outflow facing part 372 corresponds to the central axis of the shaft 371.

As shown in FIG. 20, the spring member 329f has a first spring 330f and a second spring 340f. The first spring 330f is different from the first spring 330 according to the first embodiment only in the connection point. One end of the first spring 330f is connected to the inner wall surface of the housing 301f, and the other end is connected to the side surface of the outflow facing part 372. The second spring 340f is different from the second spring 340 according to the first embodiment only in the connection point. One end of the second spring 340f is connected to the inner wall surface of the housing 301f, and the other end is connected to the side surface of the outflow facing part 372. Note that in the outflow facing part 372, the connection point of the first spring 330f and the connection point of the second spring 340f are not opposite to each other with the center of the outflow facing part 372 between them. Accordingly, as shown in FIG. 20, an angle θ between a virtual line connecting a center point CE of the outflow facing part 372 and the connection point of the first spring 330f and a virtual line connecting the center point CE and the second spring 340f is smaller than 180°.

As shown in FIG. 19, at a low temperature, the inner passage F7a is formed. At a low temperature, a gap GP4 between the outflow facing part 372 and the inner wall surface W1 of the housing 301f is comparatively small. In the inner passage F7a, the fuel flows from the inflow 303 in the inner space 302a in the flow passage direction FD, through the plural through holes 314, to the inner space 302b. Thereafter, the fuel flows through the inner space 302b in the flow passage direction FD, through the gap GP4, to the outflow 304.

As shown in FIG. 21, at a high temperature, the inner passage F7b is formed. At a high temperature, the gap GP4 between the outflow facing part 372 and the inner wall surface W1 of the housing 301f is comparatively large. Since the fuel temperature becomes high and the second spring 340 greatly extends in comparison with the first spring 330, the outflow facing part 372 is rotationally displaced. With this displacement, the shaft 371 is also rotationally displaced, and the valve body 300f is entirely displaced in the opposite direction to the flow passage direction FD. In the inner passage F7b, the fuel flows in a similar manner to that in the above-described inner passage F7a.

Note that in the present embodiment, the flow passage cross-sectional area of the gap GP4 at a low temperature and at a high temperature is set to be smaller than the total flow passage cross-sectional area of the plural through holes 314. Accordingly, both of the minimum flow passage cross-sectional area of the inner passage F7a at a low temperature and the minimum flow passage cross-sectional area of the inner passage F7b at a high temperature are the cross-sectional area of the gap GP4. As described above, the cross-sectional area of the gap GP4 at a high temperature is larger in comparison with the cross-sectional area of the gap GP4 at a low temperature. Accordingly, in the fuel supply apparatus 100 according to the seventh embodiment, as in the case of the fuel supply apparatus 100 according to the other embodiments, the minimum flow passage cross-sectional area of the inner passage at a high temperature is larger than the minimum flow passage cross-sectional area of the inner passage at a low temperature.

The fuel supply apparatus 100 according to the seventh embodiment described above has similar advantages to those of the fuel supply apparatus 100 according to the first embodiment. In addition, since both of the minimum flow passage cross-sectional area of the inner passage F7a at a low temperature and the minimum flow passage cross-sectional area of the inner passage F7b at a high temperature are the cross-sectional area of the gap GP4, the configuration enables to control the fuel flow rate in the flow control valve 30f by controlling the size of the gap GP4. Accordingly, upon manufacturing of the flow control valve 30f, the configuration enables to make the condition comparatively loose with respect to the tolerance of the size of the outflow 304, and the configuration enables to suppress drop of the yield.

H. Eighth Embodiment

The fuel supply apparatus 100 according to an eighth embodiment is different from the fuel supply apparatus 100 according to the first embodiment in that a flow control valve 30g is provided in place of the flow control valve 30. Since other constituent elements in the fuel supply apparatus 100 according to the eighth embodiment are the same as those of the fuel supply apparatus 100 according to the first embodiment, the same constituent elements will have the same reference numerals, and detailed explanations of the elements will be omitted.

Figure 22:
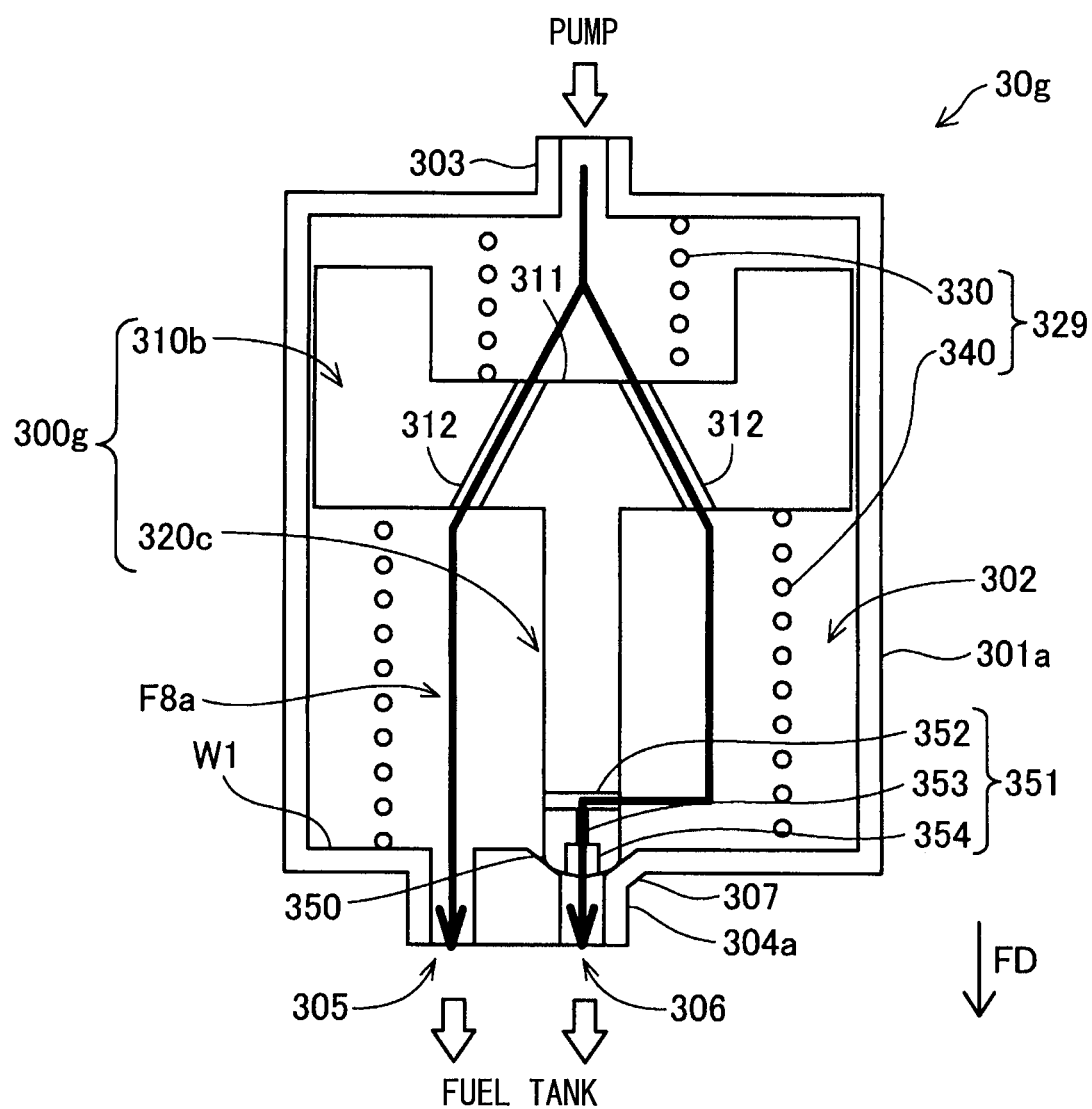
FIG. 22 is an explanatory diagram showing a schematic configuration of the flow control valve and the inner passage at a low temperature according to an eighth embodiment.
Figure 23:
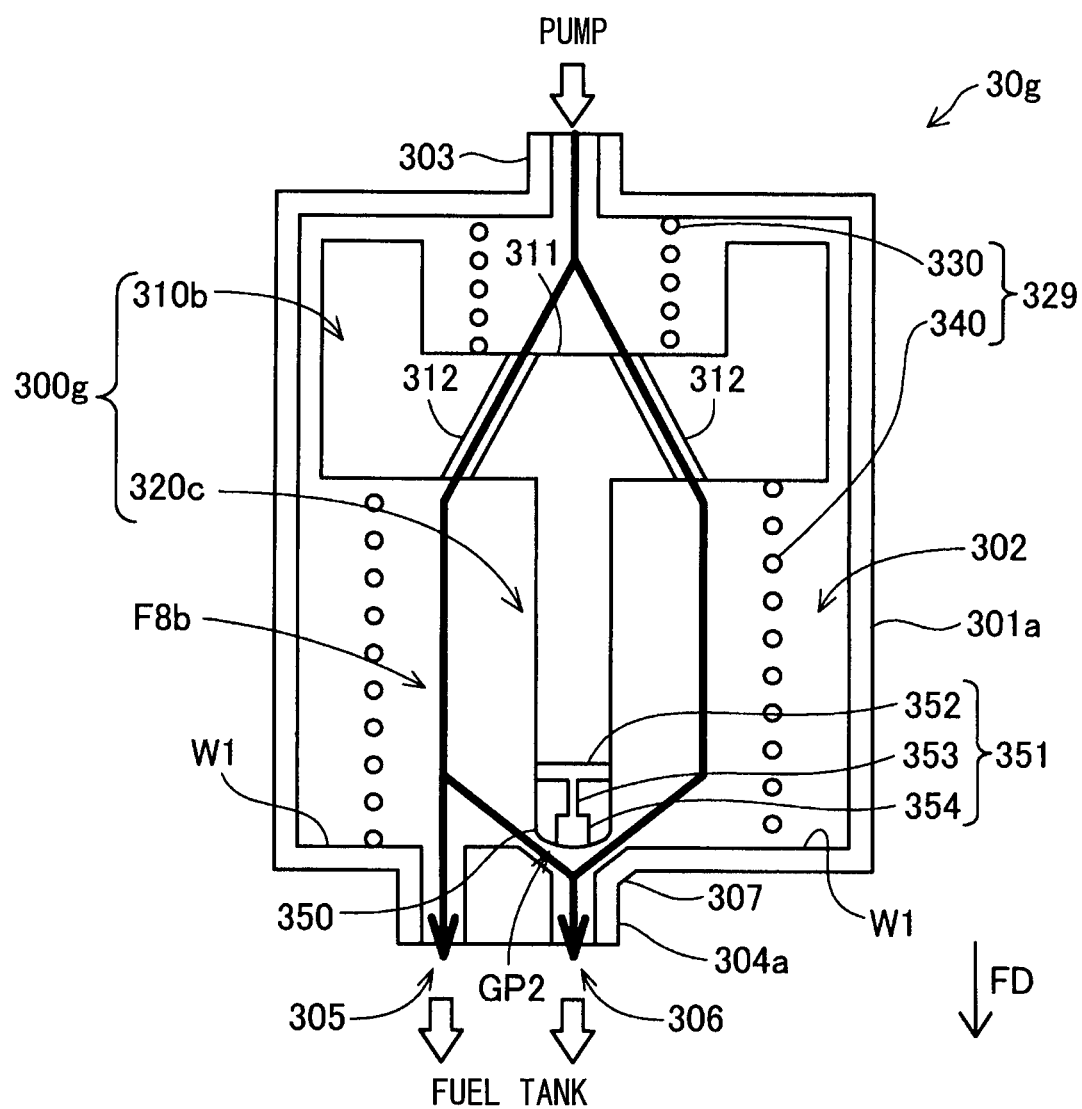
FIG. 23 is an explanatory diagram showing the schematic configuration of the flow control valve and the inner passage at a high temperature according to the eighth embodiment.

As shown in FIG. 22 and FIG. 23, the flow control valve 30g according to the eighth embodiment is different from the flow control valve 30 according to the first embodiment in that the housing 301a is provided in place of the housing 301 and a valve body 300g is provided in place of the valve body 300. Since other constituent elements in the flow control valve 30g are the same as those of the flow control valve 30, the same constituent elements will have the same reference numerals, and detailed explanations of the elements will be omitted. Note that in FIG. 22, an inner passage F8a at a low temperature is indicated with a bold solid arrow. Further, in FIG. 23, an inner passage F8b at a high temperature is indicated with a bold solid arrow.

The housing 301a is the same as the housing 301a according to the second embodiment. The flow control valve 30g according to the eighth embodiment has a configuration formed by combining the flow control valve 30a according to the second embodiment, 30b according to the third embodiment, and 30c according to the fourth embodiment. Accordingly, in the flow control valve 30g according to the eighth embodiment, the same constituent elements as those of the respective flow control valves 30a, 30b, and 30c according to the second, third and fourth embodiments will have the same reference numerals, and detailed explanations of the elements will be omitted.

As shown in FIG. 22, in the inner passage F8a at a low temperature, the fuel flows from the inflow 303 toward the recess 311, through the through hole 312, to the space outside of the blockage protrusion 320c in the radial direction. A part of the fuel flows from the space outside of the blockage protrusion 320c in the radial direction in the flow passage direction FD, to the first outflow 305. Further, the remaining fuel flows from the space outside of the blockage protrusion 320c in the radial direction, in the flow passage direction FD, into the first through hole forming portion 352. Then the fuel flows from the first through hole forming portion 352 into the second through hole forming portion 353, then the third through hole forming portion 354, in this order, then through the third through hole forming portion 354, to the second outflow 306.

As shown in FIG. 23, in the inner passage F8b at a high temperature, the fuel flows from the inflow 303 toward the recess 311, through the through hole 312, to the space outside of the blockage protrusion 320c in the radial direction. A part of the fuel flows from the space outside of the blockage protrusion 320c in the radial direction in the flow passage direction FD, to the first outflow 305. Further, the remaining fuel flows from the space outside of the blockage protrusion 320c in the radial direction, in the flow passage direction FD, through the gap GP2 between the blockage end 350 and the valve body facing part 307, to the second outflow 306.

In the eighth embodiment, the minimum flow passage cross-sectional area of the inner passage F8a at a low temperature is a total cross-sectional area of the cross-sectional area of the first outflow 305 and the cross-sectional area of the second through hole forming portion 353. On the other hand, the minimum flow passage cross-sectional area in the inner passage F8b at a high temperature is a total cross-sectional area of the cross-sectional area of the first outflow 305 and the cross-sectional area of the gap GP2. In the present embodiment, the cross-sectional area of the gap GP2 is larger than the cross-sectional area of the second through hole forming portion 353. Accordingly, at a high temperature, the configuration enables to increase the flow rate of the fuel in the return passage 83 in comparison with that at a low temperature.

The fuel supply apparatus 100 according to the eighth embodiment described above has similar advantages to those of the fuel supply apparatus 100 according to the first to fourth embodiments.

I. Ninth Embodiment

The fuel supply apparatus 100 according to a ninth embodiment is different from the fuel supply apparatus 100 according to the first embodiment in that a flow control valve 30h is provided in place of the flow control valve 30. Since other constituent elements in the fuel supply apparatus 100 according to the ninth embodiment are the same as those of the fuel supply apparatus 100 according to the first embodiment, the same constituent elements will have the same reference numerals, and detailed explanations of the elements will be omitted.

Figure 24:
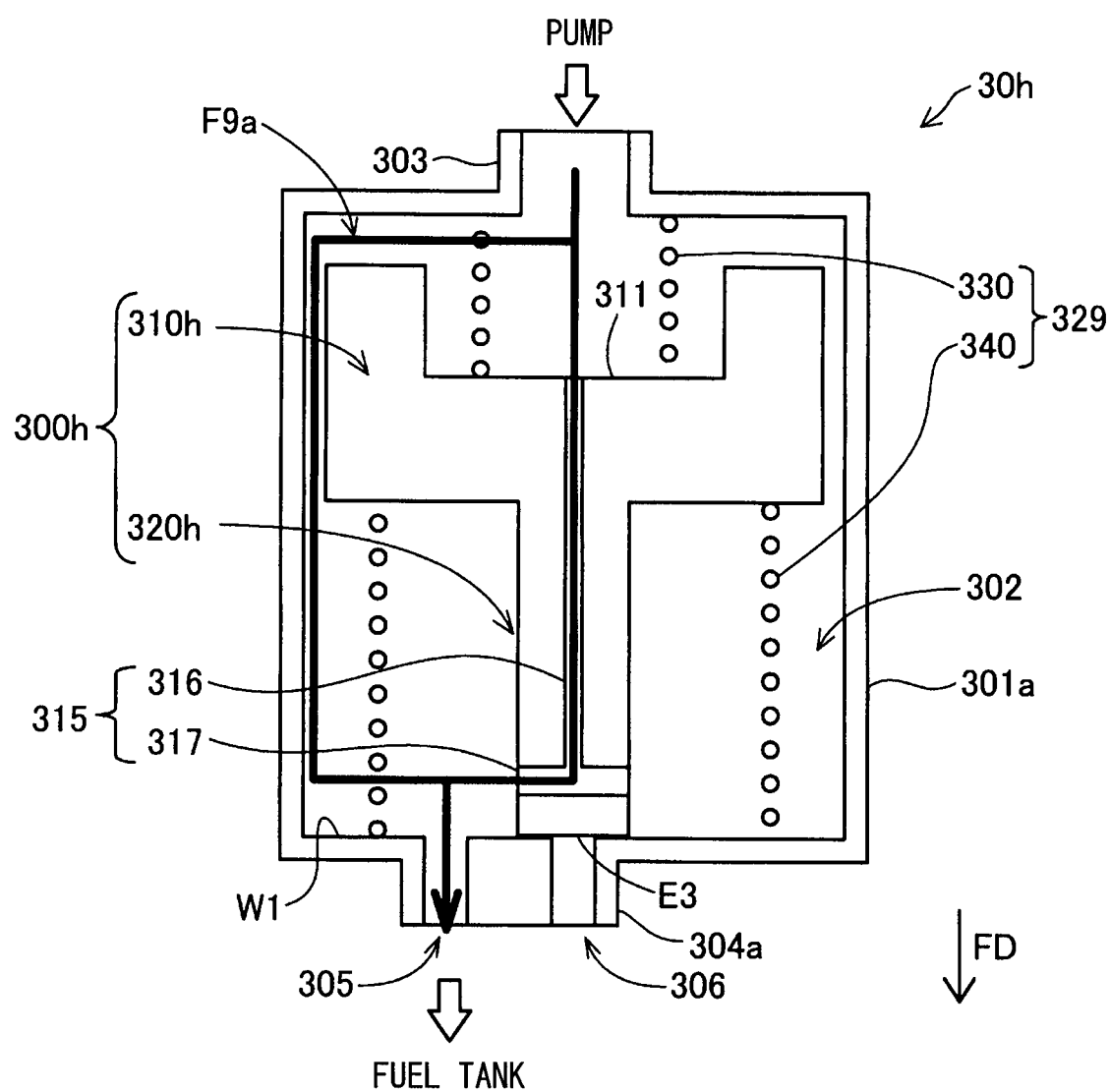
FIG. 24 is an explanatory diagram showing a schematic configuration of the flow control valve and the inner passage at a low temperature according to a ninth embodiment.
Figure 25:
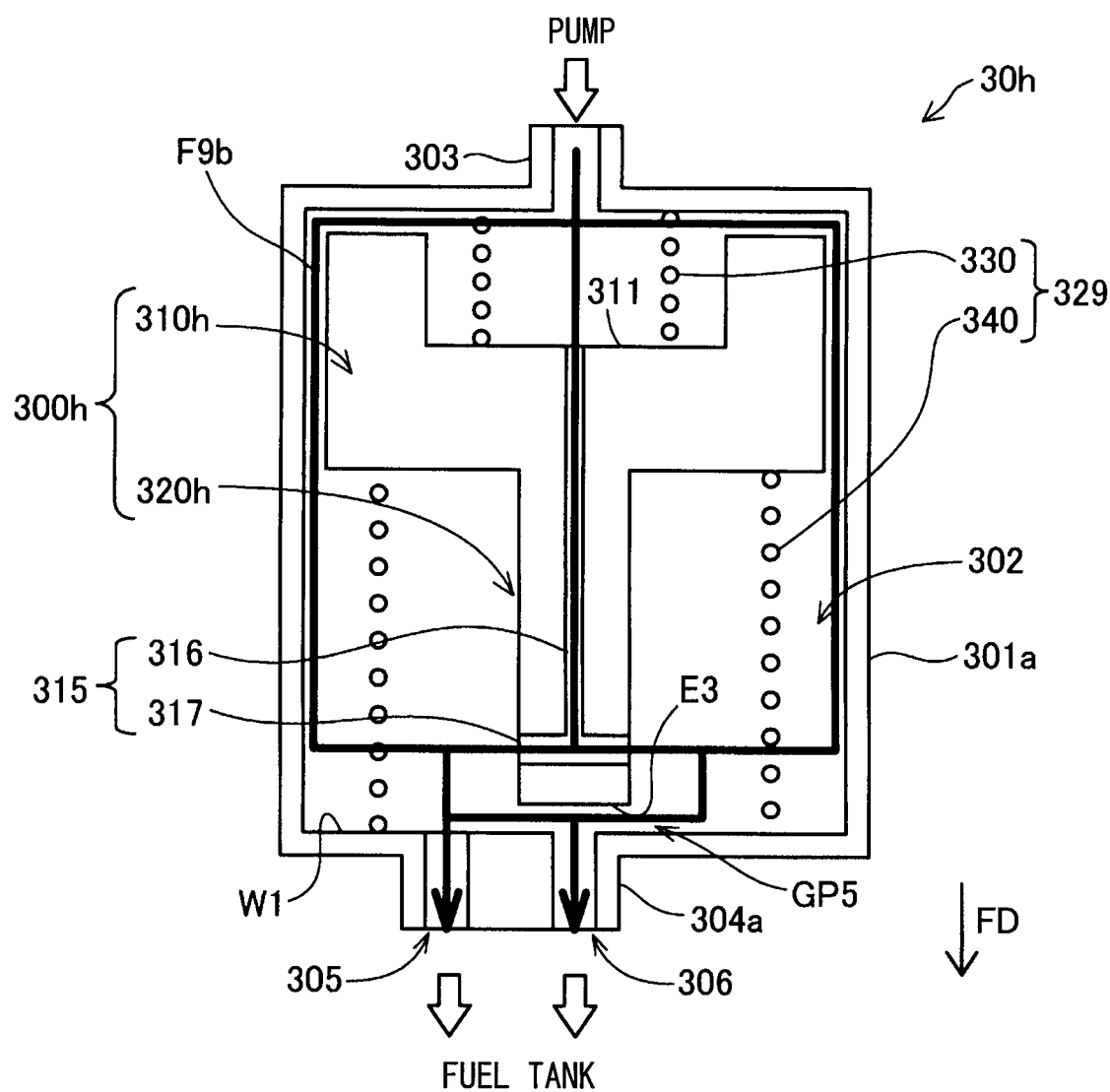
FIG. 25 is an explanatory diagram showing the schematic configuration of the flow control valve and the inner passage at a high temperature according to the ninth embodiment.

As shown in FIG. 24 and FIG. 25, the flow control valve 30h according to the ninth embodiment is different from the flow control valve 30 according to the first embodiment in that the housing 301a is provided in place of the housing 301 and a valve body 300h is provided in place of the valve body 300. Since other constituent elements in the flow control valve 30h are the same as those of the flow control valve 30, the same constituent elements will have the same reference numerals, and detailed explanations of the elements will be omitted. Note that in FIG. 24, an inner passage F9a at a low temperature is indicated with a bold solid arrow. Further, in FIG. 25, an inner passage F9b at a high temperature is indicated with a bold solid arrow.

The housing 301a is the same as the housing 301a according to the second embodiment. Accordingly, the outflow 304a has the first outflow 305 and the second outflow 306.

The valve body 300h has a partition 310h and a blockage protrusion 320h. A through hole 315 is formed in the valve body 300h. The through hole 315 has a first through hole forming portion 316 and a second through hole forming portion 317. The first through hole forming portion 316 is formed along the central axis of the valve body 300*h*, and one end is exposed to the recess 311. The other end communicates with the second through hole forming portion 317. The second through hole forming portion 317 is formed in the vicinity of an end of the blockage protrusion 320*h* in the flow passage direction FD. The second through hole forming portion 317 passes through the blockage protrusion 320*h* in the radial direction.

The partition 310*h* is different from the partition 310 according to the first embodiment only in that a part of the first through hole forming portion 316 is formed along the central axis. The blockage protrusion 320*h* is different from the blockage protrusion 320 according to the first embodiment only in that a part of the first through hole forming portion 316 and the second through hole forming portion 317 are formed.

As shown in FIG. 24, at a low temperature, the inner passage F9*a* is formed. At a low temperature, a blockage end E3 of the blockage protrusion 320*h* in the flow passage direction FD is in contact with the inner wall surface W1 of the housing 301*a*. At this time, the blockage end E3 blocks the second outflow 306. Note that at this time, the blockage end E3 does not block the first outflow 305. Accordingly, in the inner passage F9*a* at a low temperature, a part of the fuel flows from the inflow 303 through the gap (cylindrical gap) outside of the partition 310 in the radially outer direction toward the flow passage direction FD, to the first outflow 305. Further, the remaining fuel flows from the inflow 303 toward the recess 311, enters the first through hole forming portion 316, flows in the flow passage direction FD, to the second through hole forming portion 317. Thereafter, the fuel is discharged from the second through hole forming portion 317 into the inner space 302, to the first outflow 305.

As shown in FIG. 25, at a high temperature, the inner passage F9*b* is formed. At a high temperature, the valve body 300*h* moves in the opposite direction to the flow passage direction FD, and a gap GP5 occurs between the blockage end E3 of the blockage protrusion 320*h* and the inner wall surface W1 of the housing 301. Accordingly, in the inner passage F9*b* at a high temperature, a part of the fuel flows from the inflow 303 through the gap outside of the partition 310*h* in the radially outer direction toward the flow passage direction FD, to the first outflow 305 and the second outflow 306. Further, the remaining fuel flows from the inflow 303 toward the recess 311, enters the first through hole forming portion 316, flows in the flow passage direction FD, to the second through hole forming portion 317. Thereafter, the fuel is discharged from the second through hole forming portion 317 into the inner space 302, to the first outflow 305 and the second outflow 306.

The minimum flow passage cross-sectional area of the inner passage F9*a* at a low temperature corresponds to the cross-sectional area of the first outflow 305. On the other hand, the minimum flow passage cross-sectional area of the inner passage F9*b* at a high temperature corresponds to a total cross-sectional area of the cross-sectional area of the gap outside of the partition 310*h* in the radially outer direction and the cross-sectional area of the first through hole forming portion 316. In the present embodiment, as in the case of the other embodiments, the minimum flow passage cross-sectional area of the inner passage F9*b* at a high temperature is larger than the minimum flow passage cross-sectional area of the inner passage F9*a* at a low temperature.

The fuel supply apparatus 100 according to the ninth embodiment described above has similar advantages to those of the fuel supply apparatus 100 according to the first embodiment. In addition, as the fuel flows through the first through hole forming portion 316 provided on the central axis of the valve body 300*h* at any of low temperature and high temperature, upon movement of the valve body 300*h* in the flow passage direction FD and its opposite direction, inclination of the valve body 300*h* is suppressed.

J. Tenth Embodiment

The fuel supply apparatus 100 according to a tenth embodiment is different from the fuel supply apparatus 100 according to the first embodiment in that a flow control valve 30*i* is provided in place of the flow control valve 30. Since other constituent elements in the fuel supply apparatus 100 according to the tenth embodiment are the same as those of the fuel supply apparatus 100 according to the first embodiment, the same constituent elements will have the same reference numerals, and detailed explanations of the elements will be omitted.

Figure 26:
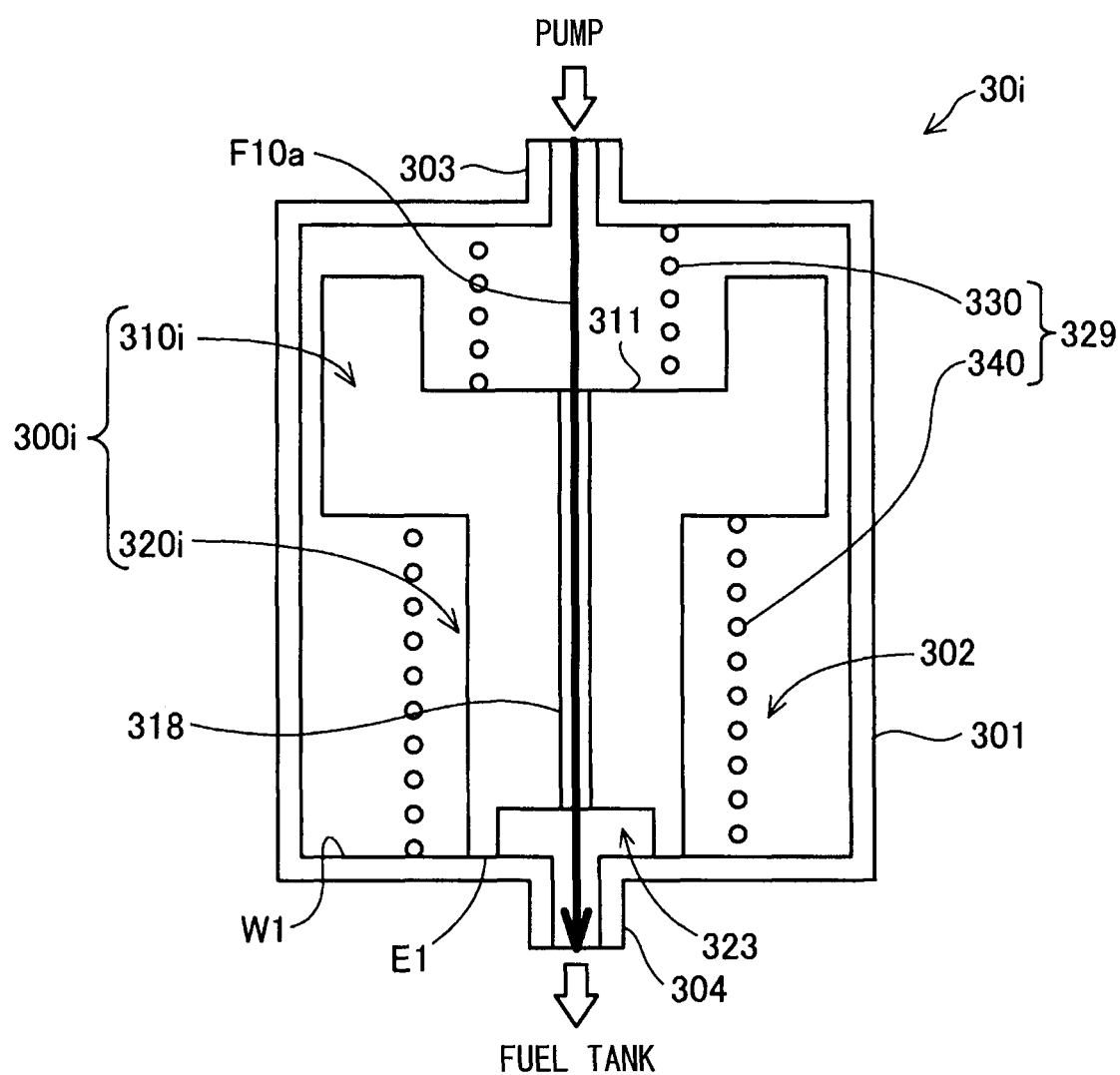
FIG. 26 is an explanatory diagram showing a schematic configuration of the flow control valve and the inner passage at a low temperature according to a tenth embodiment.
Figure 27:
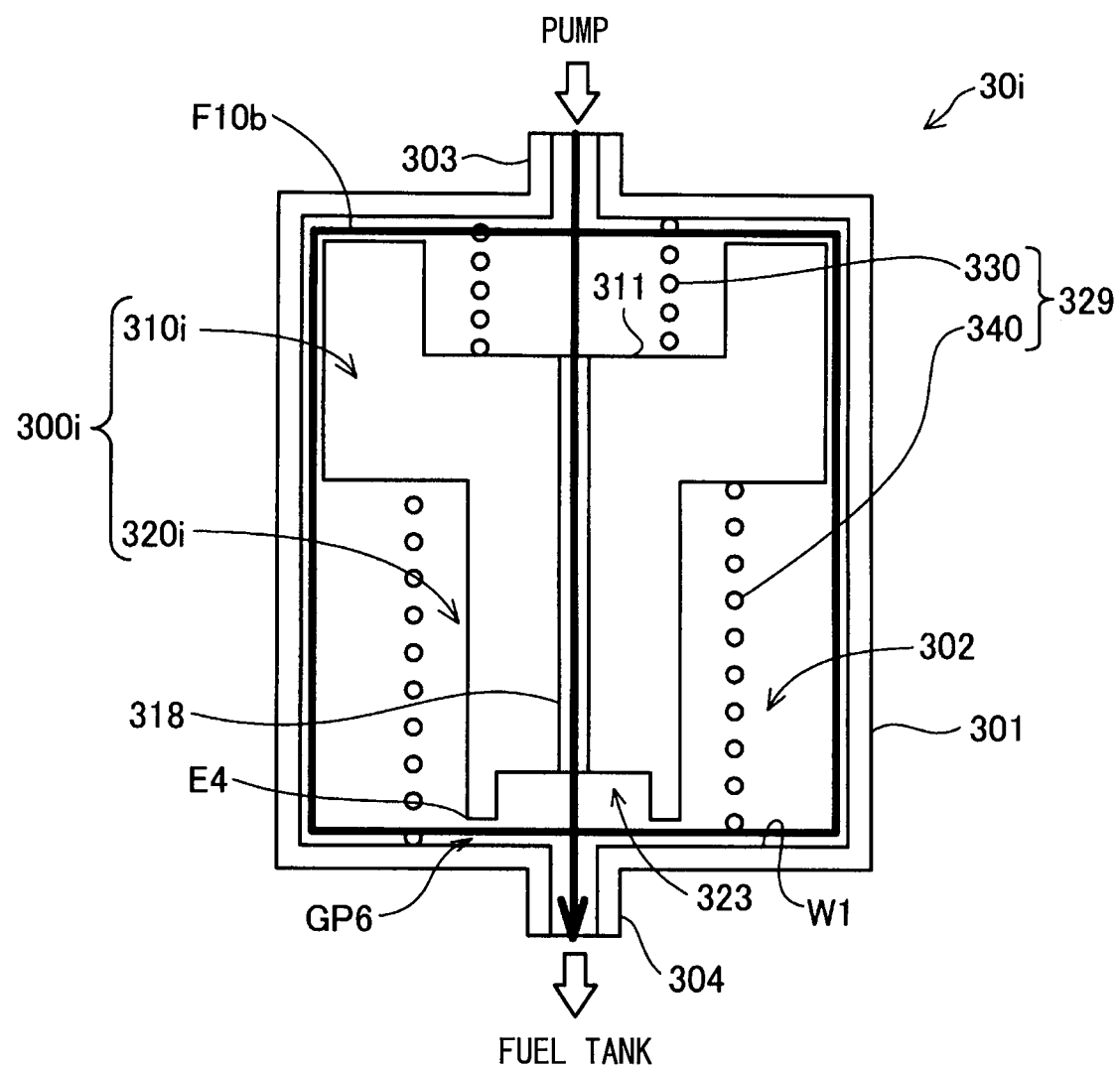
FIG. 27 is an explanatory diagram showing the schematic configuration of the flow control valve and the inner passage at a high temperature according to the tenth embodiment.

As shown in FIG. 26 and FIG. 27, the flow control valve 30*i* according to the tenth embodiment is different from the flow control valve 30 according to the first embodiment in that a valve body 300*i* is provided in place of the valve body 300. Since other constituent elements in the flow control valve 30*i* are the same as those of the flow control valve 30, the same constituent elements will have the same reference numerals, and detailed explanations of the elements will be omitted. Note that in FIG. 26, an inner passage F10*a* at a low temperature is indicated with a bold solid arrow. Further, in FIG. 27, an inner passage F10*b* at a high temperature is indicated with a bold solid arrow.

The valve body 300*i* has a partition 310*i* and a blockage protrusion 320*i*. A through hole 318 is formed in the valve body 300*i*. The through hole 318 is formed along the central axis of the valve body 300*i*, and passes through the valve body 300*i* in the flow passage direction FD. The partition 310*i* is different from the partition 310 according to the first embodiment only in that a part of the through hole 318 is formed. The blockage protrusion 320*i* is different from the blockage protrusion 320 according to the first embodiment only in that a part of the through hole 318 is formed in place of the through hole 321. One end of the through hole 318 is exposed to the recess 311, and the other end is exposed to the recess 323.

As shown in FIG. 26, at a low temperature, the inner passage F10*a* is formed. At a low temperature, a blockage end E4 of the valve body 300*i* in the flow passage direction FD is in contact with the inner wall surface W1 of the housing 301 so as to surround the opening of the outflow 304. Accordingly, in the inner passage F10*a*, the fuel flows from the inflow 303 toward the recess 311, and enters the through hole 318. Thereafter, the fuel flows through the through hole 318 in the flow passage direction FD, then is discharged to the recess 323, to the outflow 304.

As shown in FIG. 27, at a high temperature, the inner passage F10*b* is formed. At a high temperature, the valve body 300*i* moves in the opposite direction to the flow passage direction FD, and a gap GP6 occurs between the blockage end E4 of the blockage protrusion 320*i* and the inner wall surface W1 of the housing 301. Accordingly, in the inner passage F10*b* at a high temperature, a part of the fuel flows through the same route as that of the above-described fuel that passes through the inner passage F10*a* at a low temperature, to the outflow 304. Further, the remaining fuel flows from the inflow 303 through the gap (cylindrical gap) outside of the partition 310*i* in the radially outer direction toward the flow passage direction FD, then from the gap GP6, to the outflow 304.

The minimum flow passage cross-sectional area of the inner passage F10*a* at a low temperature corresponds to the cross-sectional area of the through hole 318. On the other hand, the minimum flow passage cross-sectional area of the inner passage F10*b* at a high temperature corresponds to a total cross-sectional area of the cross-sectional area of the gap outside of the partition 310*i* in the radially outer direction and the cross-sectional area of the through hole 318. In the present embodiment, as in the case of the other embodiments, the minimum flow passage cross-sectional area of the inner passage F10*b* at a high temperature is larger than the minimum flow passage cross-sectional area of the inner passage F10*a* at a low temperature.

The fuel supply apparatus 100 according to the tenth embodiment described above has similar advantages to those of the fuel supply apparatus 100 according to the first embodiment. In addition, as the fuel flows through the through hole 318 provided on the central axis of the valve body 300*i* at any of low temperature and high temperature, upon movement of the valve body 300*i* in the flow passage direction FD and its opposite direction, inclination of the valve body 300*i* is suppressed.

K. Eleventh Embodiment

The fuel supply apparatus 100 according to an eleventh embodiment is different from the fuel supply apparatus 100 according to the first embodiment in that a flow control valve 30*j* is provided in place of the flow control valve 30. Since other constituent elements in the fuel supply apparatus 100 according to the eleventh embodiment are the same as those of the fuel supply apparatus 100 according to the first embodiment, the same constituent elements will have the same reference numerals, and detailed explanations of the elements will be omitted.

Figure 28:
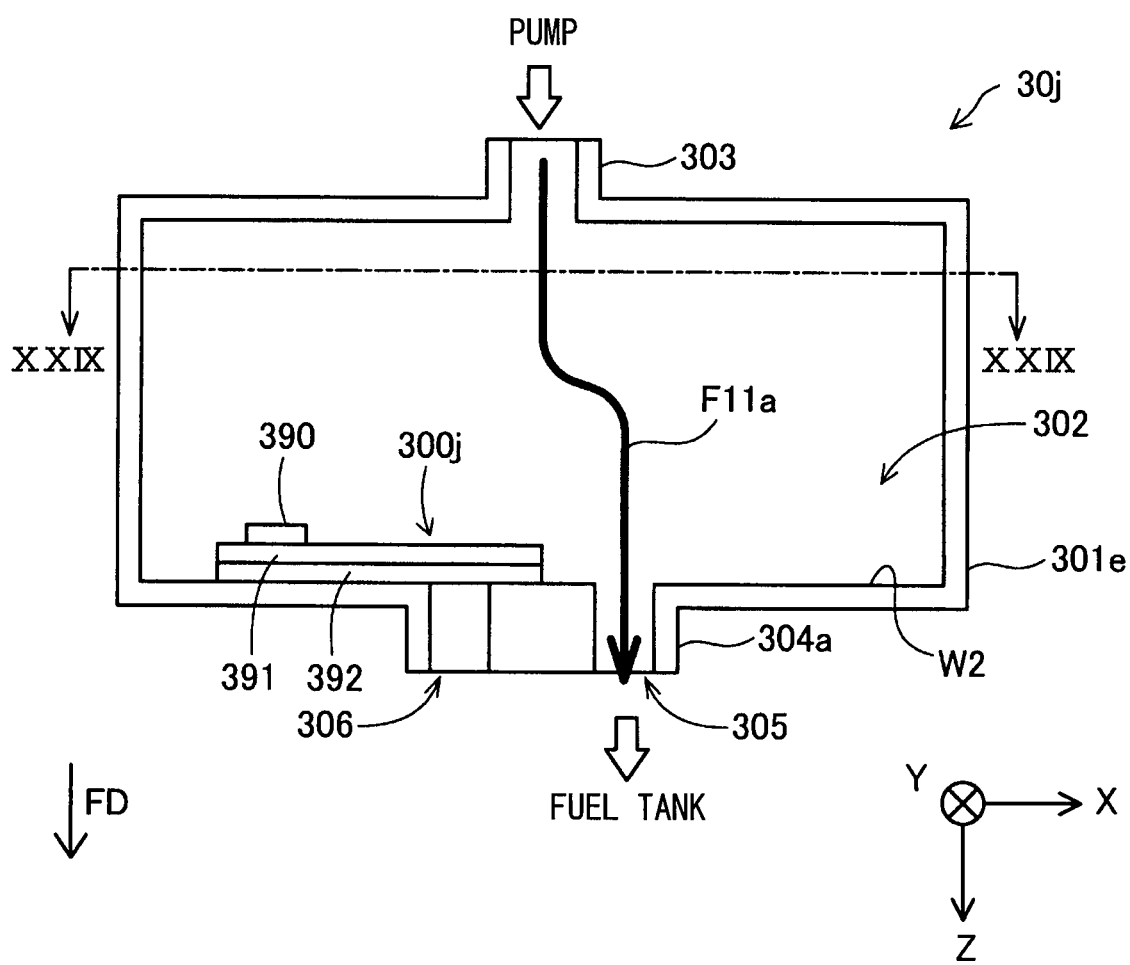
FIG. 28 is an explanatory diagram showing a schematic configuration of the flow control valve and the inner passage at a low temperature according to an eleventh embodiment.
Figure 29:
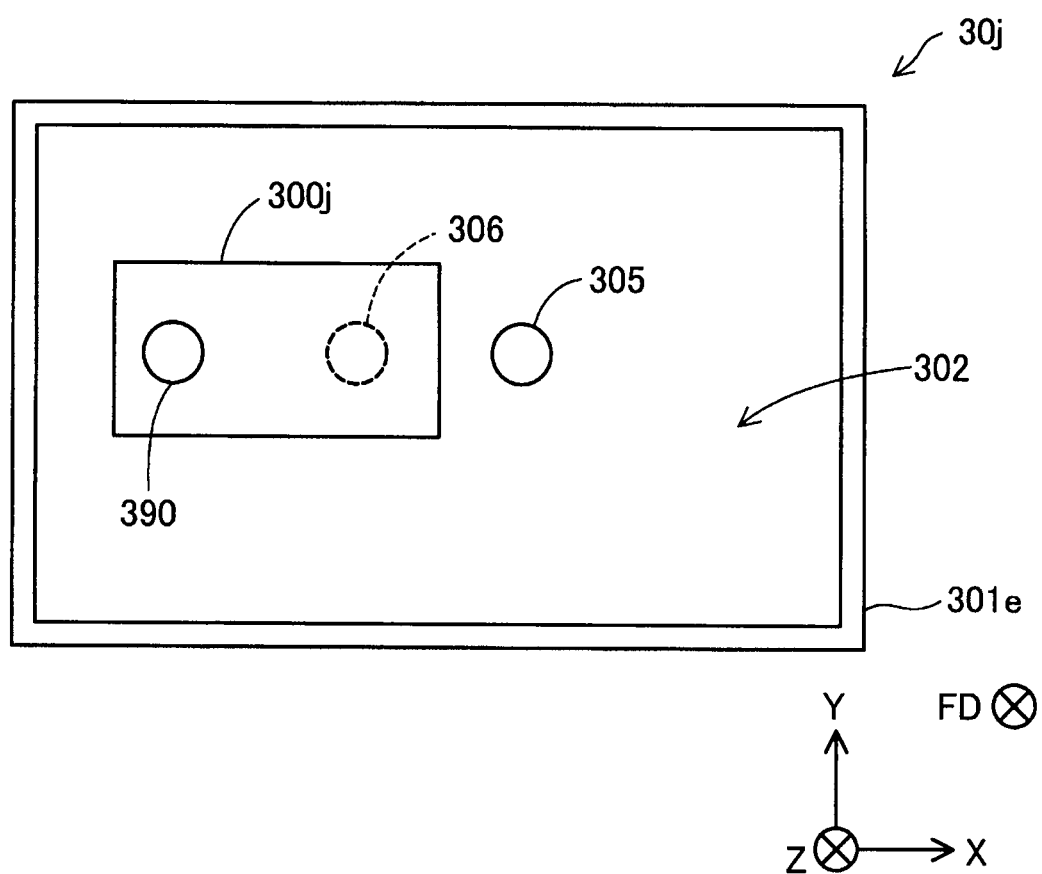
FIG. 29 is an explanatory diagram showing the schematic configuration of the flow control valve according to the eleventh embodiment.
Figure 30:
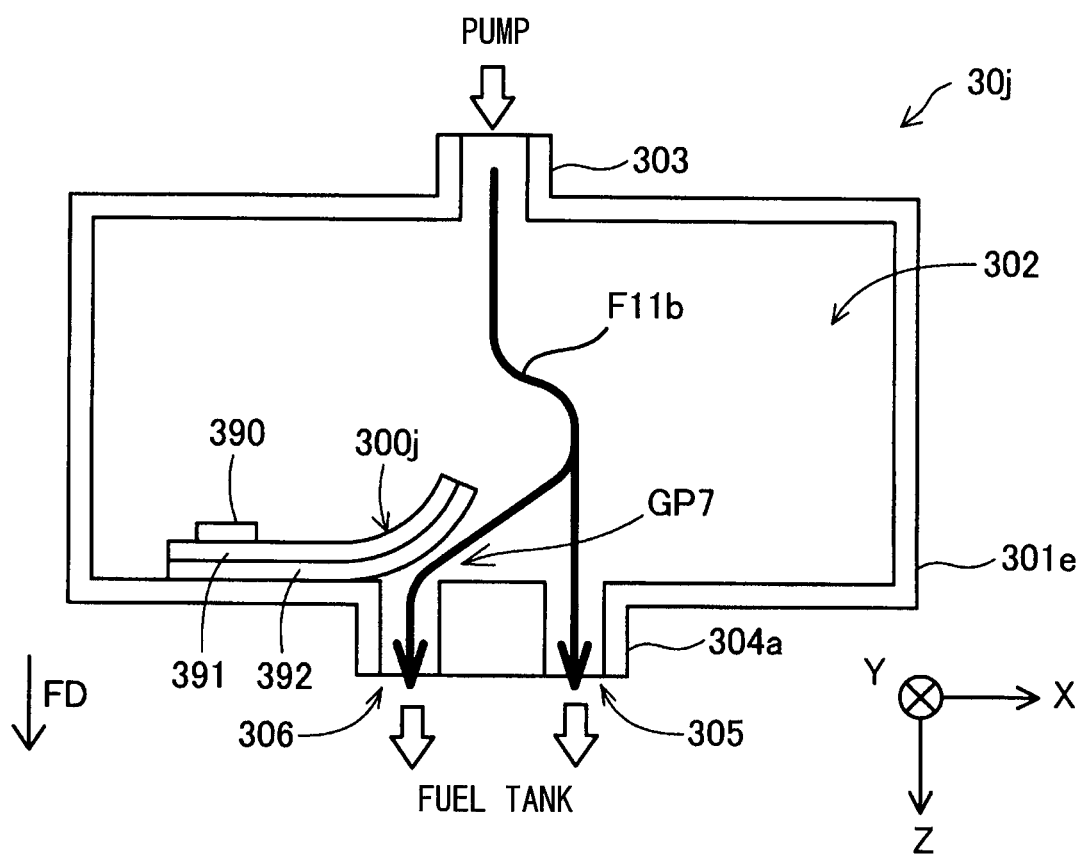
FIG. 30 is a cross-sectional diagram showing the schematic configuration of the flow control valve and the inner passage at a high temperature according to the eleventh embodiment.

As shown in FIG. 28 to FIG. 30, the flow control valve 30*j* has the housing 301*e*, a valve body 300*j*, and a fixing member 390. Note that in FIG. 28 and FIG. 30, a cross section of the flow control valve 30*j* passing through the center of the flow control valve 30*j* and along the flow passage direction FD is shown.

The housing 301*e* is the same as the housing 301*a* according to the sixth embodiment. That is, the housing 301*e* has the outflow 304*a*, and the outflow 304*a* has the first outflow 305 and the second outflow 306.

The valve body 300*j* has a plate external shape. The valve body 300*j* is a so-called bimetal having a structure formed by attaching two metal plate members having mutually different thermal expansion coefficients. More particularly, the valve body 300*j* has a first metal plate member 391 and a second metal plate member 392. The thermal expansion coefficient of the second metal plate member 392 is larger than the thermal expansion coefficient of the first metal plate member 391.

The fixing member 390 fixes the valve body 300*j* to the inner wall surface W2 of the housing 301*e*. As shown in FIG. 29, the fixing member 390 fixes the valve body 300*j* to the housing 301*e* in the vicinity of an end of the valve body 300*j* in the −X direction. Accordingly, the end of the valve body 300*j* in the +X direction is displaceable by deformation.

As shown in FIG. 28, at a low temperature, the valve body 300*j* is not deformed, and it blocks the second outflow 306, and does not block the first outflow 305. Accordingly, as shown with a bold solid arrow in FIG. 28, in an inner passage F11*a* at a low temperature, the fuel flows from the inflow 303 into the inner space 302, flows in the flow passage direction FD, to the first outflow 305.

As shown in FIG. 30, at a high temperature, the valve body 300*j* is deformed. More particularly, the valve body 300*j* is curled such that the first metal plate member 391 is inside, due to the difference between the thermal expansion coefficients of the first metal plate member 391 and the second metal plate member 392. At this time, as the end of the valve body 300*j* in the −X direction is fixed with the fixing member 390, the end of the valve body 300*j* in the +X direction is displaced in the direction toward the inflow 303, i.e., a −Z direction. Accordingly, the valve body 300*j* does not block the second outflow 306, and a gap GP7 is formed between the valve body 300*j* and the second outflow 306.

As shown with a bold solid arrow in FIG. 30, in an inner passage F11*b* at a high temperature, the fuel flows from the inflow 303 into the inner space 302, flows in the flow passage direction FD, to the first outflow 305 and the second outflow 306.

Note that the minimum flow passage cross-sectional area of the inner passage F11*a* at a low temperature is the cross-sectional area of the first outflow 305. Further, the minimum flow passage cross-sectional area of the inner passage F11*b* at a high temperature is a total cross-sectional area of the cross-sectional area of the first outflow 305 and the cross-sectional area of the second outflow 306. Accordingly, in the eleventh embodiment, as in the case of the other embodiments, the minimum flow passage cross-sectional area of the inner passage F11*b* at a high temperature is larger than the minimum flow passage cross-sectional area of the inner passage F11*a* at a low temperature.

The fuel supply apparatus 100 according to the eleventh embodiment described above has similar advantages to those of the fuel supply apparatus 100 according to the first embodiment. In addition, as the valve body 300*j* is configured without using the spring member 329, the configuration enables to realize the valve body 300*j* with a simple structure.

L. Twelfth Embodiment

Figure 31:
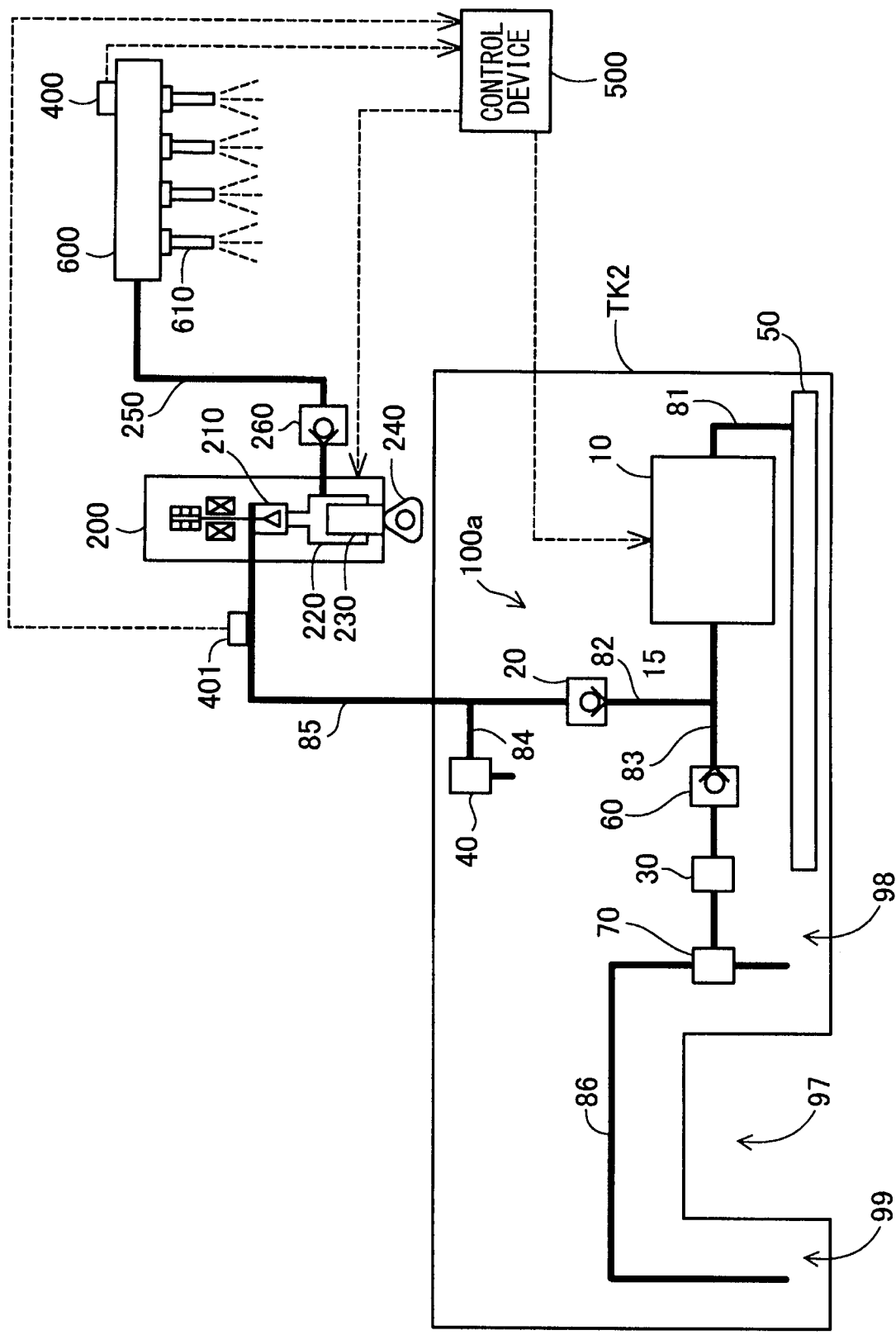
FIG. 31 is a block diagram showing a schematic configuration of the fuel supply apparatus according to a twelfth embodiment.

A fuel supply apparatus 100*a* according to a twelfth embodiment shown in FIG. 31 is different from the fuel supply apparatus 100 according to the first embodiment in that a fuel tank TK2 is provided in place of the fuel tank TK, and a jet pump 70 and a transfer passage 86 are additionally provided. Since other constituent elements in the fuel supply apparatus 100*a* according to the twelfth embodiment are the same as those of the fuel supply apparatus 100 according to the first embodiment, the same constituent elements will have the same reference numerals, and detailed explanations of the elements will be omitted.

The fuel tank TK2 has a first reservoir 98 and a second reservoir 99. The first reservoir 98 and the second reservoir 99 are provided with a recess 97 between them, and communicate with each other in space above the recess 97. The recess 97 is used for e.g. providing a propeller shaft.

The jet pump 70 is connected to an end of the return passage 83, in other words, the outflow 304 of the flow control valve 30. Further, the jet pump 70 is connected to the transfer passage 86. Further, the jet pump 70 has an outlet opened in the first reservoir 98. The jet pump 70 injects the fuel entering from the return passage 83 to the transfer passage 86 and in the first reservoir 98. With the injection of the fuel with the jet pump 70 in the first reservoir 98, the fuel reserved in the first reservoir 98 flows toward the filter 50 and the pump 10.

The transfer passage 86 is a fuel flow passage provided over the first reservoir 98 and the second reservoir 99. One end of the transfer passage 86 is connected to the jet pump 70, and the other end is opened in the second reservoir 99. With the injection of the fuel with the jet pump 70 via the transfer passage 86 in the second reservoir 99, the fuel in the second reservoir 99 is transferred to the first reservoir 98.

The fuel supply apparatus 100*a* according to the twelfth embodiment described above has similar advantages to those of the fuel supply apparatus 100 according to the first embodiment.

M. Thirteenth Embodiment

Figure 32:
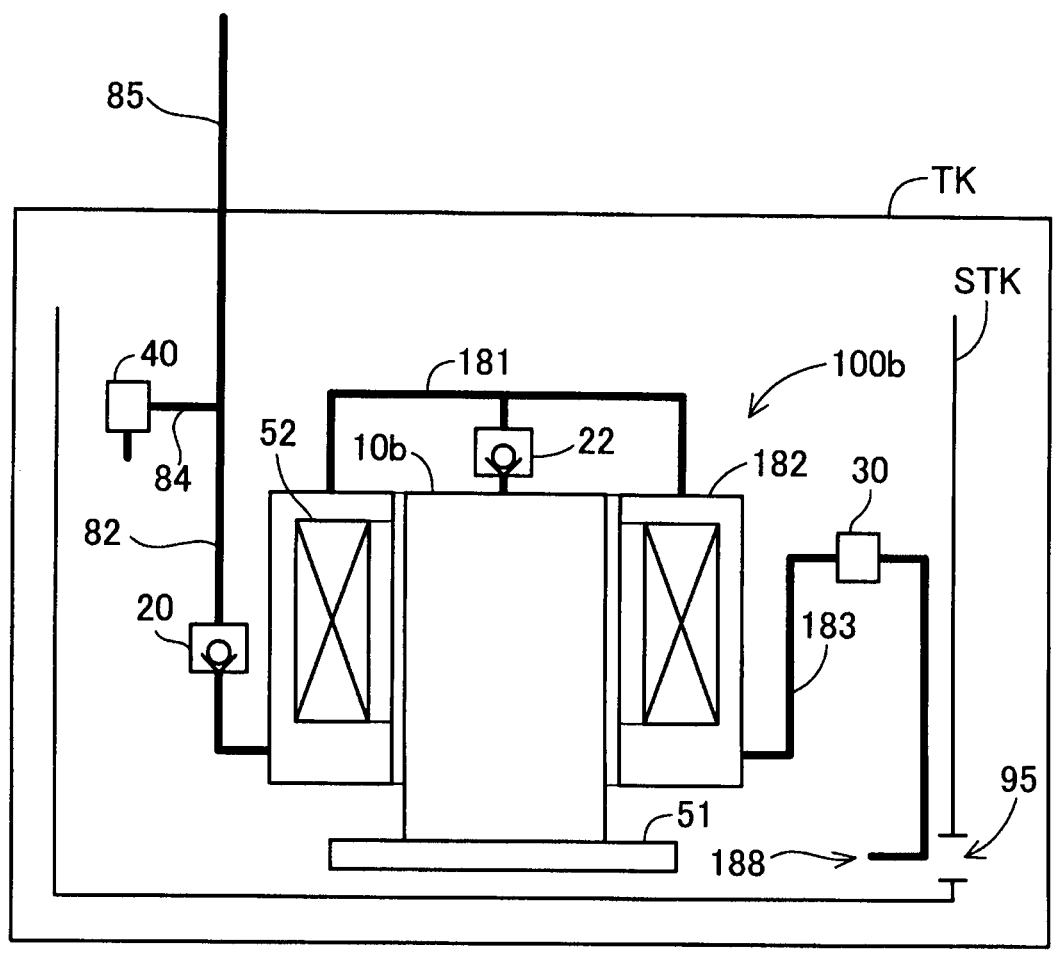
FIG. 32 is a block diagram showing a schematic configuration of the fuel supply apparatus according to a thirteenth embodiment.

A fuel supply apparatus 100*b* according to a thirteenth embodiment shown in FIG. 32 is provided in a sub tank STK provided in the fuel tank TK. The sub tank STK is a container provided in the fuel tank TK for storage of the fuel. In the sub tank, an inlet opening 95 is provided in a lower part.

The fuel supply apparatus 100*b* according to the thirteenth embodiment is different from the fuel supply apparatus 100 according to the first embodiment in that a pump 10*b* is provided in place of the pump 10, a return passage 183 is provided in place of the return passage 83, the residual-pressure retention valve 15 and the flow control valve 30 are provided in the return passage 183, a filter 51 is provided in place of the filter 50, and a fuel passage 181, a check valve 22, a filter container 182, a high-pressure filter 52, and a jet pump 188 are additionally provided. Since other constituent elements in the fuel supply apparatus 100*b* according to the thirteenth embodiment are the same as those of the fuel supply apparatus 100 according to the first embodiment, the same constituent elements will have the same reference numerals, and detailed explanations of the elements will be omitted.

The pump 10*b* is a longitudinal type pump. The pump 10*b* sucks the fuel passing through the filter 51 in a vertically lower part and discharges the fuel from a vertically higher part. The fuel passage 181 is a fuel passage which connects the pump 10*b* and the filter container 182 to each other. The check valve 22 is provided in the fuel passage 181 and is positioned vertically above the pump 10*b*, to regulate the flow direction of the fuel in the fuel passage 181 to a direction from the pump 10*b* toward the filter container 182. The filter container 182 contains the high-pressure filter 52, and guides the fuel passing through the high-pressure filter 52 to the fuel passage 82 and the return passage 183. The filter container 182 communicates with the fuel passage 181. Further, the filter container 182 communicates with the fuel passage 82 and the return passage 183 on the opposite side to the fuel passage 181, with the high-pressure filter 52 between the fuel passage 181 and the filter container 182. The filter container 182 has a cylindrical external shape in which the center is cylindrically opened. The high-pressure filter 52 suppresses drop of fuel pressure, and suppresses occurrence of fuel vapor in the fuel passage 181 and the filter container 182. The external shape of the high-pressure filter 52 is similar to the external shape of the filter container 182, and is a cylindrical shape in which the center is cylindrically opened.

In the return passage 183, one end is connected to the filter container 182, and the other end is configured as the jet pump 188 in the vicinity of the inlet opening 95 in the sub tank STK. The jet pump 188 is formed as an orifice. The jet pump 188 injects the fuel discharged from the flow control valve 30. With this configuration, the fuel reserved outside of the sub tank STK flows via the inlet opening 95 into the sub tank STK, and is guided to the filter 51.

The fuel supply apparatus 100*b* according to the thirteenth embodiment described above has similar advantages to those of the fuel supply apparatus 100 according to the first embodiment.

N. Other Embodiments (1) In the second, sixth, eighth, and ninth embodiments, the outflow 304*a* has the two outflows 305 and 306. However, as in the case of the first embodiment, the outflow 304*a* may have one outflow. In this configuration, for example, a flow passage forming member may be provided in the housings 301*a* and 301*e*, otherwise, a rib or the like to form a flow passage may be provided in the housings 301*a* and 301*e*, so as to form mutually different two flow passages in the inner space 302. Then it may be configured such that with the movement of the valve body, at a low temperature, one flow passage is blocked and the other is opened, while at a high temperature, any of the passages are opened. That is, a fuel supply apparatus having a configuration in which generally, the inner passage includes a first flow passage which communicates a fuel passage, the inside of the fuel tanks TK, TK2 with each other regardless of high/low of fuel temperature, and a second flow passage blocked with the valve body 300, 300*a* to 300*i* when the fuel temperature is lower than the vapor generation temperature, and not blocked with the valve body 300, 300*a* to 300*i* when the fuel temperature is equal to or higher than the vapor generation temperature, is applicable to the fuel supply apparatus of the present disclosure.

(2) In the eighth embodiment, the through hole 312 may be omitted. In this case, the space outside of the partition 310*b* in the radial direction may be formed in a size to cause the fuel to pass. Further, in the eighth embodiment, the through hole 351 may be omitted.

(3) In the thirteenth embodiment, the jet pump 188 is provided in the sub tank STK, however, the jet pump 188 may be provided outside of the the sub tank SKT, e.g., in a position between the sub tank STK in the vicinity of the inlet opening 95 and the fuel tank TK2. With this configuration, the fuel supply apparatus has similar advantages to those of the fuel supply apparatus 100*b* according to the thirteenth embodiment.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A fuel supply apparatus to supply fuel from a fuel tank to an internal combustion engine, comprising:

a pump to discharge fuel in the fuel tank;
a return passage branched from a fuel passage, which is connected to the pump, and to return a part of fuel discharged from the pump to the fuel tank; and
a valve device to control a flow rate in the return passage, wherein
the valve device has:
  a housing;
  an inner passage provided in the housing and to communicate with both the fuel passage and an inside of the fuel tank;
  a valve body provided in the inner passage and movable in the housing to change a minimum flow passage cross-sectional area of the inner passage; and
  a spring connected to the valve body and to change its biasing load in correspondence with a fuel temperature of the fuel to move the valve body,
the spring is to move the valve body such that the minimum flow passage cross-sectional area, when the fuel temperature of the fuel discharged with the pump is equal to or higher than a predetermined vapor generation temperature, is larger than the minimum flow passage cross-sectional area when the fuel temperature is lower than the vapor generation temperature, and
the inner passage includes:
  a first flow passage to communicate the fuel passage with the inside of the fuel tank regardless of the fuel temperature; and
  a second flow passage to be blocked with the valve body when the fuel temperature is lower than the vapor generation temperature and not to be blocked with the valve body when the fuel temperature is equal to or higher than the vapor generation temperature.

2. The fuel supply apparatus according to claim 1, wherein
the housing has an outflow, which is to allow the fuel to flow therefrom, including a first outflow and a second outflow which are different from each other,
the first flow passage includes the first outflow,
the second flow passage includes the second outflow, and
the second outflow is to be blocked with the valve body, when the fuel temperature is lower than the vapor generation temperature, and is not to be blocked with the valve body when the fuel temperature is equal to or higher than the vapor generation temperature.

3. The fuel supply apparatus according to claim 2, wherein
the housing further has a valve body facing part surrounding the second outflow and facing the valve body,
the second outflow is to be blocked when the valve body makes contact with the valve body facing part,
the valve body facing part is formed in a tapered shape in which the closer to the valve body, the larger an opening cross-sectional area of the valve body facing part, and
the valve body includes a blockage end partially to make contact with the valve body facing part and having a spherical external shape.

4. The fuel supply apparatus according to claim 2, wherein
a virtual line, which connects an inflow of the housing for the fuel with the second outflow, passes through a center of the housing,
the valve device has:
  a partition to partition the inside of the housing into an inflow side region and an outflow side region of the fuel; and
  a blockage protrusion protruding from a center of the partition in a direction from the inflow toward the second outflow and to block the second outflow,
the partition has one or more first through holes around the blockage protrusion and to communicate the inflow side region with the outlet side region,
both of the first flow passage and the second flow passage include the first through hole, and
the spring is a coil spring having a central axis which is the virtual line.

5. The fuel supply apparatus according to claim 1, wherein
the housing has an outflow, which is to allow the fuel to flow therefrom, and a valve body facing part which surrounds the outflow and faces the valve body,
a gap is formed between the valve body and the valve body facing part, regardless of whether or not the fuel temperature is higher than the vapor generation temperature,
the gap is to change in size in correspondence with movement of the valve body,
a minimum cross-sectional area of the gap when the fuel temperature is lower than the vapor generation temperature is smaller than a minimum cross-sectional area of the outflow, and
the minimum cross-sectional area of the gap when the fuel temperature is equal to or higher than the vapor generation temperature is equal to or larger than the minimum cross-sectional area of the outflow.

6. The fuel supply apparatus according to claim 1, wherein
the vapor generation temperature is predetermined at a temperature at which fuel vapor occurs in the fuel tank.

7. The fuel supply apparatus according to claim 1, wherein
the spring is configured to move the valve body to increase the minimum flow passage cross-sectional area in response to increase in the fuel temperature to be equal to or higher than the vapor generation temperature.

8. A fuel supply apparatus to supply fuel from a fuel tank to an internal combustion engine, comprising:
a pump to discharge fuel in the fuel tank;
a return passage branched from a fuel passage, which is connected to the pump, and to return a part of fuel discharged from the pump to the fuel tank; and
a valve device to control a flow rate in the return passage, wherein
the valve device has:
  a housing;
  an inner passage provided in the housing and to communicate with both the fuel passage and an inside of the fuel tank;
  a valve body provided in the inner passage and movable in the housing to change a minimum flow passage cross-sectional area of the inner passage; and
  a spring connected to the valve body and to change its biasing load in correspondence with a fuel temperature of the fuel to move the valve body, and
the spring is to move the valve body such that the minimum flow passage cross-sectional area, when the fuel temperature of the fuel discharged with the pump is equal to or higher than a predetermined vapor generation temperature, is larger than the minimum flow passage cross-sectional area when the fuel temperature is lower than the vapor generation temperature, the inner passage includes:
 a low-temperature flow passage to allow the fuel to flow therethrough when the fuel temperature is lower than the vapor generation temperature; and
 a high-temperature flow passage to allow the fuel to flow therethrough when the fuel temperature is equal to or higher than the vapor generation temperature, the housing has a third outflow from which the fuel is to flow, the valve body is to block the high-temperature flow passage when the fuel temperature is lower than the vapor generation temperature, the valve body has:
 a recess to surround an opening of an end of the third outflow, which is in an inner wall surface of the housing, upon blockage of the high-temperature flow passage; and
 a second through hole being a through hole inside the valve body and having one end, which is exposed to the recess, and an other end, which is exposed to the inside of the housing, the low-temperature flow passage includes the third outflow and the second through hole, the high-temperature flow passage excludes the second through hole and includes:
 the third outflow; and
 a gap between a blockage end of the recess and the inner wall surface of the housing, the blockage end being to make contact with the inner wall surface of the housing when blocking the high-temperature flow passage, the minimum flow passage cross-sectional area in the low-temperature flow passage is a cross-sectional area of the second through hole, the minimum flow passage cross-sectional area in the high-temperature flow passage is a cross-sectional area of the third outflow or a cross-sectional area of the gap, and the cross-sectional area of the second through hole is smaller than the cross-sectional area of the third outflow or the cross-sectional area of the gap.

9. The fuel supply apparatus according to claim 8, wherein
the second through hole includes a first through hole forming portion and a second through hole forming portion,
the first through hole forming portion includes the other end and is exposed to the inside of the housing,
the second through hole forming portion includes the one end and is exposed to the recess,
the second through hole forming portion continues to the first through hole forming portion,
a minimum cross-sectional area $S1$ of the first through hole forming portion, a minimum cross-sectional area $S2$ of the second through hole forming portion, and a minimum cross-sectional area $S3$ of the third outflow have a dimensional relationship in an expression (1):

$$S1 > S3 > S2 \qquad (1),$$

and a minimum cross-sectional area $S4$ of the gap and the minimum cross-sectional area $S3$ of the third outflow have a dimensional relationship in an expression (2):

$$S4 > S3 \qquad (2).$$

10. A fuel supply apparatus to supply fuel from a fuel tank to an internal combustion engine, comprising:
a pump to discharge fuel in the fuel tank;
a return passage branched from a fuel passage, which is connected to the pump, and to return a part of fuel discharged from the pump to the fuel tank; and
a valve device to control a flow rate in the return passage, wherein
the valve device has:
 a housing;
 an inner passage provided in the housing and to communicate with both the fuel passage and an inside of the fuel tank;
 a valve body provided in the inner passage and movable in the housing to change a minimum flow passage cross-sectional area of the inner passage; and
 a spring connected to the valve body and to change its biasing load in correspondence with a fuel temperature of the fuel to move the valve body,
the spring is to move the valve body such that the minimum flow passage cross-sectional area, when the fuel temperature of the fuel discharged with the pump is equal to or higher than a predetermined vapor generation temperature, is larger than the minimum flow passage cross-sectional area when the fuel temperature is lower than the vapor generation temperature,
the inner passage includes:
 a low-temperature flow passage to allow the fuel to flow therethrough when the fuel temperature is lower than the vapor generation temperature; and
 a high-temperature flow passage to allow the fuel to flow therethrough when the fuel temperature is equal to or higher than the vapor generation temperature,
the housing has a third outflow to allow the fuel to flow therefrom and a valve body facing part which surrounds the third outflow and faces the valve body,
the third outflow is to be blocked when the valve body makes contact with the valve body facing part,
the valve body facing part is formed in a tapered shape in which the closer to the valve body, the larger an opening cross-sectional area of the valve body facing part is,
the valve body includes a blockage end partially to make contact with the valve body facing part and having a spherical external shape,
the valve body includes a blockage protrusion having a third through hole,
the third through hole has one end, which is exposed to the inside of the housing, and an other end which faces the third outflow,
the minimum flow passage cross-sectional area in the low-temperature flow passage is a minimum cross-sectional area in the third through hole,
the minimum flow passage cross-sectional area in the high-temperature flow passage is a minimum cross-sectional area of a gap between the blockage end and the valve body facing part, and
the minimum cross-sectional area in the third through hole is smaller than the minimum cross-sectional area of the gap between the blockage protrusion and the valve body facing part.

11. A fuel supply apparatus to supply fuel from a fuel tank to an internal combustion engine, comprising:

a pump to discharge fuel in the fuel tank;
a return passage branched from a fuel passage, which is connected to the pump, and to return a part of fuel discharged from the pump to the fuel tank; and
a valve device to control a flow rate in the return passage, wherein
the valve device has:
a housing;
an inner passage provided in the housing and to communicate with both the fuel passage and an inside of the fuel tank;
a valve body provided in the inner passage and movable in the housing to change a minimum flow passage cross-sectional area of the inner passage; and
a spring connected to the valve body and to change its biasing load in correspondence with a fuel temperature of the fuel to move the valve body,
the spring is to move the valve body such that the minimum flow passage cross-sectional area, when the fuel temperature of the fuel discharged with the pump is equal to or higher than a predetermined vapor generation temperature, is larger than the minimum flow passage cross-sectional area when the fuel temperature is lower than the vapor generation temperature,
the spring includes a first spring and a second spring,
the first spring is provided on an inflow side of the fuel, which is to flow into the housing, with respect to the valve body,
the second spring is provided on an outflow side of the fuel, which is to flow from the housing, with respect to the valve body,
the first spring is a bias spring, and
the second spring is a shape-memory alloy spring.

12. A fuel supply apparatus to supply fuel from a fuel tank to an internal combustion engine, comprising:
a pump to discharge the fuel in the fuel tank;
a return passage branched from a fuel passage, which is connected to the pump, to return a part of the fuel discharged from the pump into the fuel tank; and
a valve device to control a flow rate in the return passage, wherein
the valve device has:
a housing;
an inner passage provided in the housing and to communicate with both the fuel passage and an inside of the fuel tank; and
a valve body provided in the inner passage and to change a minimum flow passage cross-sectional area of the inner passage,
the inner passage includes:
a first flow passage to communicate the fuel passage with the inside of the fuel tank regardless of a fuel temperature of the fuel discharged with the pump; and
a second flow passage to be blocked with the valve body, when the fuel temperature is lower than a predetermined vapor generation temperature, and not to be blocked with the valve body when the fuel temperature is equal to or higher than the vapor generation temperature,
the first flow passage includes a first outflow,
the second flow passage includes a second outflow,
the valve body is formed with a bimetal plate including two types of metal having mutually different thermal expansion coefficients and laminated in a flow direction of the fuel in the inner passage,
the valve body is at a position to enable to block the second outflow, and
the second outflow is to be blocked with the valve body when the fuel temperature is lower than the vapor generation temperature and is not to be blocked with the valve body when the fuel temperature is equal to or higher than the vapor generation temperature.

13. The fuel supply apparatus according to claim 12, wherein
the vapor generation temperature is predetermined at a temperature at which fuel vapor occurs in the fuel tank.

14. The fuel supply apparatus according to claim 12, wherein
the spring is configured to move the valve body to increase the minimum flow passage cross-sectional area in response to increase in the fuel temperature to be equal to or higher than the vapor generation temperature.

* * * * *